United States Patent
Chapman et al.

(10) Patent No.: US 12,527,868 B2
(45) Date of Patent: Jan. 20, 2026

(54) MESODERMAL KILLER (MK) CELL

(71) Applicant: Cell Therapy Limited, Warwickshire (GB)

(72) Inventors: Lee Chapman, Warwickshire (GB); Sabena Sultan, Warwickshire (GB)

(73) Assignee: Cell Therapy Limited, Warwickshire (GB)

( * ) Notice: Subject to any disclaimer, the term of this patent is extended or adjusted under 35 U.S.C. 154(b) by 1097 days.

(21) Appl. No.: 17/310,064

(22) PCT Filed: Jan. 13, 2020

(86) PCT No.: PCT/GB2020/050060
§ 371 (c)(1),
(2) Date: Jul. 14, 2021

(87) PCT Pub. No.: WO2020/148520
PCT Pub. Date: Jul. 23, 2020

(65) Prior Publication Data
US 2023/0047325 A1     Feb. 16, 2023

(30) Foreign Application Priority Data
Jan. 15, 2019 (GB) .................................... 1900554
Nov. 19, 2019 (GB) .................................... 1916842

(51) Int. Cl.
| | | |
|---|---|---|
| C12N 5/077 | (2010.01) | |
| A61K 35/17 | (2015.01) | |
| A61K 40/10 | (2025.01) | |
| A61K 40/42 | (2025.01) | |
| C12N 5/0783 | (2010.01) | |
| C12N 5/0786 | (2010.01) | |

(52) U.S. Cl.
CPC .............. *A61K 40/10* (2025.01); *A61K 35/17* (2013.01); *A61K 40/42* (2025.01); *C12N 5/0645* (2013.01); *C12N 5/0646* (2013.01); *C12N 2500/02* (2013.01)

(58) Field of Classification Search
None
See application file for complete search history.

(56) References Cited

U.S. PATENT DOCUMENTS

2018/0155690 A1    6/2018   Park et al.

FOREIGN PATENT DOCUMENTS

| WO | 2011/004201 A1 | 1/2011 |
|---|---|---|
| WO | 2012/146702 A1 | 11/2012 |
| WO | 2013/005053 A2 | 1/2013 |
| WO | 2015/189587 A1 | 12/2015 |

(Continued)

OTHER PUBLICATIONS

Long EO. Ready for prime time: NK cell priming by dendritic cells. Immunity. Apr. 2007;26(4):385-7. doi: 10.1016/j.immuni.2007.04.001. PMID: 17459805. (Year: 2007).*

(Continued)

*Primary Examiner* — Evelyn Y Pyla
*Assistant Examiner* — Jagamya Vijayaraghavan
(74) *Attorney, Agent, or Firm* — Norton Rose Fulbright US LLP

(57) ABSTRACT

The invention relates to mesodermal killer (MK) cells and their use in therapy, especially for the treatment of cancer.

12 Claims, 11 Drawing Sheets

(56) References Cited

FOREIGN PATENT DOCUMENTS

WO  2017/025729 A1  2/2017

OTHER PUBLICATIONS

Anastasiadis et al., "Implantation of a Novel Allogeneic Mesenchymal Precursor Cell Type in Patients with Ischemic Cardiomyopathy Undergoing Coronary Artery Bypass Grafting: an Open Label Phase I Ia Trial", Journal of Cardiovascular Translational Research, vol. 9, No. 3, Apr. 1, 2016 (Apr. 1, 2016), pp. 202-213.

Angiolillo et al. "Human Interferon-inducible Protein 10 Is a Ptent Inhibitor of Angiogenesis in Vivo", The Journal of Experimental Medicine, Jul. 1995, vol. 182, pp. 155-162.

Bickel, Matthais, "The role of interleukin-8 in inflammation and mechanisms of regulation", J Peridontol, May (1993) supplement, vol. 64, No. 5, pp. 456-460.

Brunetta et al., "The decreased expression of Siglec-7 represents an early marker of dysfunctional natural killer-cell subsets associated with high levels of HIV-1 viremia", Blood, Oct. 29, 2009, vol. 114, No. 18, pp. 3822-3830.

Carrancio et al, "Optimization of mesenchymal stem cell expansion procedures by cell separation and culture conditions modification", Experimental Hematology, vol. 36, No. 8, Aug. 2008 (Aug. 2008), pp. 1014-1021.

Chan et al: "DNAM-1/CD155 Interactions Promote Cytokine and NK Cell-Mediated Suppression of Poorly Immunogenic Melanoma Metastases", The Journal of Immunology, 2010, 184: 902-911.

Deuss et al: "Recognition of nectin-2 by the natural killer cell receptor T cell immunoglobulin and ITIM domain (TIGIT)", J. Biol. Chem. (2017) 292(27) 11413-11422.

Dufour et al: "IFN-y-Inducible Protein 10 (IP-10; CXCL 10)-Deficient Mice Reveal a Role for IP-10 in Effector T Cell Generation and Trafficking", The Journal of Immunology, 2002, 168: 3195-3204.

Fisher et al: "The Two Faces of IL-6 in the Tumor Microenvironment", Semin Immunol. Feb. 2014 ; 26(1): 38-47.

Fuchs et al: "Cutting Edge: CD96 (Tactile) Promotes NK Cell-Target Cell Adhesion by Interacting with the Poliovirus Receptor (CD155)", Journal of Immunology, 2004, 172: 3994-3998.

Gong et al., "Characterization of a Human Cell Line (NK-92) with Phenotypical and Functional Characteristics of Activated Natural Killer Cells" Leukemia, Apr. 1994, vol. 8, No. 4, pp. 652-658.

Hsieh et al: "Development of TH1 CD4+ T cells through IL-12 produced by Listeria-induced macrophages" Science, Apr. 23, 1993, vol. 260, pp. 547-548.

Lehmann et al: "Activation of natural killer cells with interleukin 2 (IL-2) and IL-12 increases perforin binding and subsequent lysis of tumour cells" British Journal of Haematology, 2001, 114, 660-665.

Liu et al: "PUMA Overexpression Induces Reactive Oxygen Species Generation and Proteasome-Mediated Stathmin Degradation in Colorectal Cancer Cells" Cancer Res, Mar. 1, 2005, 65: (5) pp. 1647-1654.

Messal et al: "Differential role for CD277 as a co-regulator of the immune signal in T and NK cells", Eur. J. Immunol. 2011. 41: 3443-3454.

Moser et al: "Neutrophil-Activating Properties of the Melanoma Growth-Stimulatory Activity" J. Exp. Med., May 1990, vol. 171, pp. 1797-1802.

Osinska et al: "Perforin: an important player in immune response" Centr Eur J Immunol 2014; 39 (1): pp. 109-115.

Russell, Shane "Soluble IL-2R? (sCD25) Exacerbates Autoimmunity and Enhances the Development of Th17 Responses in Mice" PLOS One, Oct. 2012, vol. 7, Issue 10, pp. 1-9.

Trapani, Joseph A. "Granzymes: a family of lymphocyte granule serine proteases", Genome Biology, Nov. 23, 2001, vol. 2, No. 12, Reviews 3014.1-3014.7.

Waldmann, Thomas A. "Interleukin-15 in the treatment of cancer", Expert Rev. Clin. Immunol., 10(12), 1689-1701 (2014).

Wendel et al: "Natural Killer Cell Accumulation in Tumors Is Dependent on IFN-; and CXCR3 Ligands", Cancer Res; 68: (20). Oct. 15, 2008, pp. 8437-8445.

Yagita et al: "A novel natural killer cell line (KHYG-1) from a patient with aggressive natural killer cell leukemia carrying a p53 point mutation" Leukemia (2000) 14, 922-930.

Yeap et al. "CD16 is indispensable for antibody-dependent cellular cytotoxicity by human monocytes", Sci. Rep. 6, 34310; doi: 10.1038/srep34310 (2016).

Zamai et al: "Natural Killer (NK) Cell-mediated Cytotoxicity: Differential Use of TRAIL and Fas Ligand by Immature and Mature Primary Human NK Cells", J. Exp. Med., vol. 188, No. 12, Dec. 21, 1998, pp. 2375-2380.

Zhang et al: "Activating Signals Dominate Inhibitory Signals in CD137L/IL-15 Activated Natural Killer Cells", J Immunother. Mar. 2011 ; 34(2): 187-195.

Zhao et al: "Therapeutic Applications of Mesenchymal Stem/Multipotent Stromal Cells", Stem Cells & Regenerative Medicine, Stem Cell Biology and Regenerative Medicine, DOI 10.1007/978-1-60761-860-7_12, © Springer Science +Business Media, LLC 2011.

\* cited by examiner

MESODERMAL KILLER (MK) CELL

CROSS-REFERENCE TO RELATED APPLICATIONS

This application is a national phase application under 35 U.S.C. § 371 that claims priority to International Application No. PCT/GB2020/050060 filed Jan. 13, 2020, which claims priority to both Great Britain Patent Application No. 1916842.6 filed on Nov. 19, 2019, and Great Britain Patent Application No. 1900554.5 filed on Jan. 15, 2019, all of which are incorporated herein by reference in their entirety.

FIELD OF THE INVENTION

The invention relates to mesodermal killer (MK) cells and their use in therapy, especially for the treatment of cancer.

BACKGROUND TO THE INVENTION

Mesodermal cells are derived from a number of tissues and act as the supportive structure for other cell types. Bone marrow for instance is made of both haematopoietic and mesenchymal derived cells. Two principle mesenchymal cell types have been previously described and characterized, namely (i) mesenchymal stem cells (MSCs) and their precursors and (ii) mesenchymal precursor cells (MPCs) found in the bone marrow. Mesenchymal stem cells (MSCs) are multipotent, adult stem cells. MSCs differentiate to form the different specialised cells found in the skeletal tissues. For example, they can differentiate into cartilage cells (chondrocytes), bone cells (osteoblasts) and fat cells (adipocytes).

MSCs are already used in a variety of therapies, such as the treatment of Age-related Macular Degeneration (AMD) and myocardial infarct. Once administered to the subject, the MSCs typically migrate (or home) to the damaged tissue and exert their therapeutic effects through paracrine signaling and by promoting survival, repair and regeneration of the neighbouring cells in the damaged tissue.

There is some evidence to suggest that MSCs may possess certain immunosuppressive and immune-enhancing properties. MSCs could therefore be used to manipulate immune responses and thereby treat diseases. However, current therapies typically involve the infusion of a mixture of MSC subtypes, most of which do not possess the required immuno-modulatory properties. This necessitates the use of a high cell-dose which can lead to off-target side effects and volume-related side effects. Furthermore, MSCs are typically obtained from bone marrow and so it is difficult to obtain the large numbers of cells needed for this approach.

Other mesodermal progenitor cells have also been disclosed by the Applicant, namely progenitor cells of the mesodermal lineage (PMLs), immuno-modulatory progenitor (iMP) cells and immuno-oncology mesodermal progenitor (ioMP) cells. PMLs are disclosed in PCT/GB2012/051600 (published as WO 2013/005053). iMP cells are disclosed in PCT/GB2015/051673 (published as WO 2015/189587). ioMP cells are disclosed in PCT/GB2016/052447 (published as WO 2017 025729).

SUMMARY OF THE INVENTION

This invention relates to a novel cell type that has not been previously identified or isolated, the mesodermal killer (MK) cell. This MK cell is quite distinct and different from MSCs, MPCs, PMLs, iMP cells and ioMP cells in its composition, function and characteristics, which impart an enhanced cytotoxicity and ability to modulate natural killer (NK) cells. The MK cell is capable of killing cancer cells directly, i.e. cancer cell cytotoxicity. The MK cell is capable of priming/activating NK cells (i.e. increasing the proliferation and/or cytotoxic activity of NK cells). The MK is preferably capable of attracting immune cells to the site of inflammation. The MK cell is named after the NK cell because it displays similar natural killer characteristics, but it is tissue engineered from mesodermal cells, such as bone marrow. This MK cell is quite distinct and different from NK cells in its composition, function and characteristics.

The inventors have surprisingly identified a new mesodermal killer (MK) cell having a specific marker expression pattern. In particular, the MK cell expresses CD112, CD137L, CD178, CD253 and CD277. The MK cell may express CD16 and CD96. The MK cell does not express CD34 and CD45.

The MK cell may not express CD56 The MK cells of the invention can be isolated from mononuclear cells (MNCs), such as bone marrow MNCs or peripheral blood MNCs. The MK cells are capable of increasing NK cell cytotoxic activity in vitro and in vivo. The MK cells themselves are capable of killing cancer cells in vitro and in vivo. This is shown in the Examples.

Accordingly, the invention provides a mesodermal killer (MK) cell, wherein the cell expresses detectable levels of CD112, CD137L, CD178, CD253 and CD277, and wherein the cell does not express detectable levels of CD34 and CD45.

The invention also provides a mesodermal killer (MK) cell, wherein the cell expresses detectable levels of CD16, CD96, CD112, CD137L, CD178, CD253 and CD277, and wherein the cell does not express detectable levels of CD34, CD45 and CD56.

The invention also provides:
- a population of two or more MK cells of the invention;
- a population of MK cells of the invention, wherein greater than about 15% of the cells in the population express detectable levels of CD112, CD137L, CD178, CD253 and CD277 and wherein about 5% or fewer of the cells in the population express detectable levels of CD34 and CD45;
- a population of MK cells of the invention, wherein greater than about 15% of the cells in the population express detectable levels of CD16, CD96, CD112, CD137L, CD178, CD253 and CD277 and wherein about 5% or fewer of the cells in the population express detectable levels of CD34, CD45 and CD56;
- a population of MK cells, wherein
  (i) at least about 20% of the cells in the population express a detectable level of CD112,
  (ii) at least about 80% of the cells in the population express a detectable level of CD137L,
  (iii) at least about 20% of the cells in the population express a detectable level of CD178,
  (iv) at least about 50% of the cells in the population express a detectable level of CD253, and
  (v) at least about 50% of the cells in the population express a detectable level of CD277,
  and wherein
  (a) about 5% or fewer of the cells in the population express a detectable level of CD34, and
  (b) about 5% or fewer of the cells in the population express a detectable level of CD45.
- a population of MK cells, wherein
  (i) at least about 15% of the cells in the population express a detectable level of CD16, (ii) at least about 50% of the cells in the population express a detectable level of CD96, (iii) at least about 20% of the cells in the population express a detectable level of CD112, (iv) at least about 80% of the cells in the population express a detectable level of CD137L, (v) at least about 20% of the cells in the population express a detectable level of CD178, (vi) at least about 50% of the cells in the population express a detectable level of CD253, and (vii) at least about 50% of the cells in the population express a detectable level of CD277, and wherein (a) about 5% or fewer of the cells in the population express a detectable level of CD34, (b) about 5% or fewer of the cells in the population express a detectable level of CD45, and (c) about 5% or fewer of the cells in the population express a detectable level of CD56.

a pharmaceutical composition comprising (a) a population of MK cells of the invention and (b) a pharmaceutically acceptable carrier or diluent;

a method of producing a population of MK cells of the invention, comprising (a) culturing mononuclear cells (MNCs) under conditions which induce the MNCs to differentiate into immunomodulatory progenitor (iMP) cells, (b) culturing the iMP cells in a medium comprising one or more ribonucleosides, one or more deoxyribonucleosides and platelet lysate under low oxygen conditions and under conditions which allow the iMP cells to adhere and differentiate into MK cells;

a method of producing a population of MK cells of the invention, comprising culturing iMP cells in a medium comprising one or more ribonucleosides, one or more deoxyribonucleosides and platelet lysate under low oxygen conditions and under conditions which allow the iMP cells to adhere and differentiate into MK cells;

an in vitro method of priming a population of NK cells, comprising incubating the population of NK cells with a population of MK cells the invention under conditions which increase the activity of the NK cells;

a population of primed NK cells produced using the method of the invention;

a pharmaceutical composition comprising (a) a population of primed NK cells of the invention and (c) a pharmaceutically acceptable carrier or diluent;

an in vivo method of priming a population of NK cells, comprising administering a population of MK cells of the invention or a pharmaceutical composition of the invention to a subject under conditions which increase the activity of NK cells in the subject; and a method of treating cancer in a subject, the method comprising administering to the subject (a) a population of MK cells of the invention, (b) a population of primed NK cells of the invention, (c) a population of MK cells of the invention and a population of NK cells or (d) a pharmaceutical composition of the invention.

DETAILED DESCRIPTION OF THE INVENTION

Figure 1:
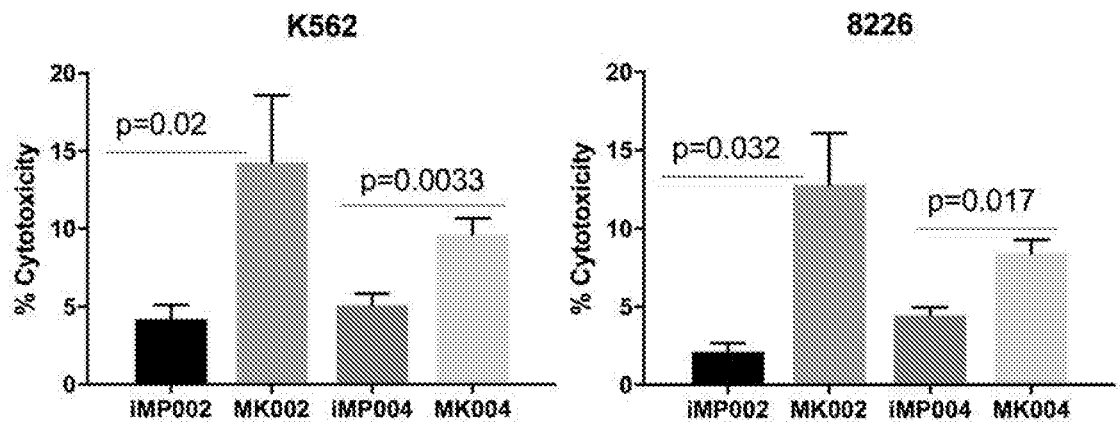
FIG. 1 shows that MK002 and MK004 demonstrate significantly increased cytotoxicity compared with IMP002 and IMP004 against both K562 (chronic myelogenous leukemia) and RPMI-8226 (plasma cell myeloma) (n=3; t-test).

It is to be understood that different applications of the disclosed products and methods may be tailored to the specific needs in the art. It is also to be understood that the terminology used herein is for the purpose of describing particular embodiments of the invention only and is not intended to be limiting.

In addition, as used in this specification and the appended claims, the singular forms "a", "an", and "the" include plural referents unless the content clearly dictates otherwise. Thus, for example, reference to "a cell" includes "cells", reference to "a tissue" includes two or more such tissues, reference to "a subject" includes two or more such subjects, and the like.

All publications, patents and patent applications cited herein, whether supra or infra, are hereby incorporated by reference in their entirety.

MK Cell of the Invention

The present invention provides a mesodermal killer (MK) cell. The MK cell expresses detectable levels of CD112, CD137L, CD178, CD253 and CD277. The MK cell does not express detectable levels of CD34 and CD45. The MK cell preferably does not express detectable levels of one or more of (a) CD45RA, (b) CD45RB and (c) CD45RO, such as (a), (b), (c), (a) and (b), (a) and (c), (b) and (c) or (a), (b) and (c). In the context of the invention, does not express detectable levels means that about 5% or fewer of the MK cells express the relevant marker.

The MK cell preferably expresses a detectable level of CD16 and/or CD96. The MK cell preferably expresses a detectable level of CD16 and/or CD96 when treated with interferon gamma (IFN-gamma) as discussed in more detail below.

The MK cell preferably does not express a detectable level of CD56. The MK cell preferably expresses a detectable level of CD16 and/or CD96 and does not express a detectable level of CD56.

In a preferred embodiment, the MK cell expresses detectable levels of CD16, CD96, CD112, CD137L, CD178, CD253 and CD277. The preferred MK cell does not express detectable levels of CD34, CD45 and CD56.

The term MK cell is interchangeable herein with mesodermal progenitor killer (MPK) cell, bone marrow derived cell, or bone marrow derived killer cell.

The MK cell preferably expresses on its surface detectable levels of CD112, CD137L, CD178, CD253 and CD277. The MK cell preferably expresses on its surface detectable levels of CD16 and/or CD96. The MK cell preferably expresses on its surface detectable levels of CD16, CD96, CD112, CD137L, CD178, CD253 and CD277. The MK cell preferably does not express on its surface detectable levels of CD34 and CD45. The MK cell preferably does not express on its surface detectable levels of one or more of (a) CD45RA, (b) CD45RB and (c) CD45RO as defined above. The MK cell preferably does not express on its surface detectable levels of CD56. The MK cell preferably does not express on its surface detectable levels of CD34, CD45 and CD56. The MK cell preferably expresses or does not express detectable levels of any of the markers listed below on its surface. Likewise, population of MK cells may express/not express any of the listed markers on their surfaces.

CD16 (also known as Fcgamma RIIIA) functions during antibody-dependent cellular cytotoxicity (ADCC; Wei Hseun Yeap et al. Scientific Reports volume 6, Article number: 34310 (2016)). The expression of this marker also distinguishes MK cells from ioMP cells and MSCs. The expression of this marker can be increased by treatment/stimulation with IFN-gamma.

CD96 (also known as TACTILE) functions in NK cell adhesion and stimulates cytotoxicity of activated NK cells (Fuchs et al. J Immunol Apr. 1, 2004, 172 (7) 3994-3998). The expression of this marker also distinguishes MK cells from MSCs. The expression of this marker can be increased by treatment/stimulation with IFN-gamma.

CD112 (also known as PRR2 and Nectin-2) is involved in NK cell priming/activating (Deuss et al. J Biol Chem. 2017 Jul. 7; 292(27):11413-11422). The expression of this marker also distinguishes MK cells from MSCs. The expression of this marker can be increased by treatment/stimulation with IFN-gamma.

CD137L (also known as 4-1BB L) is involved in NK cell priming/activating (Zhang et al. J Immunother. 2011 March; 34(2): 187-195.).

CD178 (also known as FasL and CD95L) is involved in NK cell cytotoxicity (Zamai et al. J Exp Med. 1998 Dec. 21; 188(12): 2375-2380). The expression of this marker also distinguishes MK cells from MSCs. The expression of this marker can be increased by treatment/stimulation with IFN-gamma and/or tumour necrosis factor-alpha (TNF-alpha).

CD253 (also known as TRAIL and TNFSF10) is involved in NK cell cytotoxicity (Zamai et al. J Exp Med. 1998 Dec. 21; 188(12): 2375-2380). The expression of this marker also distinguishes MK cells from ioMP cells. The results in Example 15 suggest that CD253 forms part of the mechanism by which the MK cells of the invention are cytotoxic.

CD277 (also known as BT3.1 and butyrophilin SF3 A1) regulates immune cells functions (Messal et al. Eur J Immunol. 2011 December; 41(12):3443-54). The expression of this marker also distinguishes MK cells from ioMP cells, iMPs and MSCs.

CD34 (also known as HPCA1) is a key MNC marker. The lack of expression of this marker distinguishes MK cells from MNCs.

CD45 (also known as LCA) is a key MNC marker. The lack of expression of this marker also distinguishes MK cells from MNCs and NK cells.

CD56 (also known as NCAM) is a key NK cell marker (Zamai et al. J Exp Med. 1998 Dec. 21; 188(12): 2375-2380). The lack of expression of this marker distinguishes MK cells from NK cells.

The MK cells of the invention have numerous advantages. The key advantages will be summarised here. However, further advantages will become apparent from the discussion below.

The MK cells of the invention may advantageously be used to treat a disease in a subject. For example, the MK cells may be used to treat cancer in a subject.

The MK cells of the invention may treat disease via their direct effects. For example, the MK cells may kill cancer cells via contact-dependent cell lysis. Preferably, the MK cells kill tumour cells via contact-dependent cell lysis. The MK cells may also induce cancer cell death through antibody-dependent cell-mediated cytotoxicity (ADCC).

The MK cells of the invention may modulate immune responses. In other words, the MK cells may have immunomodulatory effects. For example, the MKs may increase the activity (especially cytotoxicity) of NK cells both in vitro or in vivo. For instance, the MK cells may be used to produce a population of primed or activated NK cells in vitro. The primed or activated NK cells may be used to treat a disease, such as cancer, in a subject. The primed or activated NK cells may be administered to the subject alone or in combination with the MK cells. The MK cells may also prime or activate endogenous NK cells in subjects.

A key advantage of the MK cells of the invention is that they are mesodermal cells, which are typically safe in vivo. There is good evidence that iMP cells (allogeneic mesodermal cells) produced in a similar (but different) manner to the MK cells of the invention are safe in human subjects (Anastasiadis et al. J Cardiovasc Transl Res. 2016 June; 9(3): 202-13). MK cells are cytotoxic, but are not expected to induce any of the side effects of other cytotoxic cellular therapies, such as Chimeric Antigen Receptor-T (CAR-T) cells. In particular, MK cells are not expected to induce cytokine release syndrome (CRS; aka cytokine storm), macrophage activation syndrome (MAS) and off-target effects.

As discussed in more detail below, the MK cells are produced from mononuclear cells (MNCs), such as bone marrow MNCs, taken from an individual, such as a human individual. Since the MK cells are produced from MNCs, they may be produced easily (such as from bone marrow) and may be autologous for the subject to be treated, thereby avoiding the risk of immunological rejection by the subject.

It is possible, in principle, to produce an unlimited number of MK cells from a single individual, since various samples of MNCs (i.e. various samples of bone marrow) may be obtained. It is certainly possible to produce very large numbers of MK cells from a single individual. The MK cells of the invention can therefore be made in large numbers.

The MK cells of the invention are produced in clinically relevant conditions, for instance in the absence of trace amounts of endotoxins and other environmental contaminants, as well as animal products such as fetal calf serum. This makes the MK cells of the invention particularly suitable for administration to subjects.

Numerous populations of MK cells of the invention can be produced from a single sample taken from the subject before any other therapy, such as chemotherapy or radiotherapy, has begun. Therefore, the MK cells of the invention can avoid any of the detrimental effects of those treatments.

The MK cells of the invention can be made quickly. MK cells can be produced from MNCs in less than 34 days, such as in about 33 days, about 32 days, about 31 days, about 30 days, about 29 days, about 28 days, about 27 days, about 26 days or about 25 days. MK cells can also be frozen and cell banked and thawed at the point of use.

The production of MK cells from MNCs avoids the moral and ethical implications involved with using mesenchymal stem cells MSCs derived from human embryonic stem cells (hESCs).

The MK cells of the invention are typically produced from human MNCs. The MK cells of the invention are therefore typically human. The markers discussed above and below are typically human markers. Alternatively, the MK cells may be produced from MNCs from other animals or mammals, for instance from commercially farmed animals, such as horses, cattle, sheep or pigs, from laboratory animals, such as mice or rats, or from pets, such as cats, dogs, rabbits or guinea pigs.

The MK cells of the invention can be identified as mesodermal killer cells using standard methods known in the art, including expression of lineage restricted markers, structural and functional characteristics. The MK cells will express detectable levels of cell surface markers known to be characteristic of MK cells. These are discussed below.

The MK cells of the invention are not stem cells. In particular, they are not MSCs. They are progenitor cells because they replicate/self-renew in vitro. Although they can be forced under the right conditions in vitro to differentiate, for instance into cartilage or bone cells, they typically do not differentiate in vivo. The MK cells of the invention preferably have their anti-cancer effects by (i) direct effects, such as contact-dependent cell lysis or ADCC, (ii) modulation of immune responses or immune cell activity (i.e. immunomodulatory effects) and especially priming/activating NK cells and (ii) attraction of immune cells to the site of cancer, especially NK cells and monocytes. Untreated MK cells of the invention (i.e. MK cells of the invention which have not been treated with IFN-gamma and/or TNF-alpha) typically have effects (i) and (ii). MK cells of the invention treated with IFN-gamma typically have effects (i), (ii) and (iii). In contrast, stem cells typically treat disease by differentiating into replacement tissue.

Figure 4:
FIG. 4 shows the MK cells of the invention (MK002) in culture.
Figure 5:
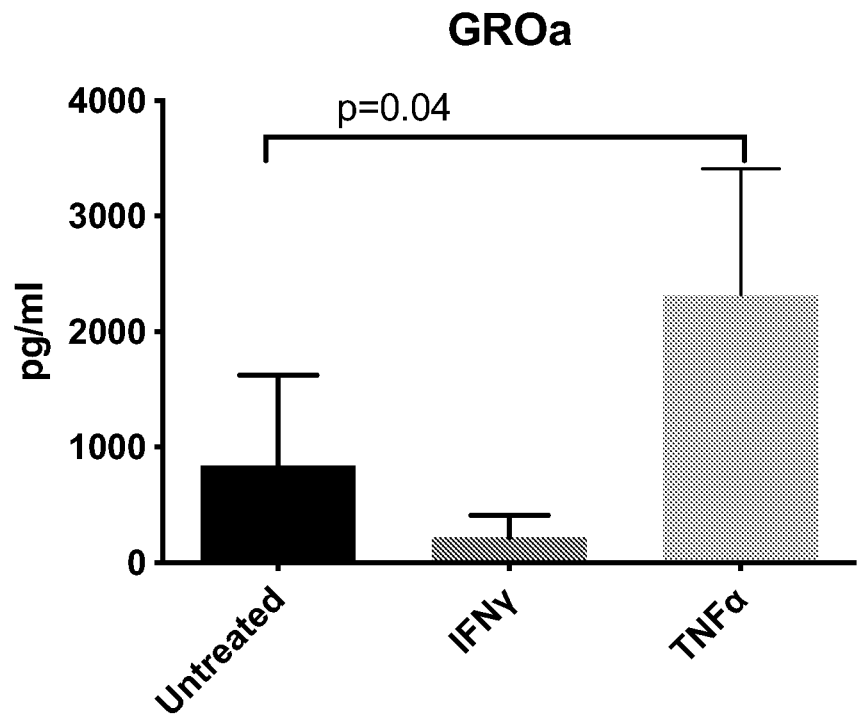
FIG. 5 shows the amount of GROa secreted by the MK cells of the invention when untreated and treated with IFN-gamma (not significant with unpaired t-test) or TNF-alpha (unpaired t-test). Each column represents the data from five batches (mean±SEM; n=1).
Figure 6:
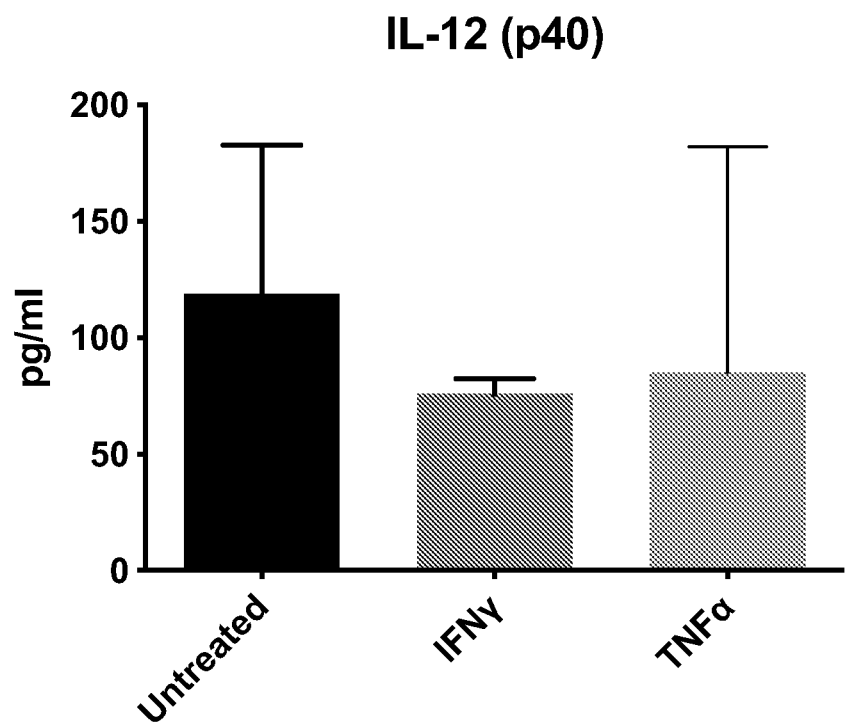
FIG. 6 shows the amount of IL-12 secreted by the MK cells of the invention when untreated and treated with IFN-gamma or TNF-alpha (not significant with unpaired t-test). Each column represents the data from five batches (mean±SEM; n=1).
Figure 7:
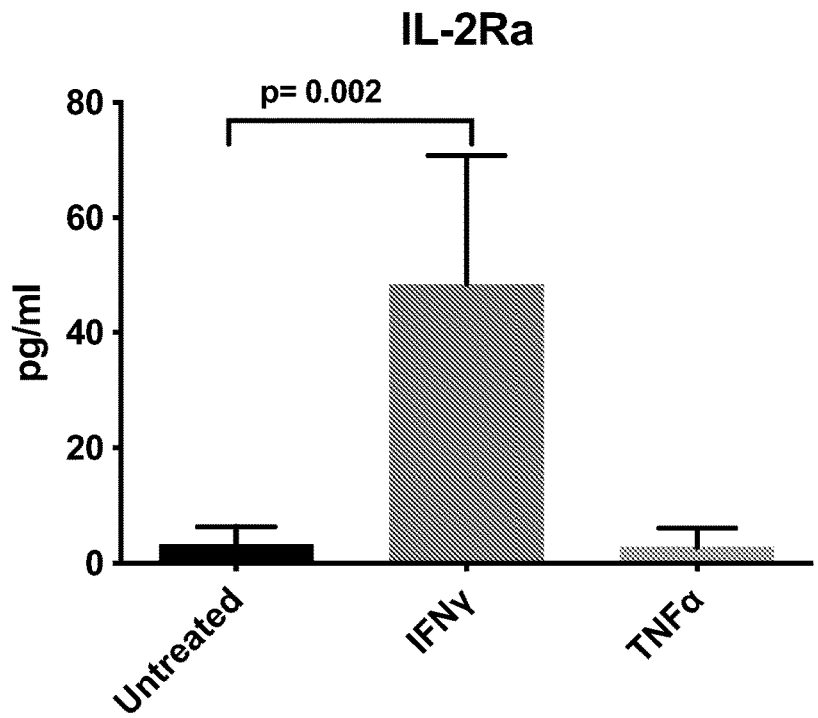
FIG. 7 shows the amount of IL-2Ra secreted by the MK cells of the invention when untreated and treated with IFN-gamma (unpaired t-test) or TNF-alpha (not significant with unpaired t-test). Each column represents the data from five batches (mean±SEM; n=1).
Figure 8:
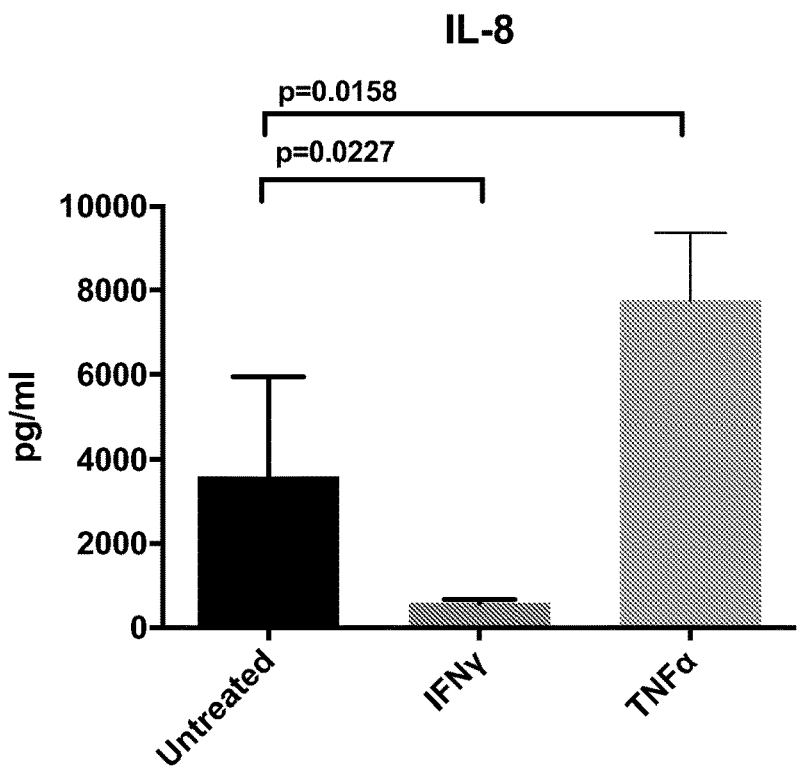
FIG. 8 shows the amount of IL-8 secreted by the MK cells of the invention when untreated and treated with IFN-gamma or TNF-alpha (unpaired t-test). Each column represents the data from four batches (the data for MKPC was not included because it did not correlate with the standard curve; mean±SEM; n=1).
Figure 9:
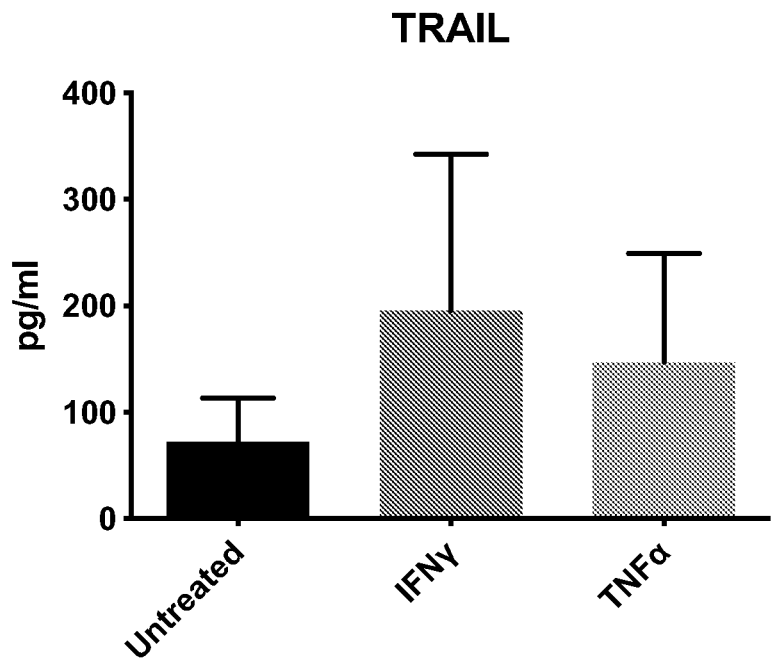
FIG. 9 shows the amount of soluble TRAIL secreted by the MK cells of the invention when untreated and treated with IFN-gamma or TNF-alpha (not significant with unpaired t-test). Each column represents the data from five batches (mean±SEM; n=1).
Figure 10:
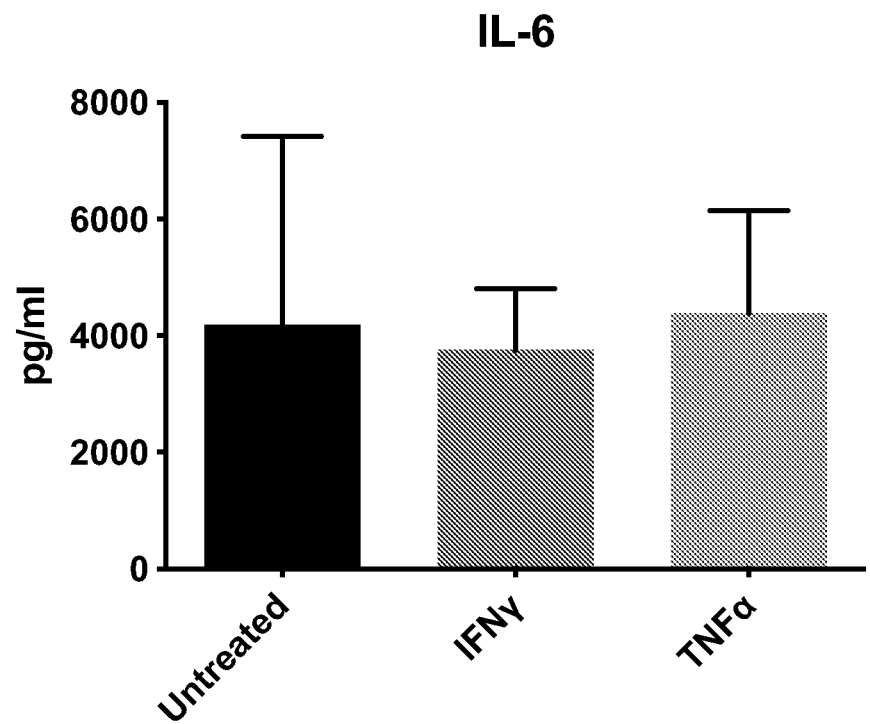
FIG. 10 shows the amount of IL-6 secreted by the MK cells of the invention when untreated and treated with IFN-gamma or TNF-alpha (not significant with unpaired t-test). Each column represents the data from all five batches (mean±SEM; n=1).

The MK cells of the invention are typically characterised by a spindle-shaped morphology. The MK cells are typically fibroblast-like, i.e. they have a small cell body with a few cell processes that are long and thin. The cells are typically from about 10 to about 20 μm in diameter. This shown in FIG. 4.

The MK cells of the invention are distinguished from known cells via their marker expression pattern. The MK cell expresses detectable levels of CD16, CD96, CD112, CD137L, CD178, CD253 and CD277. The MK cell preferably expresses detectable levels of CD16, CD96, CD112, CD137L, CD178, CD253 and CD277. The MKs preferably express an increased amount of these markers compared with known cells, such as ioMP cells, iMP cells and MSCs. The MK cells preferably express an increased amount of all of the markers compared with those cells. This can be determined by comparing the expression level/amount of the markers in a MK of the invention with the expression level/amount in known cells using the same technique under the same conditions. As discussed in more detail below, an increased % of cells in a population of MK cells express the MK markers than in a population of ioMP cells, iMP cells and MSCs. ioMP and iMP cells are known in the art as discussed above (and data concerning these cells are presented in the Examples). Suitable MSCs are commercially available. The MSC used for comparison is preferably a human MSC. Human MSCs are commercially available from Mesoblast® Ltd, Osiris Therapeutics® Inc. or Lonza®. The human MSC is preferably obtained from Lonza®. Such cells were used for the comparison in the Example. The MSC may be derived from any of the animals or mammals discussed above.

The MK cell does not express detectable levels of CD34 and CD45. The MK cell preferably does not express detectable levels of CD34, CD45 and CD56. The MK cell preferably does not express detectable levels of one or more of (a) CD45RA, (b) CD45RB and (c) CD45RO, such as (a), (b), (c), (a) and (b), (a) and (c), (b) and (c) or (a), (b) and (c).

Standard methods known in the art may be used to determine the detectable expression or increased expression of various markers discussed above (and below). Suitable methods include, but are not limited to, immunocytochemistry, immunoassays, flow cytometry, such as fluorescence activated cells sorting (FACS), and polymerase chain reaction (PCR), such as reverse transcription PCR (RT-PCR). Suitable immunoassays include, but are not limited to, Western blotting, enzyme-linked immunoassays (ELISA), enzyme-linked immunosorbent spot assays (ELISPOT assays), enzyme multiplied immunoassay techniques, radio-allergosorbent (RAST) tests, radioimmunoassays, radiobinding assays and immunofluorescence. Western blotting, ELISAs and RT-PCR are all quantitative and so can be used to measure the level of expression of the various markers if present. The use of high-throughput FACS (HT-FACS) is disclosed in the Example. The expression or increased expression of any of the markers disclosed herein is preferably done using flow cytometry, FACS or HT-FACS. Antibodies and fluorescently-labelled antibodies for all of the various markers discussed herein are commercially-available.

The MK cell of the invention preferably does not express a detectable level of CD14. CD14 is a key MNC marker. The lack of expression of this marker distinguishes MK cells from MNCs.

The MK cell of the invention preferably expresses a detectable level of CD25 (also known as IL-2Ralpha, Tac and p55). The expression of this marker also distinguishes MK cells from ioMP cells, iMPs and MSCs. The expression of this marker can be increased by treatment/stimulation with IFN-gamma and/or TNF-alpha.

The MK cell of the invention preferably expresses a detectable level of CD136 (also known as MSP-R and RON). The expression of this marker also distinguishes MK cells from ioMP cells, iMPs and MSCs. The expression of this marker can be increased by treatment/stimulation with IFN-gamma.

The MK cell of the invention preferably expresses a detectable level of CD155 (also known as PVR). CD155 is involved in NK cell priming/activating (Chan et al. J Immunol Jan. 15, 2010, 184 (2) 902-911).

The MK cell of the invention preferably expresses a detectable level of CD183 (also known as CXCR3). CD183 is involved in NK accumulation in cancers (Wendel et al. Cancer Res. 2008 Oct. 15; 68(20):8437-45). The expression of this marker also distinguishes MK cells from ioMP cells, iMPs and MSCs. The expression of this marker can be increased by treatment/stimulation with IFN-gamma.

The MK cell of the invention preferably expresses a detectable level of CD205 (also known as DEC-205). The expression of this marker also distinguishes MK cells from ioMP cells, iMPs and MSCs. The expression of this marker can be increased by treatment/stimulation with IFN-gamma.

The MK cell of the invention preferably expresses a detectable level of CD332 (also known as FGFR2, BEK and KGFR). CD332 (also known as FGFR2, BEK and KGFR) regulates immune cells functions (Messal et al. Eur J Immunol. 2011 December; 41(12):3443-54). The expression of this marker also distinguishes MK cells from ioMP cells, iMPs and MSCs. The expression of this marker can be increased by treatment/stimulation with IFN-gamma.

The MK cell of the invention (a) preferably does not express detectable levels of CD102 and/or CD127. The MK cell of the invention (b) preferably does not express detectable levels of CD104. The MK cell of the invention (c) preferably does not express detectable levels of one or more of, and preferably all of, CD50, CD62E, CD62L, and CD62P. The MK cell of the invention may (a), (b), (c), (a) and (b), (b) and (c), (a) and (c) or (a), (b) and (c). This marker expression pattern also distinguishes MK cells from PMLs. All references herein (including Table 1 or 2 below) to one or more of (i) CD50, (ii) CD62E, (iii) CD62L and (iv) CD62P may refer to (i), (ii), (iii), (iv), (i) and (ii), (i) and (iii), (i) and (iv), (ii) and (iii), (ii) and (iv), (iii) and (iv), (i), (ii) and (iii), (i), (ii) and (iv), (i), (iii) and (iv), (ii), (iii) and (iv) or (i), (ii), (iii) and (iv). Lack of expression of CD50, CD102 and CD127 also distinguishes MK cells from MSCs.

The MK cell of the invention preferably express a detectable level of CD328. CD328 (also known as Siglec-7) is not expressed by CD56 negative NK cells, which represent an aberrant NK cell subset found in small numbers in healthy individuals and at elevated levels in individuals chronically infected with HIV-1 and HCV (Brunetta, E. et al. (2009) Blood 114, 3822-3830). The expression of CD328 therefore distinguishes MK cells from CD56 negative NK cells.

The MK cell of the invention preferably expresses detectable levels of one of more of NK activating receptors and/or one or more NK inhibitory receptors. The activating and inhibitory receptors may be any of those discussed below with reference to NK cells.

In terms of activating receptors, the MK cell of the invention preferably expresses detectable levels of one or more of, preferably all of, CD158d (also known as KIR2DL4), CD158i (also known as KIR2DS4), CD160 (also known as BY55), CD314 (also known as NKG2D and KLR) and CD337 (NKp30 and Ly117). The MK cell of the invention preferably expresses detectable levels of CD159c (also known as NKG2C).

In terms of inhibitory receptors, the MK cell of the invention preferably expresses detectable levels of one or more of, preferably all of, (a) CD158b2 (also known as KIR2DL3), (b) CD158f (also known as KIR2DL5) and (c) CD159a (also known as NKG2A). The cell may express detectable levels of (a), (b), (c), (a) and (b), (b) and (c), (a) and (c) or (a), (b) and (c).

The MK cell of the invention preferably does not express detectable levels of CD159c (also known as NKG2C). The MK cell of the invention preferably does not express detectable levels of one or more of (a) CD244, (b) CD335 and (c) CD352, such as (a), (b), (c), (a) and (b), (b) and (c), (a) and (c) or (a), (b) and (c). The MK cell of the invention preferably does not express detectable levels of one or more of (a) CD244, (b) CD335 and (c) CD352 (in the any of the ways defined) and CD159c. The lack of expression of these markers distinguishes the MK cells from NK cells.

The MK cell of the invention preferably does not express CD140a. The MK cell of the invention preferably does not express one or more of (i) CDH6, (ii) CD129, (iii) CD200 and (iv) CD271. The MK cell preferably does not express any number and combination of (i) to (iv), such as (i), (ii), (iii), (iv), (i) and (ii), (i) and (iii), (i) and (iv), (ii) and (iii), (ii) and (iv), (iii) and (iv), (i), (ii) and (iii), (i), (ii) and (iv), (i), (iii) and (iv), (ii), (iii) and (iv) or (i), (ii), (iii) and (iv).

The MK cell of the invention is not a MSC. The typical marker expression pattern of MSCs is set out in Table 1 of Zhao et al., Stem Cells & Regenerative Medicine, Springer Science 2011 (10.1007/978-1-60761-860-7_12). The MK cell preferably expresses detectable levels of one or more of, such as 2, 3, 4, 5, 6, 7 or 8 or more of, CD11b, CD11c, CD49d, CD51, CD86, CD106, CD117, CD202b and CD309. The MK cell preferably expresses detectable levels of CD11b, CD25, CD49d, CD51, CD86, CD106, CD117, CD202b and CD309. The MK cell preferably expresses detectable levels of CD11b, CD11c, CD25, CD49d, CD51, CD86, CD106, CD117, CD202b and CD309. The MK cell preferably expresses detectable levels of one or more of the TRAIL receptors, The MK cell preferably expresses detectable levels of one or more of, such as 2 or 3 or more of, CD261, CD262, CD263 and CD264. The MK cell preferably expresses detectable levels of CD261, CD262 and CD264. The MK cell preferably expresses detectable levels of CD261, CD262, CD263 and CD264. The MK cell preferably does not express detectable levels of one or more of, such as 2 or 3 or more of, CD184, CD195, CD197 and CD282. The MK cell preferably does not express detectable levels of CD184, CD195, CD197 and CD282.

The MK cell preferably expresses detectable levels of one or more of Toll-Like Receptors (TLR), especially TLR3, TLR4, TLR6, TLR8, TLR9 and TLR10. The MK cell preferably expresses detectable levels of one or more of, such as 2, 3, 4, 5 or more of, CD283, CD284, CD286, CD288, CD289 and CD290.

The MK cell of the invention preferably expresses detectable levels of one or more granzymes. Granzymes are a family of serine proteases that are expressed by cytotoxic T lymphocytes and NK cells and are involved in their cytotoxicity. Following receptor-mediated conjugate formation between a granzyme-containing cell and an infected or transformed target cell, granzymes enter the target cell via endocytosis and induce apoptosis (Trapani, J. A. Granzymes: a family of lymphocyte granule serine proteases. Genome Biol 2, reviews3014.1 (2001) doi:10.1186/gb-2001-2-12-reviews3014). The MK cell of the invention preferably expresses detectable levels of one or more of (a) granzyme B (GZMB), (b) granzyme H (GZMH), (c) granzyme M (GZMM), (d) granzyme A (GZMA) and (e) granzyme K (GZMK), such as (a); (b); (c); (d); (e); (a) and (b); (a) and (c); (a) and (d); (a) and (e); (b) and (c); (b) and (d); (b) and (e); (c) and (d); (c) and (e); (d) and (e); (a), (b) and (c); (a), (b) and (d); (a), (b) and (e); (a), (c) and (d); (a), (c) and (e); (a), (d) and (e); (b), (c) and (d); (b), (c) and (e); (b), (d) and (e); (c), (d) and (e); (a), (b), (c) and (d); (a), (b), (c) and (e); (a), (b), (d) and (e); (a), (c), (d) and (e); (b), (c), (d) and (e); and (a), (b), (c), (d) and (e). The expression of the one or more granzymes by the MK cell may be increased by exposure of the MK cell to a cancer cell, such as any of the cancer cells described herein. The MK cell of the invention preferably expresses perforin (PRF1). Perforin is a pore forming cytolytic protein found in the granules of cytotoxic T lymphocytes and NK cells (Osinska I, Popko K, Demkow U. Perforin: an important player in immune response. Cent Eur J Immunol. 2014; 39(1):109-115. doi:10.5114/ceji.2014.42135). The expression of perforin by the MK cell may be increased by exposure of the MK cell to a cancer cell, such as any of the cancer cells described herein. Any of the methods described above may be used to detect expression of one or more granzymes and/or perforin. The results in Examples 13 and 14 suggest at least a partial role of one or more granzymes and/or perforin in MK cell cytotoxicity.

The MK cell of the invention is typically capable of having cytotoxic effects on cancer cells (i.e. capable of killing cancer cells). The ability of the MK cell of the invention to have cytotoxic effects may be measured using standard assays known in the art. The invention preferably uses the chromium-51 ($^{51}Cr$) release assay, which measures $^{51}Cr$ release from cells, such as cancer cells, following lysis by the MK cells. MK cells can be incubated with cancer cells as discussed below and in the Examples. The invention also preferably uses the europium (Eu3+) release assay. Suitable cancers are discussed in more detail.

The MK cell of the invention also typically secretes a variety of cytokines and other molecules which facilitate its cytotoxic and NK priming functions. The cytokines and other molecules can be measured using methods known in the art. Suitable methods include, but are not limited to, enzyme-linked immunosorbent assays (ELISAs) and flow cytometry. One specific method is the Luminex® assay which is commercially available from Life Technologies®.

The MK cell preferably secretes detectable levels of one or more of (a) chemokine (C—X—C motif) ligand 1 (CXCL1 aka GROa), (b) interleukin-12 (IL-12), (c) soluble IL-2 receptor (IL-2Ra), (d) IL-8, (e) soluble TRAIL and (f) IL-6. The MK cell may secrete detectable levels of all of (a) to (f). The detectable secretion of these molecules may be measured as discussed above. In the definition of (a) to (f) given above, any combination and permutation of one or more of (a) to (f) may be secreted. For instance, for each definition of (a) to (f), the MK cells may secrete detectable levels of (a); (b); (c); (d); (e); (f); (a) and (b); (a) and (c); (a) and (d); (a) and (e); (a) and (f); (b) and (c); (b) and (d); (b) and (e); (b) and (f); (c) and (d); (c) and (e); (c) and (f); (d) and (e); (d) and (f); (e) and (f); (a), (b) and (c); (a), (b) and (d); (a), (b) and (e); (a), (b) and (f); (a), (c) and (d); (a), (c) and (e); (a), (c) and (f); (a), (d) and (e); (a), (d) and (f); (a), (e) and (f); (b), (c) and (d); (b), (c) and (e); (b), (c) and (f); (b), (d) and (e); (b), (d) and (f); (b), (e) and (f); (c), (d) and (e); (c), (d) and (f); (c), (e) and (f); (d), (e) and (f); (a), (b), (c) and (d); (a), (b), (c) and (e); (a), (b), (c) and (f); (a), (b), (d) and (e); (a), (b), (d) and (f); (a), (b), (e) and (f); (a), (c), (d) and (e); (a), (c), (d) and (f); (a), (c), (e) and (f); (a), (d), (e) and (f); (b), (c), (d) and (e); (b), (c), (d) and (f); (b), (c), (e) and (f); (b), (d), (e) and (f); (c), (d), (e) and (f); (a), (b), (c), (d) and (e); (a), (b), (c), (d) and (f); (a), (b), (c), (e) and (f); (a), (b), (d), (e) and (f); (a), (c), (d), (e) and (f); (b), (c), (d), (e) and (f); or (a), (b), (c), (d) and (e). The combinations of (i) to (vii) are independently selectable from this list. The MK cell preferably secretes detectable levels of (a) GROa, (b) interleukin-12 (IL-12), (c) IL-2 receptor alpha chain (IL-2Ra), (d) IL-8, (e) soluble TRAIL and (f) IL-6.

CXCL1 (aka GROa) is a chemokine capable of attracting neutrophils (Moser et al., J Exp Med. 1990 May 1; 171(5): 1797-1802). The secretion of GROa by the MK cell is increased by TNF-alpha.

IL-12 is a pro-inflammatory cytokine that is capable of promoting naïve T cells to differentiate into Th1 cells (Hsieh et al. (April 1993) Science. 260 (5107): 547-9) and increasing the cytotoxic activity ("priming") of NK cells (Lehmann et al., Br J Haematol. 2001 September; 114(3):660-5) and CD8+ T cells.

IL-2Ra is the soluble form of the IL-2 receptor. It is capable of pro-inflammatory effects by binding to IL-2. For instance, it is capable of enhancing the development of Th17 responses in mice (Russell S E, Moore A C, Fallon P G, Walsh P T (2012) Soluble IL-2Rα (sCD25) Exacerbates Autoimmunity and Enhances the Development of Th17 Responses in Mice. PLoS ONE 7(10): e47748. https://doi.org/10.1371/journal.pone.0047748). The secretion of L-2Ra by the MK cell is increased by IFN-gamma.

IL-8 is also known as neutrophil chemotactic factor attracts and activates neutrophils in inflammatory regions (Bickel, J Periodontol. 1993 May; 64 (5 Suppl):456-60). The secretion of IL-8 by the MK cell is reduced by IFN-gamma and increased by TNF-alpha.

Soluble TRAIL (the soluble extracellular domain of TRAIL) can induce apoptosis in a wide variety of tumour cell lines without affecting most normal cells. For instance, overexpression of soluble trail induces apoptosis in human lung adenocarcinoma and inhibits growth of tumour xenografts in nude mice (Shi et al. Cancer Res 2005; 65: (5). Mar. 1, 2005).

Although IL-6 is generally considered to be an anti-inflammatory cytokine, it is also capable of promoting the activation, proliferation and survival of lymphocytes during active immune responses (Fisher et al., Semin Immunol. 2014 February; 26(1):38-47).

The MK cell preferably secretes detectable levels of IL-15 and/or C—X—C motif chemokine 10 (CXCL10 also known as IFN gamma-induced protein 10 (IP-10)). The MK cell preferably secretes detectable levels of IL-15 and/or CXCL10 (IP-10) in combination with of one or more of (a) GROa, (b) interleukin-12 (IL-12), (c) IL-2Ra, (d) IL-8, (e) soluble TRAIL and (f) IL-6 discussed above. The detectable secretion of these molecules may be measured as discussed above.

IL-15 stimulates the proliferation of T, B and NK cells and induces stem, central and effector memory CD8 T cells and clinical trials using IL-15 and related molecules are being initiated (Waldmann, 2014, Expert Review of Clinical Immunology Volume 10, 2014—Issue 12).

CXCL10 (IP-10) is involved in the chemoattraction of monocytes, macrophages, T cells, NK cells and dendritic cells, the promotion of T cell adhesion to endothelial cells, antitumour activity and inhibition of bone marrow colony formation and angiogenesis (Dufour et al. 2002, Journal of Immunology. 168 (7): 3195-204; and Angiolillo et al., 1995, The Journal of Experimental Medicine. 182 (1): 155-62).

The MK cell preferably secretes detectable levels of one or more of interleukin-6 (IL-6), IL-8, Chemokine (C—C motif) ligand 2 (CCL2; monocyte chemotactic protein-1; MCP-1) and Chemokine (C—C motif) ligand 5 (CCL5; regulated on activation, normal T cell expressed and secreted; RANTES). The MK cell may secrete any number and combination of these factors. The MK cell preferably secretes all of these markers.

The MK cell of the invention may secrete detectable levels of one or more of (i) vascular endothelial growth factor (VEGF), (ii) transforming growth factor beta (TGF-beta), (iii) insulin-like growth factor-1 (IGF-1), (iv) fibroblast growth factor (FGF), (v) tumour necrosis factor alpha (TNF-alpha), (vi) IFN-gamma and (vii) interleukin-1 alpha (IL-1 alpha). The detectable secretion of these markers may be measured as discussed above.

In the definition of (i) to (vii) given above, any combination of one or more of (i) to (vii) may be secreted. For instance, for each definition of (i) to (vii), the MK cells may secrete detectable levels of (i); (ii); (iii); (iv); (v); (vi); (vii); (i) and (ii); (i) and (iii); (i) and (iv); (i) and (v); (i) and (vi); (i) and (vii); (ii) and (iii); (ii) and (iv); (ii) and (v); (ii) and (vi); (ii) and (vii); (iii) and (iv); (iii) and (v); (iii) and (vi); (iii) and (vii); (iv) and (v); (iv) and (vi); (iv) and (vii); (v) and (vi); (v) and (vii); (vi) and (vii); (i), (ii) and (iii); (i), (ii) and (iv); (i), (ii) and (v); (i), (ii) and (vi); (i), (ii) and (vii); (i), (iii) and (iv); (i), (iii) and (v); (i), (iii) and (vi); (i), (iii) and (vii); (i), (iv) and (v); (i), (iv) and (vi); (i), (iv) and (vii); (i), (v) and (vi); (i), (v) and (vii); (i), (vi) and (vii); (ii), (iii) and (iv); (ii), (iii) and (v); (ii), (iii) and (vi); (ii), (iii) and (vii); (ii), (iv) and (v); (ii), (iv) and (vi); (ii), (iv) and (vii); (ii), (v) and (vi); (ii), (v) and (vii); (ii), (vi) and (vii); (iii), (iv) and (v); (iii), (iv) and (vi); (iii), (iv) and (vii); (iii), (v) and (vi); (iii), (v) and (vii); (iii), (vi) and (vii); (iv), (v) and (vi); (iv), (v) and (vii); (iv), (vi) and (vii); (v), (vi) and (vii); (i), (ii), (iii) and (iv); (i), (ii), (iii) and (v); (i), (ii), (iii) and (vi); (i), (ii), (iii) and (vii); (i), (ii), (iv) and (v); (i), (ii), (iv) and (vi); (i), (ii), (iv) and (vii); (i), (ii), (v) and (vi); (i), (ii), (v) and (vii); (i), (ii), (vi) and (vii); (i), (iii), (iv) and (v); (i), (iii), (iv) and (vi); (i), (iii), (iv) and (vii); (i), (iii), (v) and (vi); (i), (iii), (v) and (vii); (i), (iii), (vi) and (vii); (i), (iv), (v) and (vi); (i), (iv), (v) and (vii); (i), (iv), (vi) and (vii); (i), (v), (vi) and (vii); (ii), (iii), (iv) and (v); (ii), (iii), (iv) and (vi); (ii), (iii), (iv) and (vii); (ii), (iii), (v) and (vi); (ii), (iii), (v) and (vii); (ii), (iii), (vi) and (vii); (ii), (iv), (v) and (vi); (ii), (iv), (v) and (vii); (ii), (iv), (vi) and (vii); (ii), (v), (vi) and (vii); (iii), (iv), (v) and (vi); (iii), (iv), (v) and (vii); (iii), (iv), (vi) and (vii); (iii), (v), (vi) and (vii); (iv), (v), (vi) and (vii); (i), (ii), (iii), (iv) and (v); (i), (ii), (iii), (iv) and (vii); (i), (ii), (iii), (v) and (vi); (i), (ii), (iii), (v) and (vii); (i), (ii), (iii), (vi) and (vii); (i), (ii), (iv), (v) and (vi); (i), (ii), (iv), (v) and (vii); (i), (ii), (iv), (vi) and (vii); (i), (ii), (v), (vi) and (vii); (i), (iii), (iv), (v) and (vi); (i), (iii), (iv), (v) and (vii); (i), (iii), (iv), (vi) and (vii); (i), (iii), (v), (vi) and (vii); (i), (iv), (v), (vi) and vii); (i), (ii), (iii), (iv), (v) and (vi); (i), (ii), (iii), (iv), (v) and (vii); (i), (ii), (iii), (iv), (vi) and (vii); (i), (ii), (iii), (v), (vi) and (vii); (i), (ii), (iv), (v), (vi) and (vii); (i), (iii), (iv), (v), (vi) and (vii); or (i), (ii), (iii), (iv), (v), (vi) and (vii). The combinations of (i) to (vii) are independently selectable from this list.

The MK cell of the invention preferably secretes a detectable level of IFN-gamma. IFN-gamma expression or secretion may be determined using the methods set out above.

As discussed in more detail below, the MK cell is capable of priming/activating NK cells (i.e. increasing the proliferation and/or cytotoxic activity of NK cells).

The MK cell of the invention is preferably capable of migrating to a specific tissue in a subject. In other words, when the cells are administered to a subject having a disease (such as cancer), the cells are capable of migrating or homing to the required tissue or tissues. The tissue may be a tissue that normally exists in a healthy subject. Alternatively, the tissue may be a tumour. This migratory capability of the MK cell is advantageous because it means that the cells can be infused via standard routes, for instance intravenously, and will then target the site of disease. The cells do not have to be delivered to the diseased tissue.

The specific tissue may be any of those discussed above. This applies not only to migration, but also adherence, transmigration, proliferation, anti-tumour effects, immunemodulatory effects, pro-inflammatory effects and anti-inflammatory effects as discussed in more detail above and below.

The ability of the MK cell of the invention to migrate to diseased tissue may be measured using standard assays known in the art. Suitable methods include, but are not limited to, genomic reverse transcription polymerase chain reaction (RT-PCR with or without reporter genes) and labelling techniques. Alternatively, the MK cell of the invention may be stained with a dye of interest, such as a fluorescent dye, and may be monitored in the subject via the signal from the dye. Such methods are routine in the art.

Migration (or homing) is typically determined by measuring the number of cells that arrive at the damaged tissue. It may also be measured indirectly by observing the numbers of cells that have accumulated in the lungs (rather than the damaged tissue).

The MK cell of the invention is preferably capable of adhering to a specific, diseased tissue in a subject. Adherence and adhesion assay are known in the art (Humphries, Methods Mol Biol. 2009; 522:203-10).

The MK cell of the invention is preferably capable of transmigrating through the vascular endothelium to a specific, diseased tissue in a subject. Transmigration assays are known in the art (Muller and Luscinskas, Methods Enzymol. 2008; 443: 155-176).

The MK cell of the invention is preferably capable of attracting or chemoattracting immune cells to a site of inflammation. The MK cell of the invention is more preferably capable of attracting or chemoattracting immune cells to cancer or a tumour. The MK cell of the invention is preferably capable of inducing migration of immune cells to a site of inflammation, cancer or a tumour. The MK cell of the invention is preferably pro-inflammatory. Preferably, the MK cell having any of these attracting/chemoattracting/pro-inflammatory effects is or has been treated with IFN-gamma. Any of the methods of discussed above for measuring the migration or movement of cells may be used to measure the attraction/chemoattraction/migration of immune cells. The immune cells may be lymphocytes, such as T cells, B cells or NK cells, neutrophils or monocytes/macrophages. The immune cells are preferably NK cells and/or immune cells.

The MK cell of the invention is preferably autologous. In other words, the cell is preferably derived from the subject into which the cell will be administered. Alternatively, the MK cell is preferably allogeneic. In other words, the cells is preferably derived from a different subject/donor or a subject/donor that is immunologically compatible with the subject into which the cells will be administered.

The MK cell of the invention may be isolated, substantially isolated, purified or substantially purified. The MK cell is isolated or purified if it is completely free of any other components, such as culture medium, other cells of the invention or other cell types. The MK cell is substantially isolated if it is mixed with carriers or diluents, such as culture medium, which will not interfere with its intended use. Alternatively, the MK cell of the invention may be present in a growth matrix or immobilized on a surface as discussed below.

The MK cell of the invention may be isolated using a variety of techniques including antibody-based techniques. Cells may be isolated using negative and positive selection techniques based on the binding of monoclonal antibodies to those surface markers which are present on the MK cell (see above). Hence, the MK cell may be separated using any antibody-based technique, including fluorescent activated cell sorting (FACS) and magnetic bead separation.

As discussed in more detail below, the MK cell may be treated ex vivo. Thus the cells may be loaded or transfected with a therapeutic or diagnostic agent and then used therapeutically in the methods of the invention.

Population of the Invention

The invention also provides a population of MK cells of the invention. The invention also provides a population of two or more MK cells of the invention. The MK cells may be any of those defined above. Any number of cells may be present in the population. The population of the invention may comprises at least about 5,000 cells, such as at least about 6,000, at least about 7,000, at least about 8,000, at least about 9,000, at least about 10,000, at least about 20,000, at least about 30,000, at least about 40,000 cells, at least about 50,000 cells, at least about 100,000 cells, at least about 200,000 cells or at least about 250,000 cells. The population of the invention preferably comprises at least about $5 \times 10^5$ MK cells of the invention. The population more preferably comprises at least about $1 \times 10^6$, at least about $2 \times 10^6$, at least about $2.5 \times 10^6$, at least about $5 \times 10^6$, at least about $1 \times 10^7$, at least about $2 \times 10^7$, at least about $5 \times 10^7$, at least about $1 \times 10^8$ or at least about $2 \times 10^8$ MK cells of the invention. In some instances, the population may comprise at least about $1.0 \times 10^7$, at least about $1.0 \times 10^8$, at least about $1.0 \times 10^9$, at least about $1.0 \times 10^{10}$, at least about $1.0 \times 10^{11}$ or at about least $1.0 \times 10^{12}$ MK cells of the invention or even more.

The population comprising MK cells of the invention may comprise other cells in addition to the MK cells of the invention. However, at least about 70% of the cells in the population are preferably MK cells of the invention. More preferably, at least about 75%, at least about 80%, at least about 85%, at least about 90%, at least about 97%, at least about 98% or at least about 99% of the cells in the population are MK cells of the invention. In a preferred embodiment, at least about 70%, at least about 75%, at least about 80% or at least about 85% of the cells in the population are MK cells, express the positive MK markers defined above and do not express the negative MK markers defined above. In another preferred embodiment, at least about 90% of the cells in the population are MK cells, express the positive MK markers defined above and do not express the negative MK markers defined above. In another preferred embodiment, at least about 95% of the cells in the population are MK cells, express the positive MK markers defined above and do not express the negative MK markers defined above.

The invention also provides a population of MK cells of the invention, wherein greater than about 15% of the cells in the population express detectable levels of CD112, CD137L, CD178, CD253 and CD277 and wherein about 5% or fewer of the cells in the population express detectable levels of CD34 and CD45. In these populations, greater than about 15% of the cells in the population (or any of the % s discussed above) may express detectable levels of the specific markers discussed above as being detectably expressed by the MK cell of the invention. Similarly, about 5% or fewer (or any of the lower % s discussed above) may express detectable levels of the specific markers discussed above as not being detectably expressed by the MK cell of the invention. These populations may comprise any of the numbers of cells set out above. Table 1 sets out specific populations of the invention.

TABLE 1

Preferred populations of the invention (where "one or more of" is defined above with reference to specific markers, the definition applies to use of the term in relation to those markers the Table; * = the combination of markers in the left-hand column of the relevant populations)

| # | Greater than about 15% of the cells express | About 5% or fewer of the cells express |
|---|---|---|
| 1 | CD112, CD137L, CD178, CD253 and CD277 | a) CD34 and CD45<br>b) a) and CD14<br>c) a) and CD102 and/or CD127<br>d) b) and CD102 and/or CD127<br>e) any of a) to d) and one or more of CD50, CD62E, CD62L, and CD62P<br>f) any of a) to d) and all of CD50, CD62E, CD62L, and CD62P<br>g) any of a) to f) and CD159c |
| 2 | CD25, CD112, CD137L, CD178, CD253 and CD277 | Any of a) to g) in population 1 |
| 3 | CD112, CD136, CD137L, CD178, CD253 and CD277 | Any of a) to g) in population 1 |
| 4 | CD112, CD137L, CD155, CD178, CD253 and CD277 | Any of a) to g) in population 1 |
| 5 | CD112, CD137L, CD178, CD183, CD253 and CD277 | Any of a) to g) in population 1 |
| 6 | CD112, CD137L, CD178, CD205, CD253 and CD277 | Any of a) to g) in population 1 |
| 7 | CD112, CD137L, CD178, CD253, CD277 and CD332 | Any of a) to g) in population 1 |
| 8 | CD112, CD137L, CD178, CD253, CD277 and CD328 | Any of a) to g) in population 1 |
| 9 | CD25, CD112, CD136, CD137L, CD178, CD205, CD253, CD277 and CD332 | Any of a) to g) in population 1 |
| 10 | CD112, CD137L, CD155, CD178, CD183 CD253 and CD277 | Any of a) to g) in population 1 |
| 11 | CD25, CD112, CD136, CD137L, CD178, CD205, CD253, CD277, CD332 and CD328 | Any of a) to g) in population 1 |
| 12 | CD112, CD137L, CD155, CD178, CD183 CD253, CD277 and CD328 | Any of a) to g) in population 1 |
| 13 | CD25, CD112, CD136, CD137L, CD155, CD178, CD183, CD205, CD253, CD277 and CD332 | Any of a) to g) in population 1 |
| 14 | CD25, CD112, CD136, CD137L, CD155, CD178, CD183, CD205, CD253, CD277, CD332 and CD328 | Any of a) to g) in population 1 |
| 15 | The combination of markers* in any of populations 1 to 14 and CD16 and/or CD96. | Any of a) to g) in population 1 |
| 16 | The combination of markers* in any of populations 1 to 15 and one or more of, such as all of, CD158d, CD158i, CD160, CD314 and CD337 | Any of a) to g) in population 1 |
| 17 | Any of the markers in rows 1 to 15 and one or more of, such as all of, CD158d, CD158i, CD160, CD314, CD337 and CD159c | Any of a) to f) in population 1 |
| 18 | The combination of markers* in any of populations 1 to 15 and one or more of, such as all of, CD158b2, CD158f and CD159a | Any of a) to g) in population 1 |
| 19 | The combination of markers* in any of populations 1 to 15 and one or more of CD158d, CD158i, CD160, CD314 and CD337 and one or more of CD158b2, CD158f and CD159a<br>The combination of markers* in any of populations 1 to 15 and all of CD158d, CD158i, CD160, CD314 and CD337 and all of CD158b2, CD158f and CD159a | Any of a) to g) in population 1 |
| 20 | The combination of markers* in any of populations 1 to 15 and one or more of CD158d, CD158i, CD160, CD314, CD337 and CD159c and one or more of CD158b2, CD158f and CD159a<br>The combination of markers* in any of populations 1 to 15 and all of CD158d, CD158i, CD160, CD314, CD337 and CD159c and all of CD158b2, CD158f and CD159a | Any of a) to f) in population 1 |
| 21 | The combination of markers* in any of populations 1 to 16, 18 and 19 and one or more of CD11b, CD11c, CD49d, CD51, CD86, CD106, CD117, CD202b and CD309 | Any of a) to g) in population 1 |

TABLE 1-continued

Preferred populations of the invention (where "one or more of" is
defined above with reference to specific markers, the definition applies
to use of the term in relation to those markers the Table; * = the combination
of markers in the left-hand column of the relevant populations)

| # | Greater than about 15% of the cells express | About 5% or fewer of the cells express |
|---|---|---|
| 22 | Row 17 or 20 and one or more of CD11b, CD11c, CD49d, CD51, CD86, CD106, CD117, CD202b and CD309 | Any of a) to f) in population 1 |
| 23 | The combination of markers* in any of populations 1 to 16, 18, 19 and 21 and one or more of CD261, CD262, CD263 and CD264 | Any of a) to g) in population 1 |
| 24 | Row 17, 20 or 22 and one or more of CD261, CD262, CD263 and CD264 | Any of a) to f) in population 1 |
| 25 | The combination of markers* in any of populations 1 to 16, 18, 19, 21 and 23 and one or more of CD283, CD284, CD286, CD288, CD289 and CD290 | Any of a) to g) in population 1 |
| 26 | The combination of markers* in any of populations 17, 20, 22 and 24 and one or more of CD283, CD284, CD286, CD288, CD289 and CD290 | Any of a) to f) in population 1 |
| 27 | The combination of markers* in any of populations 1 to 16, 18, 19, 21, 23 and 25 | Any of a) to g) in population 1 Any of a) to g) in population 1 and i) CD56, ii) one or more of CD244, CD335 and CD352, iii) one or more of CD184, CD195, CD197 and CD282, iv) i) and ii), v) i) and iii), vi) ii) and iii) or vii) i), ii) and iii) |
| 28 | The combination of markers* in any of populations 17, 20, 22, 24 and 26 | Any of a) to f) in population 1 Any of a) to f) in population 1 and i) CD56, ii) one or more of CD244, CD335 and CD352, iii) one or more of CD184, CD195, CD197 and CD282, iv) i) and ii), v) i) and iii), vi) ii) and iii) or vii) i), ii) and iii) |

In the populations discussed above and set out in Table 1, about 20% or greater, about 25% of greater, about 30% or greater, about 35% or greater, about 40% or greater, about 45% or greater, about 50% or greater, about 55% or greater, about 60% or greater, about 65% or greater, about 70% or greater, about 75% or greater, about 80% or greater, about 85% or greater, about 90% or greater, about 95% or greater, about 96% or greater, about 97% or greater, about 98% or greater or about 99% or of the cells in the population preferably express detectable levels of the relevant markers (especially the markers in column 2 of Table 1). In the populations discussed above and set out in Table 1, about 60% or greater of the cells in the population more preferably express detectable levels of the relevant markers (especially the markers in column 2 of Table 1). In the populations discussed above and set out in Table 1, about 70%, about 75%, about 80%, about 85%, about 90% or about 95% or greater of the cells in the population more preferably express detectable levels of the relevant markers (especially the markers in column 2 of Table 1). In the populations discussed above and set out in Table 1, about 4% or fewer, about 3% or fewer, about 2% or fewer, about 1% or fewer or about 0.5% or fewer of the cells in the population may express detectable levels of the relevant markers (especially the markers in column 3 of Table 1).

The invention also provides a population of MK cells of the invention, wherein greater than about 15% of the cells in the population express detectable levels of CD16, CD96, CD112, CD137L, CD178, CD253 and CD277 and wherein about 5% or fewer of the cells in the population express detectable levels of CD34, CD45 and CD56. In these populations, greater than about 15% of the cells in the population (or any of the %s discussed above) may express detectable levels of the specific markers discussed above as being detectably expressed by the MK cell of the invention. Similarly, about 5% or fewer (or any of the lower %s discussed above) may express detectable levels of the specific markers discussed above as not being detectably expressed by the MK cell of the invention. These populations may comprise any of the numbers of cells set out above. Table 2 sets out specific populations of the invention.

TABLE 2

Preferred populations of the invention (where "one or more of" is
defined above with reference to specific markers, the definition applies
to use of the term in relation to those markers the Table; * = the combination
of markers in the left-hand column of the relevant populations)

| # | Greater than about 15% of the cells express | About 5% or fewer of the cells express |
|---|---|---|
| 1 | CD16, CD96, CD112, CD137L, CD178, CD253 and CD277 | a) CD34, CD45 and CD56<br>b) a) and CD14<br>c) a) and CD102 and/or CD127<br>d) b) and CD102 and/or CD127 |

TABLE 2-continued

Preferred populations of the invention (where "one or more of" is defined above with reference to specific markers, the definition applies to use of the term in relation to those markers the Table; * = the combination of markers in the left-hand column of the relevant populations)

| # | Greater than about 15% of the cells express | About 5% or fewer of the cells express |
|---|---|---|
|  |  | e) any of a) to d) and one or more of CD50, CD62E, CD62L, and CD62P<br>f) any of a) to d) and all of CD50, CD62E, CD62L, and CD62P<br>g) any of a) to f) and CD159c |
| 2 | CD16, CD25, CD96, CD112, CD137L, CD178, CD253 and CD277 | Any of a) to g) in population 1 |
| 3 | CD16, CD96, CD112, CD136, CD137L, CD178, CD253 and CD277 | Any of a) to g) in population 1 |
| 4 | CD16, CD96, CD112, CD137L, CD155, CD178, CD253 and CD277 | Any of a) to g) in population 1 |
| 5 | CD16, CD96, CD112, CD137L, CD178, CD183, CD253 and CD277 | Any of a) to g) in population 1 |
| 6 | CD16, CD96, CD112, CD137L, CD178, CD205, CD253 and CD277 | Any of a) to g) in population 1 |
| 7 | CD16, CD96, CD112, CD137L, CD178, CD253, CD277 and CD332 | Any of a) to g) in population 1 |
| 8 | CD16, CD96, CD112, CD137L, CD178, CD253, CD277 and CD328 | Any of a) to g) in population 1 |
| 9 | CD16, CD25, CD96, CD112, CD136, CD137L, CD178, CD205, CD253, CD277 and CD332 | Any of a) to g) in population 1 |
| 10 | CD16, CD96, CD112, CD137L, CD155, CD178, CD183 CD253 and CD277 | Any of a) to g) in population 1 |
| 11 | CD16, CD25, CD96, CD112, CD136, CD137L, CD178, CD205, CD253, CD277, CD332 and CD328 | Any of a) to g) in population 1 |
| 12 | CD16, CD96, CD112, CD137L, CD155, CD178, CD183 CD253, CD277 and CD328 | Any of a) to g) in population 1 |
| 13 | CD16, CD25, CD96, CD112, CD136, CD137L, CD155, CD178, CD183, CD205, CD253, CD277 and CD332 | Any of a) to g) in population 1 |
| 14 | CD16, CD25, CD96, CD112, CD136, CD137L, CD155, CD178, CD183, CD205, CD253, CD277, CD332 and CD328 | Any of a) to g) in population 1 |
| 15 | The combination of markers* in any of populations 1 to 14 and one or more of, such as all of, CD158d, CD158i, CD160, CD314 and CD337 | Any of a) to g) in population 1 |
| 16 | The combination of markers* in any of populations 1 to 14 and one or more of, such as all of, CD158d, CD158i, CD160, CD314, CD337 and CD159c | Any of a) to f) in population 1 |
| 17 | The combination of markers* in any of populations 1 to 14 and one or more of, such as all of, CD158b2, CD158f and CD159a | Any of a) to g) in population 1 |
| 18 | The combination of markers* in any of populations 1 to 14 and one or more of CD158d, CD158i, CD160, CD314 and CD337 and one or more of CD158b2, CD158f and CD159a<br>The combination of markers* in any of populations 1 to 14 and all of CD158d, CD158i, CD160, CD314 and CD337 and all of CD158b2, CD158f and CD159a | Any of a) to g) in population 1 |
| 19 | The combination of markers* in any of populations 1 to 14 and one or more of CD158d, CD158i, CD160, CD314, CD337 and CD159c and one or more of CD158b2, CD158f and CD159a<br>The combination of markers* in any of populations 1 to 14 and all of CD158d, CD158i, CD160, CD314, CD337 and CD159c and all of CD158b2, CD158f and CD159a | Any of a) to f) in population 1 |
| 20 | The combination of markers* in any of populations 1 to 15, 17 and 18 and one or more of CD11b, CD11c, CD49d, CD51, CD86, CD106, CD117, CD202b and CD309 | Any of a) to g) in population 1 |
| 21 | Row 16 or 19 and one or more of CD11b, CD11c, CD49d, CD51, CD86, CD106, CD117, CD202b and CD309 | Any of a) to f) in population 1 |

TABLE 2-continued

Preferred populations of the invention (where "one or more of" is defined above with reference to specific markers, the definition applies to use of the term in relation to those markers the Table; * = the combination of markers in the left-hand column of the relevant populations)

| # | Greater than about 15% of the cells express | About 5% or fewer of the cells express |
|---|---|---|
| 22 | The combination of markers* in any of populations 1 to 15, 17, 18 and 20 and one or more of CD261, CD262, CD263 and CD264 | Any of a) to g) in population 1 |
| 23 | Row 16, 19 or 21 and one or more of CD261, CD262, CD263 and CD264 | Any of a) to f) in population 1 |
| 24 | The combination of markers* in any of populations 1 to 15, 17, 18, 20 and 22 and one or more of CD283, CD284, CD286, CD288, CD289 and CD290 | Any of a) to g) in population 1 |
| 25 | The combination of markers* in any of populations 16, 19, 21 and 23 and one or more of CD283, CD284, CD286, CD288, CD289 and CD290 | Any of a) to f) in population 1 |
| 26 | The combination of markers* in any of populations 1 to 15, 17, 18, 20, 22 and 24 | Any of a) to g) in population 1<br>Any of a) to g) in population 1 and one or more of CD244, CD335 and CD352<br>Any of a) to g) in population 1 and one or more of CD184, CD195, CD197 and CD282<br>Any of a) to g) in population 1, one or more of CD244, CD335 and CD352 and one or more of CD184, CD195, CD197 and CD282 |
| 27 | The combination of markers* in any of populations 16, 19, 21, 23 and 25 | Any of a) to f) in population 1<br>Any of a) to f) in population 1 and one or more of CD244, CD335 and CD352<br>Any of a) to f) in population 1 and one or more of CD184, CD195, CD197 and CD282<br>Any of a) to f) in population 1, one or more of CD244, CD335 and CD352 and one or more of CD184, CD195, CD197 and CD282 |

In the populations discussed above and set out in Table 2, about 20% or greater, about 25% of greater, about 30% or greater, about 35% or greater, about 40% or greater, about 45% or greater, about 50% or greater, about 55% or greater, about 60% or greater, about 65% or greater, about 70% or greater, about 75% or greater, about 80% or greater, about 85% or greater, about 90% or greater, about 95% or greater, about 96% or greater, about 97% or greater, about 98% or greater or about 99% or of the cells in the population preferably express detectable levels of the relevant markers (especially the markers in column 2 of Table 2). In the populations discussed above and set out in Table 2, about 60% or greater of the cells in the population more preferably express detectable levels of the relevant markers (especially the markers in column 2 of Table 2). In the populations discussed above and set out in Table 2, about 70%, about 75%, about 80%, about 85%, about 90% or about 95% or greater of the cells in the population more preferably express detectable levels of the relevant markers (especially the markers in column 2 of Table 2). In the populations discussed above and set out in Table 2, about 4% or fewer, about 3% or fewer, about 2% or fewer, about 1% or fewer or about 0.5% or fewer of the cells in the population may express detectable levels of the relevant markers (especially the markers in column 3 of Table 2).

The invention also provides specific populations of MK cells. The invention provides a population of MK cells, wherein
(i) at least about 20%, such as at least about 25%, at least about 27%, at least about 30%, at least about 40%, at least about 50%, at least about 60%, at least about 61% or at least about 62%, of the cells in the population express a detectable level of CD112,
(ii) at least about 80%, such as at least about 90%, at least about 95%, at least about 96% or at least about 97%, of the cells in the population express a detectable level of CD137L,
(iii) at least about 20%, such as at least about 21%, at least about 30%, at least about 40%, at least about 50% or at least about 60%, of the cells in the population express a detectable level of CD178,
(iv) at least about 50%, such as at least about 60%, at least about 70%, at least about 80%, at least about 90%, at least about 92% or at least about 93%, of the cells in the population express a detectable level of CD253, and
(v) at least about 50%, such as at least about 60%, at least about 70%, at least about 80%, at least about 90%, at least about 95%, at least about 96% or at least about 97%, of the cells in the population express a detectable level of CD277, and wherein
(a) about 5% or fewer, such as about 4% or fewer, about 3% or fewer, about 2% or fewer, about 1% or fewer or about 0.5% or fewer, of the cells in the population express a detectable level of CD34, and
(b) about 5% or fewer, such as about 4% or fewer, about 3% or fewer, about 2% or fewer or about 1% or fewer, of the cells in the population express a detectable level of CD45.

The invention also provides a population of MK cells, wherein
(i) at least about 15%, such as at least about 18%, at least about 20%, at least about 30%, at least about 40%, at least about 50%, at least about 60%, at least about 65% ot at least about 66%, of the cells in the population express a detectable level of CD16, (ii) at least about 50%, such as at least about 58%, at least about 60%, at least about 70%, at least about 80%, at least about 85% or at least about 86%, of the cells in the population express a detectable level of CD96,
(iii) at least about 20%, such as at least about 25%, at least about 27%, at least about 30%, at least about 40%, at least about 50%, at least about 60%, at least about 61% or at least about 62%, of the cells in the population express a detectable level of CD112,
(iv) at least about 80%, such as at least about 90%, at least about 95%, at least about 96% or at least about 97%, of the cells in the population express a detectable level of CD137L,
(v) at least about 20%, such as at least about 21%, at least about 30%, at least about 40%, at least about 50% or at least about 60%, of the cells in the population express a detectable level of CD178,
(vi) at least about 50%, such as at least about 60%, at least about 70%, at least about 80%, at least about 90%, at least about 92% or at least about 93%, of the cells in the population express a detectable level of CD253, and
(vii) at least about 50%, such as at least about 60%, at least about 70%, at least about 80%, at least about 90%, at least about 95%, at least about 96% or at least about 97%, of the cells in the population express a detectable level of CD277, and wherein
(a) about 5% or fewer, such as about 4% or fewer, about 3% or fewer, about 2% or fewer, about 1% or fewer or about 0.5% or fewer, of the cells in the population express a detectable level of CD34,
(b) about 5% or fewer, such as about 4% or fewer, about 3% or fewer, about 2% or fewer or about 1% or fewer, of the cells in the population express a detectable level of CD45, and
(c) about 5% or fewer, such as about 4% or fewer or about 3% or fewer, of the cells in the population express a detectable level of CD56.

Preferably wherein, one or more, or more preferably all, of:
about 10% or fewer, such as about 9% or fewer, about 5% or fewer, about 4% or fewer, about 3% or fewer, about 2% or fewer or about 1% or fewer, of the cells in the population express a detectable level of CD14;
at least about 5%, such as at least about 7%, at least about 10%, at least about 20%, at least about 30% at least about 40%, at least about 50% or at least about 54%, of the cells in the population express a detectable level of CD25;
at least about 10%, such as at least about 20%, at least about 30%, at least about 40%, at least about 50%, at least about 60%, at least about 69%, at least about 70% or at least about 80%, of the cells in the population express a detectable level of CD136;
at least about 90%, such as at least about 95%, at least about 97%, at least about 98% or at least about 99%, of the cells in the population express a detectable level of CD155;
at least about 20%, such as at least about 30%, at least about 40%, at least about 50% or at least about 51%, of the cells in the population express a detectable level of CD183;
at least about 10%, such as at least about 15%, at least about 20%, at least about 30% or at least about 32%, of the cells in the population express a detectable level of CD205;
at least about 9%, such as at least about 10%, at least about 20%, at least about 25% or at least about 29%, of the cells in the population express a detectable level of CD332;
about 2% or fewer, such as about 1% or fewer or about 0.5% or fewer, of the cells in the population express a detectable level of CD102;
about 2% or fewer, such as about 1% or fewer or about 0.5% or fewer, of the cells in the population express a detectable level of CD127;
about 10% or fewer, such as about 9% or fewer, about 5% or fewer, about 4% or fewer, about 3% or fewer, about 2% or fewer or about 1% or fewer, of the cells in the population express a detectable level of CD104;
about 60% or fewer, such as about 50% or fewer, about 46% or fewer, about 30% or fewer or about 20%, of the cells in the population express a detectable level of CD126;
at least about 15%, such as at least about 20%, at least about 30%, at least about 40%, at least about 50%, at least about 60%, at least about 70%, at least about 80%, at least about 90%, or at least about 95%, of the cells in the population express a detectable level of CD126;
about 3% or fewer, such as about 2% or fewer or about 1% or fewer, of the cells in the population express a detectable level of CD62E;
about 5% or fewer, such as about 4% or fewer, about 3% or fewer, about 2% or fewer, about 1% or fewer or about 0.5% or fewer, of the cells in the population express a detectable level of CD62L;
about 1% or fewer, such as about 0.5% or fewer, of the cells in the population express a detectable level of CD62P;
at least about 30%, such as at least about 33%, at least about 40%, at least about 50%, at least about 55%, or at least about 59%, of the cells in the population express a detectable level of CD158d;
at least about 22%, such as at least about 25%, at least about 30%, at least about 40%, at least about 50%, at least about 60% or at least about 61%, of the cells in the population express a detectable level of CD158i;
at least about 30%, such as at least about 40%, at least about 45%, at least about 50% or at least about 51%, of the cells in the population express a detectable level of CD160;
at least about 40%, such as at least about 45%, at least about 48%, at least about 50% or at least about 54%, of the cells in the population express a detectable level of CD314;
at least about 30%, such as at least about 35%, at least about 40% or at least about 50%, at least about 60%, at least about 70% or at least about 72%, of the cells in the population express a detectable level of CD337;
at least about 6% or at least about 10% of the cells in the population express a detectable level of CD159c;
at least about 7%, such as at least about 10%, at least about 15%, at least about 20% or at least about 23%, of the cells in the population express a detectable level of CD158b2;
at least about 30%, such as at least about 40%, at least about 41%, at least about 50%, at least about 60%, at least about 70%, at least about 80% or at least about 87%, of the cells in the population express a detectable level of CD158f; and
at least about 8%, such as at least about 10%, at least about 20%, at least about 30%, at least about 40%, at least about 50% or at least about 51%, of the cells in the population express a detectable level of CD159a.

Preferably wherein about 3% or fewer, such as about 2.5% or fewer, of the cells in the population express a detectable level of CD159c.

The specific population of the invention may be defined as above with reference to any of the combination of markers shown in Table 1 or 2.

The invention also provides specific populations of the invention based around MK002 and MK004 in Example 3. The invention preferably provides a population of MK cells, wherein
- (i) at least about 62% of the cells in the population express a detectable level of CD112,
- (ii) at least about 97% of the cells in the population express a detectable level of CD137L,
- (iii) at least about 60% of the cells in the population express a detectable level of CD178,
- (iv) at least about 93% of the cells in the population express a detectable level of CD253, and
- (v) at least about 97% of the cells in the population express a detectable level of CD277, and wherein
- (a) about 0.5% or fewer of the cells in the population express a detectable level of CD34, and
- (b) about 4% or fewer of the cells in the population express a detectable level of CD45.

The invention preferably provides a population of MK cells, wherein
- (i) at least about 66% of the cells in the population express a detectable level of CD16,
- (ii) at least about 86% of the cells in the population express a detectable level of CD96,
- (iii) at least about 62% of the cells in the population express a detectable level of CD112,
- (iv) at least about 97% of the cells in the population express a detectable level of CD137L,
- (v) at least about 60% of the cells in the population express a detectable level of CD178,
- (vi) at least about 93% of the cells in the population express a detectable level of CD253, and
- (vii) at least about 97% of the cells in the population express a detectable level of CD277,
and wherein
- (a) about 0.5% or fewer of the cells in the population express a detectable level of CD34,
- (b) about 4% or fewer of the cells in the population express a detectable level of CD45, and
- (c) about 3% or fewer of the cells in the population express a detectable level of CD56.

Preferably wherein, one or more, or more preferably all, of:
- about 9% or fewer of the cells in the population express a detectable level of CD14;
- at least about 54% of the cells in the population express a detectable level of CD25;
- at least about 80% of the cells in the population express a detectable level of CD136;
- at least about 99% of the cells in the population express a detectable level of CD155;
- at least about 51% of the cells in the population express a detectable level of CD183;
- at least about 32% of the cells in the population express a detectable level of CD205;
- at least about 29% of the cells in the population express a detectable level of CD332;
- about 2% or fewer of the cells in the population express a detectable level of CD102;
- about 2% or fewer of the cells in the population express a detectable level of CD127;
- about 9% or fewer of the cells in the population express a detectable level of CD104;
- about 46% or fewer of the cells in the population express a detectable level of CD126 or at least about 45% of the cells in the population express a detectable level of CD126;
- about 3% or fewer of the cells in the population express a detectable level of CD62E;
- about 5% or fewer of the cells in the population express a detectable level of CD62L;
- about 1% or fewer of the cells in the population express a detectable level of CD62P;
- at least about 59% of the cells in the population express a detectable level of CD158d;
- at least about 61% of the cells in the population express a detectable level of CD158i;
- at least about 40% of the cells in the population express a detectable level of CD160;
- at least about 54% of the cells in the population express a detectable level of CD314;
- at least about 72% of the cells in the population express a detectable level of CD337;
- at least about 10% of the cells in the population express a detectable level of CD159c;
- at least about 23% of the cells in the population express a detectable level of CD158b2;
- at least about 87% of the cells in the population express a detectable level of CD158f; and
- at least about 51% of the cells in the population express a detectable level of CD159a.

The specific population of the invention may be defined with reference to any of the combination of markers shown in Table 1 or 2. The population most preferably has the marker expression pattern of MK002 shown in Table 7.

The invention preferably provides a population of MK cells, wherein
- (i) at least about 27% of the cells in the population express a detectable level of CD112,
- (ii) at least about 97% of the cells in the population express a detectable level of CD137L,
- (iii) at least about 21% of the cells in the population express a detectable level of CD178,
- (iv) at least about 93% of the cells in the population express a detectable level of CD253, and
- (v) at least about 96% of the cells in the population express a detectable level of CD277,
and wherein
- (a) about 0.5% or fewer of the cells in the population express a detectable level of CD34, and
- (b) about 1% or fewer of the cells in the population express a detectable level of CD45.

The invention preferably provides a population of MK cells, wherein
- (i) at least about 18% of the cells in the population express a detectable level of CD16,
- (ii) at least about 58% of the cells in the population express a detectable level of CD96,
- (iii) at least about 27% of the cells in the population express a detectable level of CD112,
- (iv) at least about 97% of the cells in the population express a detectable level of CD137L,
- (v) at least about 21% of the cells in the population express a detectable level of CD178,
- (vi) at least about 93% of the cells in the population express a detectable level of CD253, and (vii) at least about 96% of the cells in the population express a detectable level of CD277,
and wherein
(a) about 0.5% or fewer of the cells in the population express a detectable level of CD34,
(b) about 1% or fewer of the cells in the population express a detectable level of CD45, and
(c) about 5% or fewer of the cells in the population express a detectable level of CD56.

Preferably wherein, one or more, or more preferably all, of:
about 1% or fewer of the cells in the population express a detectable level of CD14;
at least about 7% of the cells in the population express a detectable level of CD25;
at least about 69% of the cells in the population express a detectable level of CD136;
at least about 99% of the cells in the population express a detectable level of CD155;
at least about 20% of the cells in the population express a detectable level of CD183;
at least about 15% of the cells in the population express a detectable level of CD205;
at least about 9% of the cells in the population express a detectable level of CD332;
about 0.5% or fewer of the cells in the population express a detectable level of CD102;
about 2% or fewer of the cells in the population express a detectable level of CD127;
about 2% or fewer of the cells in the population express a detectable level of CD104;
about 20% or fewer of the cells in the population express a detectable level of CD126 or at least about 19% of the cells in the population express a detectable level of CD126;
about 1% or fewer of the cells in the population express a detectable level of CD62E;
about 0.5% or fewer of the cells in the population express a detectable level of CD62L;
about 0.5% or fewer of the cells in the population express a detectable level of CD62P;
at least about 33% of the cells in the population express a detectable level of CD158d;
at least about 22% of the cells in the population express a detectable level of CD158i;
at least about 51%, of the cells in the population express a detectable level of CD160;
at least about 48% of the cells in the population express a detectable level of CD314;
at least about 35% of the cells in the population express a detectable level of CD337;
about 2.5% or fewer of the cells in the population express a detectable level of CD159c;
at least about 7% of the cells in the population express a detectable level of CD158b2;
at least about 41% of the cells in the population express a detectable level of CD158f; and
at least about 8% of the cells in the population express a detectable level of CD159a.

The specific population of the invention may be defined with reference to any of the combination of markers shown in Table 1 or 2. The population most preferably has the marker expression pattern of MK004 shown in Table 7.

The invention preferably provides a population of MK cells, wherein
(i) at least about 46% of the cells in the population express a detectable level of CD112,
(ii) at least about 91% of the cells in the population express a detectable level of CD137L,
(iii) at least about 65% of the cells in the population express a detectable level of CD178,
(iv) at least about 88% of the cells in the population express a detectable level of CD253, and
(v) at least about 96% of the cells in the population express a detectable level of CD277,
and wherein
(a) about 1.5% or fewer of the cells in the population express a detectable level of CD34, and
(b) about 4.5% or fewer of the cells in the population express a detectable level of CD45.

The invention preferably provides a population of MK cells, wherein
(i) at least about 34% of the cells in the population express a detectable level of CD16,
(ii) at least about 83% of the cells in the population express a detectable level of CD96,
(iii) at least about 46% of the cells in the population express a detectable level of CD112,
(iv) at least about 91% of the cells in the population express a detectable level of CD137L,
(v) at least about 65% of the cells in the population express a detectable level of CD178,
(vi) at least about 88% of the cells in the population express a detectable level of CD253, and
(vii) at least about 96% of the cells in the population express a detectable level of CD277,
and wherein
(a) about 1.5% or fewer of the cells in the population express a detectable level of CD34,
(b) about 4.5% or fewer of the cells in the population express a detectable level of CD45, and
(c) about 1% or fewer of the cells in the population express a detectable level of CD56.

Preferably wherein, one or more, or more preferably all, of:
about 4% or fewer of the cells in the population express a detectable level of CD14;
at least about 43% of the cells in the population express a detectable level of CD25;
at least about 79% of the cells in the population express a detectable level of CD136;
at least about 99% of the cells in the population express a detectable level of CD155;
at least about 39% of the cells in the population express a detectable level of CD183;
at least about 46% of the cells in the population express a detectable level of CD205;
at least about 23% of the cells in the population express a detectable level of CD332;
about 1.5% or fewer of the cells in the population express a detectable level of CD102;
at least about 6% of the cells in the population express a detectable level of CD127;
at least about 16% of the cells in the population express a detectable level of CD104;
at least about 54% of the cells in the population express a detectable level of CD126;
about 4% or fewer of the cells in the population express a detectable level of CD62E;
at least about 11% of the cells in the population express a detectable level of CD62L;
about 2.5% or fewer of the cells in the population express a detectable level of CD62P;

at least about 37% of the cells in the population express a detectable level of CD158d;
at least about 44% of the cells in the population express a detectable level of CD158i;
at least about 78%, of the cells in the population express a detectable level of CD160;
at least about 76% of the cells in the population express a detectable level of CD314;
at least about 49% of the cells in the population express a detectable level of CD337;
at least about 14% of the cells in the population express a detectable level of CD159c;
at least about 21% of the cells in the population express a detectable level of CD158b2;
at least about 48% of the cells in the population express a detectable level of CD158f; and
at least about 34% of the cells in the population express a detectable level of CD159a.

The specific population of the invention may be defined with reference to any of the combination of markers shown in Table 1 or 2. The population most preferably has the marker expression pattern of IFN-gamma treated MK004 shown in Table 11.

The invention preferably provides a population of MK cells, wherein
(i) at least about 23% of the cells in the population express a detectable level of CD112,
(ii) at least about 79% of the cells in the population express a detectable level of CD137L,
(iii) at least about 30% of the cells in the population express a detectable level of CD178,
(iv) at least about 77% of the cells in the population express a detectable level of CD253, and
(v) at least about 82% of the cells in the population express a detectable level of CD277,
and wherein
(a) about 0.5% or fewer of the cells in the population express a detectable level of CD34, and
(b) about 2% or fewer of the cells in the population express a detectable level of CD45.

The invention preferably provides a population of MK cells, wherein
(i) at least about 16% of the cells in the population express a detectable level of CD16,
(ii) at least about 45% of the cells in the population express a detectable level of CD96,
(iii) at least about 23% of the cells in the population express a detectable level of CD112,
(iv) at least about 79% of the cells in the population express a detectable level of CD137L,
(v) at least about 30% of the cells in the population express a detectable level of CD178,
(vi) at least about 77% of the cells in the population express a detectable level of CD253, and
(vii) at least about 82% of the cells in the population express a detectable level of CD277,
wherein
(a) about 0.5% or fewer of the cells in the population express a detectable level of CD34, and
(b) about 2% or fewer of the cells in the population express a detectable level of CD45,
and wherein
about 10% or fewer of the cells in the population express a detectable level of CD56 or at least
about 10% of the cells in the population express a detectable level of CDCD56.

Preferably wherein, one or more, or more preferably all, of:
about 2% or fewer of the cells in the population express a detectable level of CD14;
at least about 12% of the cells in the population express a detectable level of CD25;
at least about 52% of the cells in the population express a detectable level of CD136;
at least about 99% of the cells in the population express a detectable level of CD155;
at least about 19% of the cells in the population express a detectable level of CD183;
at least about 11% of the cells in the population express a detectable level of CD205;
at least about 9% of the cells in the population express a detectable level of CD332;
about 1.5% or fewer of the cells in the population express a detectable level of CD102;
about 5% or fewer of the cells in the population express a detectable level of CD127;
about 3.5% or fewer of the cells in the population express a detectable level of CD104;
at least about 18% of the cells in the population express a detectable level of CD126;
about 1.5% or fewer of the cells in the population express a detectable level of CD62E;
about 3.5% or fewer of the cells in the population express a detectable level of CD62L;
about 2% or fewer of the cells in the population express a detectable level of CD62P;
at least about 24% of the cells in the population express a detectable level of CD158d;
at least about 18% of the cells in the population express a detectable level of CD158i;
at least about 52% of the cells in the population express a detectable level of CD160;
at least about 39% of the cells in the population express a detectable level of CD314;
at least about 31% of the cells in the population express a detectable level of CD337;
about 3.5% or fewer of the cells in the population express a detectable level of CD159c;
at least about 9% of the cells in the population express a detectable level of CD158b2;
at least about 33% of the cells in the population express a detectable level of CD158f; and
at least about 9% of the cells in the population express a detectable level of CD159a.

The specific population of the invention may be defined with reference to any of the combination of markers shown in Table 1 or 2. The population most preferably has the marker expression pattern of TNF-alpha treated MK004 shown in Table 11.

In any of the populations discussed above, about 5% or fewer, such as about 4% or fewer, about 3% or fewer, about 2% or fewer or about 1% or fewer, of the cells in the population preferably express one or more of (a) CD45RA, (b) CD45RB and (c) CD45RO, such as (a), (b), (c), (a) and (b), (a) and (c), (b) and (c) or (a), (b) and (c).

In any of the populations discussed above, about 5% or fewer, such as about 4% or fewer, about 3% or fewer, about 2% or fewer or about 1% or fewer, of the cells in the population preferably express CD140a, such as on their surfaces. In any of the populations discussed above, about 5% or fewer, such as about 4% or fewer, about 3% or fewer, about 2% or fewer or about 1% or fewer, of the cells in the population preferably express one or more of (i) CDH6, (ii), CD129, (iii) CD200 and (iv) CD271, such as (i), (ii), (iii), (iv), (i) and (ii), (i) and (iii), (i) and (iv), (ii) and (iii), (ii) and (iv), (iii) and (iv), (i), (ii) and (iii), (i), (ii) and (iv), (i), (iii) and (iv), (ii), (iii) and (iv) or (i), (ii), (iii) and (iv).

The cells in these preferred populations may further express detectable levels of any of the markers discussed above with reference to the MK of the invention. The cells in these preferred populations may have any of the advantageous properties of the MK cells discussed above.

In any of the embodiments above where populations are defined with reference to % of cells expressing certain markers, the populations preferably comprise at least about 5,000 cells, such as at least about 6,000, at least about 7,000, at least about 8,000, at least about 9,000, at least about 10,000, at least about 20,000, at least about 30,000, at least about 40,000 cells, at least about 50,000 cells, at least about 100,000 cells, at least about 200,000 cells, at least about 250,000 cells or at least about 500,000 cells. The populations more preferably comprise at least about 5000 cells, at least about 50,000 cells or at least about 250,000 cells. These populations may comprise any of the number of cells discussed above.

Any of the populations of the invention preferably secrete detectable levels of one or more of (a) chemokine (C—X—C motif) ligand 1 (CXCL1 aka GROa), (b) interleukin-12 (IL-12), (c) soluble IL-2 receptor (IL-2Ra), (d) IL-8, (e) soluble TRAIL and (f) IL-6. The MK cell may secrete detectable levels of any combination and permutation of (a) to (f) as described above. Any of the population of the invention preferably secretes detectable levels of IL-15 and/or CXCL10 (IP-10). The population preferably secretes detectable levels of IL-15 and/or CXCL10 (IP-10) in combination with one or more of (a) GROa, (b) interleukin-12 (IL-12), (c) IL-2Ra, (d) IL-8, (e) soluble TRAIL and (f) IL-6 discussed above.

Any of the populations of cells disclosed herein may be diluted with other cells before use. For instance, the population may be combined with subject blood, MNCs, MSCs, NK cells, PMLs, iMP cells, ioMP cells or a combination thereof.

The populations of the invention are advantageous for therapy as discussed above. The ability to produce populations comprising large numbers of safe MK cells of the invention is one of the key advantages of the invention. The invention allows the treatment of subjects with a population of cells which can migrate efficiently to the tissue of interest and have anti-tumour effects once there. This allows the use of a low cell-dose and avoids the side effects associated with CAR-T cells and volume-related side effects.

The population of the invention is preferably homologous. In other words, all of the iMP cells in the population are preferably genotypically and phenotypically identical. The population is preferably autologous or allogeneic as defined above.

However, the population can also be semi-allogeneic. Semi-allogeneic populations are typically produced from MNCs from two or more subjects. In other words, all of the cells in the population are preferably genetically identical or sufficiently genetically identical. Since the MK cells of the invention may be derived from a subject, they may be autologous with the subject to be treated.

The population of the invention may be isolated, substantially isolated, purified or substantially purified. A population is isolated or purified if it is completely free of any other components, such as culture medium and other cells. A population is substantially isolated if it is mixed with carriers or diluents, such as culture medium, which will not interfere with its intended use. Other carriers and diluents are discussed in more detail below. A substantially isolated or substantially purified population does not comprise cells other than the MK cells of the invention. In some embodiments, the population of the invention may be present in a growth matrix or immobilized on a surface as discussed below.

The population is typically cultured in vitro. Techniques for culturing cells are well known to a person skilled in the art. The cells are may be cultured under standard conditions of 37° C., 5% $CO_2$ in medium without serum. The cells are preferably cultured with platelet lysate under low oxygen conditions as discussed in more detail below. The cells may be cultured in any suitable flask or vessel, including wells of a flat plate such as a standard 6 well plate. Such plates are commercially available from Fisher scientific, VWR suppliers, Nunc, Starstedt or Falcon. The wells typically have a capacity of from about 1 mL to about 4 mL.

The flask, vessel or wells within which the population is contained or cultured may be modified to facilitate handling of the MK cells. For instance, the flask, vessel or wells may be modified to facilitate culture of the cells, for instance by including a growth matrix. The flask, vessel or wells may be modified to allow attachment of the MK cells or to allow immobilization of the MK cells onto a surface. One or more surfaces may be coated with extracellular matrix proteins such as laminin or collagen or any other capture molecules that bind to the cells and immobilize or capture them on the surface(s).

The population may be modified ex vivo using any of the techniques described herein. For instance, the population may be transfected or loaded with therapeutic or diagnostic agents. The population may then be used in the methods of treatment discussed in more detail below.

Method of Producing a MK Cell of the Invention

The invention also provides a method for producing a population of the invention. The method involves culturing mononuclear cells (MNCs) under conditions which induce the MNCs to differentiate into iMP cells (step (a)). This step is disclosed in PCT/GB2015/051673 (published as WO 2015/189587). The method then involves culturing the iMP cells in a medium comprising one or more ribonucleosides, one or more deoxyribonucleosides and platelet lysate under low oxygen conditions and under conditions which allow the iMP cells to adhere and differentiate into MK cells (step (b)). The MK cells have the marker expression profiles discussed above with reference to the cells of the invention. The cells may be harvested using normal techniques (such as disclosed in the Examples) and frozen or used immediately.

Mononuclear cells (MNCs) and methods of isolating them are known in the art. The MNCs are preferably primary MNCs isolated from bone marrow. The MNCs may be preferably peripheral blood MNCs (PBMCs), such as lymphocytes, monocytes and/or macrophages. MNCs can be isolated from bone marrow or blood using a hydrophilic polysaccharide, such as Ficoll®. For instance, MNCs may be isolated using Ficoll-Paque® (a commercially-available density medium) as disclosed in the Example.

In all steps of the method, the cells are cultured under standard conditions of 37° C., 5% C02 in medium without serum.

As described in PCT/GB2015/051673 (published as WO 2015/189587), in step (a), MNCs are typically cultured in Minimum Essential Medium (MEM) Alpha GlutaMAX® no nucleosides (ThermoFisher; Product code: 32561-102) having the components listed in Table 5 to form iMP cells. MEM is commercially available from various sources including Thermofisher and Sigma-Aldrich. Step (a) preferably comprises culturing mononuclear cells (MNCs) in culture medium lacking ribonucleosides and dexoyribonucleosides under conditions which induce the MNCs to differentiate into iMP cells. The ribonucleosides and dexoyribonucleosides may be any of those discussed below.

The medium in step (a) preferably further comprises heparin and/or penicillin/streptavidin (P/S). The medium in step (a) is supplemented with platelet lysate. Step (a) preferably comprises culturing mononuclear cells (MNCs) in culture medium lacking ribonucleosides and dexoyribonucleosides and comprising platelet lysate under conditions which induce the MNCs to differentiate into iMP cells. The ribonucleosides and dexoyribonucleosides may be any of those discussed below. Platelet lysate refers to the combination of natural growth factors contained in platelets that has been released through lysing those platelets. Lysis can be accomplished through chemical means (i.e. $CaCl_2$), osmotic means (use of distilled $H_2O$) or through freezing/thawing procedures. Platelet lysate can be derived from whole blood as described in U.S. Pat. No. 5,198,357. Platelet lysate is preferably prepared as described in PCT/GB12/052911 (published as WO 2013/076507). The platelet lysate is preferably prepared by four freeze/thaw cycles using liquid nitrogen in each freezing phase. The plasma lysate is preferably human plasma lysate. The medium preferably comprises about 20% or less platelet lysate by volume, such as about 15% or less by volume or about 10% or less by volume. The medium preferably comprises from about 5% to about 20% of platelet lysate by volume, such as from about 10% to about 15% by volume. The medium preferably comprises about 10% of platelet lysate by volume.

Step (a) of the method of the invention typically comprises culturing MNCs for sufficient time to induce the MNCs to differentiate into iMP cells. The sufficient time is typically from about 15 to about 25 days, preferably about 18, 19, 20, 21, 22, 23 or 24 days. The cells may be passaged and the medium changed after about 8 days. The cells may be again passaged and the medium changed after about another 4, 5 or 6 days when the cells are almost confluent (about 12, 13 or 14 days in total). iMP cells may then be harvested after about 6, 7 or 8 days later when almost confluent (about 18 to 22 days in total).

Step (a) typically comprises culturing the MNCs under conditions which allow the MK cells to adhere. Culture flasks of different sizes and 6-, 12-, 24- and 96-well plates which allow cells to adhere are commercially available from a variety of sources, such as Corning®, Falcon® and Greiner®.

In step (a), the MNCs are preferably cultured under low oxygen conditions. Low oxygen conditions means lower than 20.95% oxygen present in the atmosphere. The MNCs are preferably cultured at less than about 20.5% oxygen ($O_2$), such as less than about 20%, less than about 19%, less than about 18%, less than about 17%, less than about 16%, less than about 15%, less than about 14%, less than about 13%, less than about 12%, less than about 11%, less than about 10%, less than about 9%, less than about 8%, less than about 7%, less than about 6%, less than about 5%, less than about 4%, less than about 3%, less than about 2% or less than about 1% oxygen ($O_2$). The MNCs may be cultured at from about 0% to about 19% $O_2$, such as from about 1% to about 15% $O_2$, from about 2% to about 10% $O_2$ or from about 5% to about 8% $O_2$. The MNCs are most preferably cultured at from about 16% to about 19% $O_2$. The figures for % oxygen (or % $O_2$) quoted above relate to % by volume of oxygen in the gas in the incubator during culture. The method is typically conducted in an incubator which does not actively supply oxygen to the cells. Even if no oxygen is actively supplied by the incubator, there will still be oxygen present from the atmosphere. This is typically between about 16 and about 19%. The method may comprise culturing the cells between about 16% and about 19% oxygen ($O_2$). Specialised hypoxic incubators are available for reducing the oxygen level further.

In step (a), the MNCs are most preferably cultured in the presence of platelet lysate and under low oxygen conditions.

In step (a), the MNCs differentiate into iMP cells. This is described in PCT/GB2015/051673 (WO 2015/189587). The iMP cells express detectable levels of MIC A/B, CD304 (Neuropilin 1), CD178 (FAS ligand), CD289 (Toll-like receptor 9), CD363, (Sphingosine-1-phosphate receptor 1), CD99, CD181 (C—X—C chemokine receptor type 1; CXCR1), epidermal growth factor receptor (EGF-R), CXCR2 and CD126. The iMP cells also typically express detectable levels of CD29, CD44, CD73, CD90, CD105 and CD271 and do not express detectable levels of CD14, CD34 and CD45. Any of the culture conditions of step (a) discussed above can be used to differentiate MNCs into iMP cells, including any of, preferably all of, platelet lysate, adherence, and low oxygen.

In step (b), the method preferably further comprises culturing the iMP cells in a medium comprising one or more ribonucleosides, one or more deoxyribonucleosides and platelet lysate under low oxygen conditions and under conditions which allow the iMP cells to adhere and differentiate into MK cells. The one or more ribonucleosides are preferably one or more of (i) adenosine, (ii) cytidine, (iii) guanosine and (iv) uridine. The one or more deoxyribonucleosides are preferably one or more (i) 2'deoxyadenosine, (ii) 2'deoxycytidine HCl, (iii) 2'deoxyguanosine and (iv) thymidine. In both instance, the culture medium may comprise any number and combination of (i) to (iv), such as (i), (ii), (iii), (iv), (i) and (ii), (i) and (iii), (i) and (iv), (ii) and (iii), (ii) and (iv), (iii) and (iv), (i), (ii) and (iii), (i), (ii) and (iv), (i), (iii) and (iv), (ii), (iii) and (iv) or (i), (ii), (iii) and (iv). The culture medium preferably comprises adenosine, cytidine, guanosine, uridine, 2'deoxyadenosine, 2'deoxycytidine HCl, 2'deoxyguanosine and thymidine. The culture medium in step (b) preferably further comprises L-glutamine and not L-alanyl-L-glutamine.

In step (b), the method more preferably further comprises culturing the iMP cells in a medium comprising the components listed in Table 6 and comprising platelet lysate under low oxygen conditions and under conditions which allow the iMP cells to adhere and differentiate into MK cells. The medium comprising the components listed in Table 6 is preferably MEM Alpha with nucleosides (ThermoFisher; Product code: 12571-063) as used in the Examples.

Step (b) typically takes about 6, 7 or 8 days. MK cells may be harvested once they are almost confluent. Steps (a) and (b) typically take approximately from about 24 to about 30 days in total, such as about 25, 26, 27, 28 or 29 days. Step (b) may comprise culturing MK cells for about 6, 7 or 8 days, passaging (reseeding) the MK cells and culturing them for a further about 2, 3, 4, 5, 6, 7 or 8 days. In this instance, steps (a) and (b) typically take approximately from about 24 to about 34 days in total, such as about 25, 26, 27, 28, 29, 30, 31, 32 or 33 days.

Any of the embodiments concerning platelet lysate and low oxygen conditions discussed above for step (a) equally apply to step (b). The platelet lysate used in step (b) is preferably prepared as described in PCT/GB12/052911 (published as WO 2013/076507). The platelet lysate is preferably prepared by four freeze/thaw cycles using liquid nitrogen in each freezing phase. The medium in step (b) preferably further comprises heparin and/or penicillin/streptavidin (P/S).

Step (b) may further comprise supplementing the medium with IFN-gamma and/or TNF-alpha. Any amount of IFN-gamma may be used, such as from about 100 ug/mL to about 1000 ug/mL. The medium is preferably supplemented with 500 ug/mL. Any amount of TNF-alpha may be used, such as from about 1 ng/mL to about 100 ng/mL. The medium is preferably supplemented with 10 ng/mL. Step (b) preferably further comprises supplementing the medium with IFN-gamma and/or TNF-alpha for 24 hours/one day. Step (b) more preferably further comprises supplementing the medium with IFN-gamma and/or TNF-alpha for 24 hours/one day and then removing the IFN-gamma and/or TNF-alpha from the culture medium for 2 days before harvesting the MK cells. For instance, if step (b) takes about 6 days, it preferably comprises supplementing the culture medium with IFN-gamma and/or TNF-alpha on day 4 and removing the IFN-gamma and/or TNF-alpha on days 5 and 6. If step (b) comprises culturing the MK cells for about 6 days, passaging (reseeding) the MK cells and culturing them for a further 6 days, it preferably comprises supplementing the culture medium with IFN-gamma and/or TNF-alpha on day 10 and removing the IFN-gamma and/or TNF-alpha on days 11 and 12. The skilled person can apply this concept to the other timings of step (b) discussed above.

The invention also provides a method of producing a population of MK cells of the invention, which comprises only step (b). The method comprises culturing iMP cells in a medium comprising one or more ribonucleosides, one or more deoxyribonucleosides and platelet lysate under low oxygen conditions and under conditions which allow the iMP cells to adhere and differentiate into MK cells. All embodiments discussed above equally apply to this method.

As will be clear from the discussion above, the method of the invention is carried out in clinically relevant conditions, i.e. in the absence of trace amounts of endotoxins and other environmental contaminants, such as lipopolysaccharides, lipopeptides and peptidoglycans, etc. This makes the MK cells of the invention particularly suitable for administration to subjects.

The MNCs are preferably obtained from a subject or an allogeneic donor. The invention also provides a method for producing a population of the invention that is suitable for administration to a subject, wherein the method comprises (a) culturing MNCs obtained from the subject under conditions which induce the MNCs to differentiate into iMP cells and (b) culturing the iMP cells in a medium comprising one or more ribonucleosides, one or more deoxyribonucleosides and platelet lysate under low oxygen conditions and under conditions which allow the iMP cells to adhere and differentiate into MK cells that are suitable for administration to the subject. The invention also provides a method for producing a population of the invention that is suitable for administration to a subject, wherein the method comprises culturing the iMP cells derived from the subject in a medium comprising one or more ribonucleosides, one or more deoxyribonucleosides and platelet lysate under low oxygen conditions and under conditions which allow the iMP cells to adhere and differentiate into MK cells that are suitable for administration to the subject. The population will be autologous with the subject and therefore will not be rejected upon implantation. The invention also provides a population of the invention that is suitable for administration to a subject and is produced in this manner.

Alternatively, the invention also provides a method for producing a population of the invention that is suitable for administration to a subject, wherein the method comprises (a) culturing MNCs obtained from a different subject under conditions which induce the MNCs to differentiate into iMP cells and (b) culturing the iMP cells in a medium comprising one or more ribonucleosides, one or more deoxyribonucleosides and platelet lysate under low oxygen conditions and under conditions which allow the iMP cells to adhere and differentiate into MK cells that are suitable for administration to the subject. The invention also provides a method for producing a population of the invention that is suitable for administration to a subject, wherein the method comprises culturing the iMP cells derived from a different subject in a medium comprising one or more ribonucleosides, one or more deoxyribonucleosides and platelet lysate under low oxygen conditions and under conditions which allow the iMP cells to adhere and differentiate into MK cells that are suitable for administration to the subject. The population will be allogeneic with the subject. There is good evidence that allogeneic mesodermal cells are safe in human subjects (Anastasiadis et al. J Cardiovasc Transl Res. 2016 June; 9(3): 202-13). The invention also provides a population of the invention that is suitable for administration to a subject and is produced in this manner.

In Vitro Methods

The MK cells or population of the invention may be used in an in vitro method of regulating the activity of immune cells. In particular, the invention provides an in vitro method of priming a population of NK cells, comprising incubating the population of NK cells with a population of MK cells of the invention under conditions which increase the activity of the NK cells. The method preferably increases the cytotoxic activity of the NK cells. Methods for measuring cytotoxicity are disclosed above. The method may further increase the proliferation of the NK cells. In other words, priming preferably involves increasing the cytotoxicity and/or proliferation of the NK cells. The activity of the NK cells may be evaluated during or after incubation.

The method may further comprise incubating the MK cells and NK cells with an agent which primes/activates NK cells, such as interleukin-18 (IL-8). Other such agents are known in the art.

The population of NK cells may comprise any number of NK cells, including any of the numbers discussed above with reference to the MK cells of the invention.

The NK cells are typically granular lymphocytes. This can be determined using standard microscopy techniques. The NK cells are typically from about 10 to about 30 μm in diameter, such as from about 14 to about 20 μm in diameter.

The NK cells preferably express a low but detectable level of CD56 on their surfaces (also known as $CD56^{dim}$). The NK cells may express a detectable level of CD56 on their surface (also known as $CD56^{bright}$).

The NK cells preferably express a detectable level of CD16 on their surfaces (also known as $CD16^{bright}$). The NK cells may express a low but detectable level of CD16 on their surfaces (also known as $CD16^{dim}$).

The NK cells preferably do not express a detectable level of CD3 on their surfaces (also known as CD3⁻).

The NK cells preferably do not express a detectable level of a TCR on their surfaces (also known as TCR⁻). The NK cells preferably do not express a detectable level of TCR alpha beta on their surfaces. The NK cells preferably do not express a detectable level of TCR gamma delta on their surfaces.

The NK cells are preferably CD56$^{dim}$/CD16$^{bright}$ and more preferably CD56$^{dim}$/CD16$^{bright}$/CD3$^-$/TCR$^-$.

The NK cells may be CD56$^{bright}$/CD16$^{dim}$ and more preferably CD56$^{bright}$/CD16$^{dim}$/CD3$^-$/TCR$^-$.

The NK cells also typically express detectable levels of one or more activating receptors on their surfaces. Activating receptors bind to target ligands present on infected or transformed cells and activate the NK cell. In the context of the invention, activation of the NK cells through these receptors may correspond to an increase in proliferation of the cell and/or cytotoxic activity of the cell. Both of these can be measured using methods that are standard in the art. An activating receptor may stimulate or increase the proliferation and/or cytotoxic activity of the NK cell, such as when it binds to its target ligand. Table 3 below summarises the one or more activating receptors which may be expressed by the NK cells and their target ligands.

TABLE 3

NK activating receptor genes, their receptor products and the target ligands those receptor products recognise (HLA = human leukocyte antigen)

| # | Gene | Receptor product | Target ligand |
|---|---|---|---|
| I | KIR2DL4 | CD158d | HLA-G |
| II | KIR2DS1 | CD158h | HLA-C, preferably HLA-C2 |
| III | KIR2DS2 | CD158j | HLA-C, preferably HLA-C1 |
| IV | KIR2DS3 | KIR2DS3 | Unknown |
| V | KIR2DS4 | CD158i | Unknown |
| VI | KIR2DS5 | CD158g | Unknown |
| VII | KIR3DS1 | CD158e2 | HLA-A or HLA-B, preferably HLA-Bw4 |
| VIII | KLRC2 | NKG2C | HLA-E |
| IX | KLRK1 | NKG2D | MICA/B ULBP 1, 2, 3 or 4 |
| X | KLRC3 | NKG2E | HLA-E |
| XI | NKp30 | NKp30 | BAT-3, HSPG, B7-H6 |
| XII | NKp44 | NKp44 | Viral haemagglutinin (HA) |
| XIII | NKp46 | NKp46 | Viral HA, HSPG |
| XIV | NKp80 | NKp80 | AICL |
| XV | 2B4 (CD244) | 2B4 (CD244) | CD48 |
| XVI | DNAM1 (CD266) | DNAM1 (CD266) | PVR, CD122 |

The NK cells may express detectable levels of any number and any combination of these activating receptors on their surface. In this context, a detectable level means that greater than 5% of the population of NK cells express the relevant receptor.

The NK cells also typically express detectable levels of one or more inhibitory receptors on their surfaces. Inhibitory receptors inhibit the activation of the NK cells when bound by their target ligands. Table 4 below summarises the one or more inhibitory receptors which may be expressed by the NK cells and their target ligands.

TABLE 4

NK inhibitory receptor genes, their receptor products and the target ligands those receptor products recognise (HLA = human leukocyte antigen)

| # | Gene name | Receptor product | Target ligand |
|---|---|---|---|
| A | KIR2DL1 | CD158a | HLA-C |
| B | KIR2DL2 | CD158b1 | HLA-C |
| C | KIR2DL3 | CD158b2 | HLA-C |
| D | KIR2DL5A | CD158f1 | HLA-C |
| E | KIR2DL5B | CD158f2 | HLA-C |
| F | KIR3DL1 | CD158e1 | HLA-A HLA-B |
| G | KIR3DL2 | CD158k | HLA-A HLA-B |
| H | KIR3DL3 | CD158z | HLA-C |
| L | LILRB1 (LIR-1) | Cd85J | HLA-A HLA-B HLA-C HLA-G |
| W | KLRC1 | NKG2A or CD149a | HLA-E |
| X | KLRG1 | Mast cell function-associated antigen | E, N or R cadherin |
| Y | KLRL1 | KLRL1 | Unknown |

The NK cells may express detectable levels of any number and any combination of these inhibitory receptors on their surface. In this context, a detectable level means that greater than 5% of the population of NK cells express the relevant receptor.

The NK cells are preferably human. The NK cells be derived from any of the animals discussed above. The human NK cell is typically derived from a human subject. The human NK cell may be derived in any manner. The human NK cell may be isolated from peripheral blood of a human subject. Methods for doing this are known in the art. For instance, white blood cells/leukocytes may be isolated from peripheral blood and the NK cells isolated or selected based on the markers on their surfaces. Any of the markers discussed above may be used, such as CD56$^{bright}$/CD3$^-$. The white blood cells/leukocytes isolated from peripheral blood may be subjected to immunomagnetic bead selection.

The NK cells may be generated from CD34$^+$ hematopoietic progenitor cells. The CD34$^+$ hematopoietic progenitor cells may be isolated from peripheral blood or bone marrow. Alternatively, CD34$^+$ hematopoietic progenitor cells are commercially available, for instance from PromoCell. CD34$^+$ hematopoietic progenitor cells can be differentiated into NK cells using interleukin-15 (IL-15).

The NK cells may be derived from a human induced pluripotent stem (iPS) cells. Such cells can be identified on the basis of the presence of one or more transcription factors which were used to induce pluripotency. Such transcription factors include, but are not limited to, Oct-3/4, Sox1, Sox2, Sox3, Sox15, Sox18, Klf2, Klf4, c-Myc, n-Myc, l-Myc, Nanog, LIN28 and Glis1. Such cells may also include evidence of the machinery used to deliver such transcription factors.

The NK cells may be autologous. In other words, the cells may be derived from the subject into which the cell will be administered. The NK cells are preferably allogeneic. In other words, the cell is preferably derived from a different subject. The administration of autologous NK cells or allogeneic NK cells to human subjects is well documented.

Isolated NK cells may then be cultured in vitro using methods know in the art. Interleukin-2 (IL-2) may be used to induce the differentiation and proliferation of NK cells. Anti-CD3 antibodies may also be used to increase IL-2 driven expansion of NK cells in vitro. NK cells may therefore be cultured in medium comprising IL-2 and optionally an anti-CD3 antibody. Such antibodies are available to a person skilled in the art. The medium may further comprise IL-15. The medium may further comprise one or more of IL-1, IL-4, IL-7, IL-12 and tumour necrosis factor (TNF).

The NK cells may be cultured with an accessory cell to provide additional signals to promote proliferation. Suitable accessory cells include, but are not limited to, irradiated EBV-transformed lymphoblastoid cells, HFWT (a Wilm's tumour-derived cell line) and the BCR-ABL1 chronic myelogenous leukaemia cell line, K652.

The NK cells may be a NK cell line, such a NK-92 (Gong; JH, Maki; G, Klingemann; HG, Characterization of a human cell line (NK-92) with phenotypical and functional characteristics of activated natural killer cells, Leukaemia, Vol. 8 Issue 4, 1994, p. 658-658) or KHYG-1 (Yagita; M, Huang; CL, Umehara; H, Matsuo; Y, Tabata; R, Miyake; M, Konata; Y, Takatsuki; K, A novel natural killer cell line (KHYG-1) from a subject with aggressive natural killer cell leukemia carrying a p53 point mutation, Leukaemia, Vol. 14 Issue 5, 2000, p. 922-930).

The MK cells and NK cells may be incubated for any period of time. The period of time may be anything from about 30 seconds to about 3 days. For example, the period of time may be about 30 seconds, about 1 minute, about 2 minutes, about 5 minutes, about 10 minutes, about 30 minutes, about 1 hour, about 2 hours, about 4 hours, about 8 hours, about 12 hours, about 1 day, about 2 days or about 3 days. The MK cells and the NK cells are preferably incubated for one day.

The MK cells and NK cells may be incubated across a Transwell® insert. The MK cells and NK cells may be incubated in MK cell culture medium (see above) or NK cell culture medium (see above).

Primed NK Cells

The invention also provides a population of NK cells primed/activated using the invention. The activity of the primed NK cells is increased. The cytotoxic activity of the NK cells is preferably increased. Methods for measuring this are disclosed above. The proliferation of the NK cells may be increased. The NK cells may be any of those discussed above. The population of primed NK cells may comprise any number of NK cells, including any of the numbers discussed above with reference to the MK cells of the invention.

In Vivo Methods

The MK cell or population of the invention may be used in an in vivo method of regulating the activity of immune cells. In particular, the invention provides an in vivo method of priming a population of NK cells, comprising administering a population of MK cells of the invention or a pharmaceutical composition of the invention comprising a population of MK cells to a subject under conditions which increase the activity of NK cells in the subject. Doses of cells, pharmaceutical compositions and routes of administration are discussed in more detail below.

NK cells can be extracted from the subject and isolated as discussed above. The method preferably increases the cytotoxic activity of the NK cells. Methods for measuring this are disclosed above. The method may increase the proliferation of the NK cells.

Pharmaceutical Compositions and Administration

The invention additionally provides a pharmaceutical composition comprising (a) a population of MK cells of the invention and (b) a pharmaceutically acceptable carrier or diluent. The population of MK cells may be any of those discussed above. The pharmaceutical composition may further comprise a population of NK cells. The NK cells may be any of those discussed above, including a population of unprimed NK cells discussed above or a population of primed NK cells of the invention. The MK cells and the NK cells may be present in any ratio. The MK cells and the NK cells are preferably present in about an equal ratio, such as about 1:about 1. Other ratios, including but not limited to, about 1:about 2, about 1:about 3, about 1:about 5, about 1:about 10, about 1:about 20, about 1:about 50, about 1:about 100 or more, are also envisaged by the invention. Suitable cells numbers are discussed above and below.

The invention also provides a pharmaceutical composition comprising (a) a population of primed NK cells of the invention and (c) a pharmaceutically acceptable carrier or diluent. The population of primed NK cells may be any of those discussed above. The pharmaceutical composition may further comprise a population of MK cells of the invention. The cells may be any ratio discussed above.

The various compositions of the invention may be formulated using any suitable method. Formulation of cells with standard pharmaceutically acceptable carriers and/or excipients may be carried out using routine methods in the pharmaceutical art. The exact nature of a formulation will depend upon several factors including the cells to be administered and the desired route of administration. Suitable types of formulation are fully described in Remington's Pharmaceutical Sciences, 19$^{th}$ Edition, Mack Publishing Company, Eastern Pennsylvania, USA.

The cells may be formulated so they may be administered by any route. Suitable routes include, but are not limited to, intravenous, intramuscular, subcutaneous, intraperitoneal, endomyocardial, epimyocardial, intraventicular, intracoronary, retrograde coronary sinus, intra-arterial, intra-pericardial, intraosseous, or intra-pulmonary route. The cells may also be administered directly to a tissue of interest, such as liver, kidney or lung tissue. The cells may be administered directly into a tumour.

Compositions may be prepared together with a physiologically acceptable carrier or diluent. Typically, such compositions are prepared as liquid suspensions of cells. The cells may be mixed with an excipient which is pharmaceutically acceptable and compatible with the active ingredient. Suitable excipients are, for example, water, saline, dextrose, glycerol, of the like and combinations thereof.

In addition, if desired, the pharmaceutical compositions of the invention may contain minor amounts of auxiliary substances such as wetting or emulsifying agents, pH buffering agents, and/or adjuvants which enhance effectiveness. The composition preferably comprises human serum albumin.

One suitable carrier or diluents is Plasma-Lyte A®. This is a sterile, nonpyrogenic isotonic solution for intravenous administration. Each 100 mL contains 526 mg of Sodium Chloride, USP (NaCl); 502 mg of Sodium Gluconate (C6H11NaO7); 368 mg of Sodium Acetate Trihydrate, USP (C2H3NaO2.3H2O); 37 mg of Potassium Chloride, USP (KCl); and 30 mg of Magnesium Chloride, USP (MgCl2.6H2O). It contains no antimicrobial agents. The pH is adjusted with sodium hydroxide. The pH is 7.4 (6.5 to 8.0).

The MK cells may be contained within one or more liposomes and/or one or more microbubbles. Suitable liposomes are known in the art. Suitable liposomes are disclosed in, for example, Akbarzadeh et al. Nanoscale Research Letters 2013, 8:102 and Meghana et al. International Journal Of Pharmaceutical And Chemical Sciences, 2012, 1(1): 1-10. Suitable lipids for use in forming liposomes are discussed below with reference to microbubbles.

Microbubbles, their formation and biomedical uses are known in the art (e.g. Sirsi and Borden, Bubble Sci Eng Technol. November 2009; 1(1-2): 3-17). Microbubbles are bubbles smaller than one millimetre in diameter and larger than one micrometre in diameter. The microbubble used in the present invention is preferably 8 µm or less in diameter, such as 7 µm or less in diameter, 6 µm or less in diameter, 5 µm or less in diameter, 4 µm or less in diameter, 3 µm or less in diameter or 2 µm or less in diameter. The microbubble may be formed from any substance. The general composition of a microbubble is a gas core stabilised by a shell. The gas core may comprise air or a heavy gas, such as perfluorocarbon, nitrogen or perflouropropane. Heavy gases are less water soluble and so are less likely to leak out from the microbubble leading to microbubble dissolution. Microbubbles with heavy gas cores typically last longer in circulation. The shell may be formed from any material. The shell material preferably comprises a protein, a surfactant, a lipid, a polymer or a mixture thereof.

The cells may be administered in a manner compatible with the dosage formulation and in such amount will be therapeutically effective. The quantity to be administered depends on the subject to be treated, capacity of the subject's immune system and the degree repair desired. Precise amounts of cells required to be administered may depend on the judgment of the practitioner and may be peculiar to each subject.

Any suitable number of cells may be administered to a subject. For example, at least about $0.2 \times 10^6$, about $0.25 \times 10^6$, about $0.5 \times 10^6$, about $1.5 \times 10^6$, about $4.0 \times 10^6$ or about $5.0 \times 10^6$ cells per kg of subject may administered. For example, at least about $10^5$, about $10^6$, about $10^7$, about $10^8$, about $10^9$ cells may be administered. As a guide, the number of cells of the invention to be administered may be from about $10^5$ to about $10^9$, preferably from about $10^6$ to about $10^8$. Typically, up to about $2 \times 10^8$ cells are administered to each subject. Any of the specific numbers discussed above with reference to the populations of the invention may be administered.

In such cases where cells are administered or present, culture medium may be present to facilitate the survival of the cells. In some cases, the cells of the invention may be provided in frozen aliquots and substances such as DMSO may be present to facilitate survival during freezing. Such frozen cells will typically be thawed and then placed in a buffer or medium either for maintenance or for administration. Specific cryopreservation media are also commercially available, such as CryoStor® from BioLife Solutions, and there is evidence that cells contained in these media can be directly administered to subjects post thawing.

Medicaments, Methods and Therapeutic Use

The MK cells of the invention may be used in a method of therapy of the human or animal body. Thus the invention provides a MK cell of the invention, a population of MK cells of the invention or a pharmaceutical composition of the invention for use in a method of treatment of the human or animal body by therapy.

The primed NK cells of the invention may be used in a method of therapy of the human or animal body. Thus the invention provides a population of primed NK cells of invention or a pharmaceutical composition of the invention for use in a method of treatment of the human or animal body by therapy.

The invention provides a method of treating cancer in a subject, the method comprising administering to the subject (a) a population of MK cells of the invention, (b) a population of primed NK cells of the invention or (c) a pharmaceutical composition of the invention. The invention provides (a) a population of MK cells of the invention, (b) a population of primed NK cells of the invention or (c) a pharmaceutical composition of the invention for use in treating cancer in a subject. The invention also provides use of (a) a population of MK cells of the invention, (b) a population of primed NK cells of the invention or (c) a pharmaceutical composition of the invention in the manufacture of a medicament for treating cancer in a subject.

The population of MK cells may be any of those discussed above. The population of NK cells may be any of those discussed above. The pharmaceutical composition may be any of those discussed above and may comprise (i) a population of MK cells of the invention, (ii) a population of primed NK cells of the invention, (iii) a population of MK cells of the invention and a population of (any) NK cells or (iv) a population of MK cells of the invention and a population of primed NK cells of the invention.

The cancer may be any cancer. The cancer may be carcinoma, sarcoma, melanoma, lymphoma, or leukemia. Preferably, the cancer is anal cancer, bile duct cancer (cholangiocarcinoma), bladder cancer, blood cancer, bone cancer, bowel cancer, brain tumours, breast cancer, colorectal cancer, cervical cancer, endocrine tumours, eye cancer (such as ocular melanoma), fallopian tube cancer, gall bladder cancer, head and/or neck cancer, Kaposi's sarcoma, kidney cancer, larynx cancer, leukaemia, liver cancer, lung cancer, lymph node cancer, lymphoma, melanoma, mesothelioma, myeloma, neuroendocrine tumours, ovarian cancer, oesophageal cancer, pancreatic cancer, penis cancer, primary peritoneal cancer, prostate cancer, *Pseudomyxoma peritonei*, skin cancer, small bowel cancer, soft tissue sarcoma, spinal cord tumours, stomach cancer, testicular cancer, thymus cancer, thyroid cancer, trachea cancer, unknown primary cancer, vagina cancer, vulva cancer or endometrial cancer. The leukaemia is preferably acute lymphoblastic leukaemia, acute myeloid leukaemia, chronic lymphocytic leukaemia or chronic myeloid/myelogenous leukaemia. The lymphoma is preferably Hodgkin lymphoma or non-Hodgkin lymphoma. The cancer is preferably primary cancer or secondary cancer. The cancer is preferably chronic myelogenous leukaemia or plasma cell myeloma. The cancer is preferably breast cancer.

The method may also involve administering both a population of MK cells of the invention and a population of NK cells, such as a population of primed NK cells of the invention. In such cases, the MK cells and NK cells may be administered simultaneously (such as in the same pharmaceutical composition), sequentially or separately. The MK cells may be administered before or after the NK cells. For example, the MK cells may be administered the subject from about 1 to about 28 days, such as about 3 to about 25 days, about 6 to about 22 days, about 9 to about 18 days or about 12 to about 15 days, before or after the NK cells are administered. The MK cells may be administered the subject up to about 1, up to about 2, up to about 3, up to about 4, up to about 5, up to about 6, up to about 7, up to about 8, up to about 9, up to about 10, up to about 11, up to about 12, up to about 13, up to about 14, up to about 15, up to about 16, up to about 17, up to about 18, up to about 19, up to about 20, up to about 21, up to about 22, up to about 23, up to about 24, up to about 25, up to about 26, up to about 27 or up to about 28 days before or after the NK cells are administered. Suitable numbers of cells and ration of MK cells and NK cells are discussed above.

The population of MK cells, the population of NK cells and/or the pharmaceutical composition of the invention may be administered to the subject on one occasion. Alternatively, the population of MK cells, the population of NK cells and/or the pharmaceutical composition of the invention may be administered to the subject on at least about two occasions, such as at least about 3, at least about 4, at least about 5, at least about 6, at least about 7, at least about 8, at least about 9 or at least about 10 occasions. The interval between the occasions may be from about 1 to about 28 days, such as about 3 to about 25 days, about 6 to about 22 days, about 9 to about 18 days or about 12 to about 15 days. Preferably, the interval between occasions is about 1, 2, 3, 4, 5, 6, 7, 8, 9, 10, 11, 12, 13, 14, 15, 16, 17, 18, 19, 20, 21, 22, 23, 24, 25, 26, 27 or 28 days.

In all instances, the MK cells and/or the NK cells are preferably derived from the subject or an allogeneic donor. Deriving the MK cells and NK cells from the subject should ensure that the cells are themselves not rejected by the subject's immune system. Any difference between the donor and recipient will ultimately cause clearance of the MK cells and NK cells, but not before they have at least partially treated the disease.

The invention concerns administering to the subject a therapeutically effective number of MK cells and/or NK cells to the subject. A therapeutically effective number is a number which ameliorates one or more symptoms of the disease. A therapeutically effective number is preferably a number which treats the disease. Suitable numbers of cells are discussed in more detail above.

The MK cells and/or NK cells may be administered to any suitable subject. The subject is generally a human subject. The subject may be any of the animals or mammals mentioned above.

The subject may be an infant, a juvenile or an adult. The subject may be known to have a disease or is suspected of having a disease. The subject may be susceptible to, or at risk from, the relevant disease. For instance, the subject may be genetically predisposed to cancer.

The invention may be used in combination with other means of, and substances for, treating disease. In some cases, the MK cells and/or NK cells may be administered simultaneously, sequentially or separately with other substances which are intended for treating the disease or ameliorating the symptoms of the disease, or for providing pain relief. The MK cells and/or NK cells may be used in combination with existing treatments for disease and may, for example, be simply mixed with such treatments. Thus the invention may be used to increase the efficacy of existing treatments for disease.

Hybrid Composition

One or more MK cells of the invention may form part of a hybrid composition which comprises one or more biocompatible fibres and one or more MK cells of the invention. The one or more biocompatible fibres may be any of those disclosed in PCT/GB2015/051672 (published as WO 2015/189586). The hybrid composition may also comprise one or more NK cells, such as one or more primed NK cells of the invention.

One or more MK cells of the invention may form part of a hybrid composition as disclosed in PCT/GB2015/051672 (published as WO 2015/189586) and are preferably administered to a subject as part of such a composition. In particular, the invention provides a hybrid composition, which comprises:

(a) one or more biocompatible fibres;
(b) one or more MK cells of the invention; and
(c) one or more biocompatible components which (i) attach the one or more MK cells to the one or more fibres and/or embed the one or more MK cells and the one or more fibres and/or (ii) are capable of attaching the composition to a tissue. The hybrid composition may also comprise one or more NK cells, such as one or more primed NK cells of the invention.

The following Examples illustrate the invention.

EXAMPLES

Example 1—Bone Marrow and Expansion of MK Cells (Batch CLXR-H-17-002RG)

A human bone marrow sample was diluted with Hank Buffered Saline Solution and layered over Ficoll-Paque for the isolation of mononuclear cells (MNCs) by centrifugation. The MNCs were then re-suspended in Hank Buffered Saline Solution and counted using 0.4% trypan blue exclusion assay to assess cellular viability. Cells were seeded (day 0) in culture flasks with MEM Alpha GLutaMAX no nucleosides (ThermoFisher; Product code: 32561-102) containing penicillin-streptomycin, platelet lysate and heparin and incubated at 37° C., 5% CO2. This supplemented medium is the same used in the Examples of PCT/GB2012/051600 (published as WO 2013/005053) and PCT/GB2015/051673 (published as WO 2015/189587).

In all instances in these Examples, platelet lysate was produced as described in PCT/GB2012/051600 (published as WO 2013/005053) and PCT/GB2012/052911 (published as WO 2013/076507): four freeze/thaw cycles using liquid nitrogen in each freezing phase.

TABLE 5

Formulation of MEM Alpha GlutaMAX no nucleosides (ThermoFisher; Product code: 32561-102, 32561-029, 32561-037 or 32561-094 depending on the country)

| Components | Molecular Weight | Concentration (mg/L) | mM |
|---|---|---|---|
| Amino Acids | | | |
| Glycine | 75.0 | 50.0 | 0.6666667 |
| L-Alanine | 89.0 | 25.0 | 0.28089887 |
| L-Alanyl-L-Glutamine | 217.0 | 406.0 | 1.8709677 |
| L-Arginine hydrochloride | 211.0 | 105.0 | 0.49763033 |
| L-Asparagine-H2O | 132.0 | 50.0 | 0.37878788 |
| L-Aspartic acid | 133.0 | 30.0 | 0.22556391 |
| L-Cysteine hydrochloride-H2O | 176.0 | 100.0 | 0.5681818 |
| L-Cystine | 240.0 | 24.0 | 0.1 |
| L-Glutamic Acid | 147.0 | 75.0 | 0.5102041 |
| L-Histidine | 155.0 | 31.0 | 0.2 |
| L-Isoleucine | 131.0 | 52.4 | 0.4 |

TABLE 5-continued

Formulation of MEM Alpha GlutaMAX no nucleosides (ThermoFisher; Product code: 32561-102, 32561-029, 32561-037 or 32561-094 depending on the country)

| Components | Molecular Weight | Concentration (mg/L) | mM |
|---|---|---|---|
| L-Leucine | 131.0 | 52.4 | 0.4 |
| L-Lysine | 146.0 | 58.0 | 0.39726028 |
| L-Methionine | 149.0 | 15.0 | 0.10067114 |
| L-Phenylalanine | 165.0 | 32.0 | 0.19393939 |
| L-Proline | 115.0 | 40.0 | 0.3478261 |
| L-Serine | 105.0 | 25.0 | 0.23809524 |
| L-Threonine | 119.0 | 48.0 | 0.40336135 |
| L-Tryptophan | 204.0 | 10.0 | 0.04901961 |
| L-Tyrosine | 181.0 | 36.0 | 0.19889502 |
| L-Valine | 117.0 | 46.0 | 0.3931624 |
| Vitamins | | | |
| Ascorbic Acid | 176.0 | 50.0 | 0.2840909 |
| Biotin | 244.0 | 0.1 | 4.0983607E−4 |
| Choline chloride | 140.0 | 1.0 | 0.007142857 |
| D-Calcium pantothenate | 477.0 | 1.0 | 0.002096436 |
| Folic Acid | 441.0 | 1.0 | 0.0022675737 |
| Niacinamide | 122.0 | 1.0 | 0.008196721 |
| Pyridoxal hydrochloride | 204.0 | 1.0 | 0.004901961 |
| Riboflavin | 376.0 | 0.1 | 2.6595744E−4 |
| Thiamine hydrochloride | 337.0 | 1.0 | 0.002967359 |
| Vitamin B12 | 1355.0 | 1.36 | 0.0010036901 |
| i-Inositol | 180.0 | 2.0 | 0.011111111 |
| Inorganic Salts | | | |
| Calcium Chloride (CaCl2—2H2O) | 147.0 | 264.0 | 1.7959183 |
| Magnesium Sulfate (MgSO4—7H2O) | 246.0 | 200.0 | 0.8130081 |
| Potassium Chloride (KCl) | 75.0 | 400.0 | 5.3333335 |
| Sodium Bicarbonate (NaHCO3) | 84.0 | 2200.0 | 26.190475 |
| Sodium Chloride (NaCl) | 58.0 | 6800.0 | 117.24138 |
| Sodium Phosphate monobasic (NaH2PO4—2H2O) | 156.0 | 158.0 | 1.0128205 |
| Other Components | | | |
| D-Glucose (Dextrose) | 180.0 | 1000.0 | 5.5555553 |
| Lipoic Acid | 206.0 | 0.2 | 9.708738E−4 |
| Phenol Red | 376.4 | 10.0 | 0.026567481 |
| Sodium Pyruvate | 110.0 | 110.0 | 1.0 |

On day 8 the cells were passaged (reseeded) and the medium was changed. On day 12, the cells were passaged (reseeded) and the medium was changed.

On day 19, the cells were iMP cells (the subject of PCT/GB2015/051673; WO 2015/189587) and were passaged (reseeded) with a new medium (MEM Alpha with nucleosides (ThermoFisher; Product code: 12571-063; see components below) containing penicillin-streptomycin, platelet lysate and heparin and incubated at 37° C., 5% CO2. After 6 days (on day 25), the cells were MK cells (see FIG. 4) and were harvested using cell dissociating solution according to manufacturer's instructions. Cells were cryopreserved in culture medium supplemented with 10% dimethyl sulfoxide to −80° C. and stored in liquid nitrogen for later use. The MK cells resulting from this batch (CLXR-H-17-002RG) were called MK002.

TABLE 6

MEM Alpha with nucleosides (ThermoFisher; Product code: 12571-063, 12571-048, 12571-071 or 12571-089 depending on the country). Shaded rows show where the component differs from that in MEM Alpha GlutaMAX no nucleosides (ThermoFisher; Product code: 32561-102, 32561-029, 32561-037 or 32561-094 depending on the country) in Table 5. The amounts of some components also differ between the two media.

| Components | Molecular Weight | Concentration (mg/L) | mM |
|---|---|---|---|
| Amino Acids | | | |
| Glycine | 75.0 | 50.0 | 0.6666667 |
| L-Alanine | 89.0 | 25.0 | 0.28089887 |
| L-Arginine hydrochloride | 211.0 | 105.0 | 0.49763033 |
| L-Asparagine-H2O | 150.0 | 50.0 | 0.33333334 |
| L-Aspartic acid | 133.0 | 30.0 | 0.22556391 |
| L-Cysteine hydrochloride-H2O | 176.0 | 100.0 | 0.5681818 |
| L-Cystine 2HCl | 313.0 | 31.0 | 0.09904154 |
| L-Glutamic Acid | 147.0 | 75.0 | 0.5102041 |
| L-Glutamine | 146.0 | 292.0 | 2.0 |
| L-Histidine | 155.0 | 31.0 | 0.2 |

TABLE 6-continued

MEM Alpha with nucleosides (ThermoFisher; Product code: 12571-063, 12571-048, 12571-071 or 12571-089 depending on the country). Shaded rows show where the component differs from that in MEM Alpha GlutaMAX no nucleosides (ThermoFisher; Product code: 32561-102, 32561-029, 32561-037 or 32561-094 depending on the country) in Table 5. The amounts of some components also differ between the two media.

| Components | Molecular Weight | Concentration (mg/L) | mM |
|---|---|---|---|
| L-Isoleucine | 131.0 | 52.4 | 0.4 |
| L-Leucine | 131.0 | 52.0 | 0.39694658 |
| L-Lysine | 183.0 | 73.0 | 0.3989071 |
| L-Methionine | 149.0 | 15.0 | 0.10067114 |
| L-Phenylalanine | 165.0 | 32.0 | 0.19393939 |
| L-Proline | 115.0 | 40.0 | 0.3478261 |
| L-Serine | 105.0 | 25.0 | 0.23809524 |
| L-Threonine | 119.0 | 48.0 | 0.40336135 |
| L-Tryptophan | 204.0 | 10.0 | 0.04901961 |
| L-Tyrosine disodium salt | 225.0 | 52.0 | 0.23111111 |
| L-Valine | 117.0 | 46.0 | 0.3931624 |
| Vitamins | | | |
| Ascorbic Acid | 176.0 | 50.0 | 0.2840909 |
| Biotin | 244.0 | 0.1 | 4.0983607E−4 |
| Choline chloride | 140.0 | 1.0 | 0.007142857 |
| D-Calcium pantothenate | 477.0 | 1.0 | 0.002096436 |
| Folic Acid | 441.0 | 1.0 | 0.0022675737 |
| Niacinamide | 122.0 | 1.0 | 0.008196721 |
| Pyridoxal hydrochloride | 204.0 | 1.0 | 0.004901961 |
| Riboflavin | 376.0 | 0.1 | 2.6595744E−4 |
| Thiamine hydrochloride | 337.0 | 1.0 | 0.002967359 |
| Vitamin B12 | 1355.0 | 1.36 | 0.0010036901 |
| i-Inositol | 180.0 | 2.0 | 0.011111111 |
| Inorganic Salts | | | |
| Calcium Chloride (CaCl2) (anhyd.) | 111.0 | 200.0 | 1.8018018 |
| Magnesium Sulfate (MgSO4) (anhyd.) | 120.0 | 97.67 | 0.8139166 |
| Potassium Chloride (KCl) | 75.0 | 400.0 | 5.3333335 |
| Sodium Bicarbonate (NaHCO3) | 84.0 | 2200.0 | 26.190475 |
| Sodium Chloride (NaCl) | 58.0 | 6800.0 | 117.24138 |
| Sodium Phosphate monobasic (NaH2PO4— | 138.0 | 140.0 | 1.0144928 |
| Ribonucleosides | | | |
| Adenosine | 267.0 | 10.0 | 0.037453182 |
| Cytidine | 243.0 | 10.0 | 0.041152265 |
| Guanosine | 283.0 | 10.0 | 0.03533569 |
| Uridine | 244.0 | 10.0 | 0.040983606 |
| Deoxyribonucleosides | | | |
| 2'Deoxyadenosine | 251.0 | 10.0 | 0.03984064 |
| 2'Deoxycytidine HCl | 264.0 | 11.0 | 0.041666668 |
| 2'Deoxyguanosine | 267.0 | 10.0 | 0.037453182 |
| Thymidine | 242.0 | 10.0 | 0.041322313 |
| Other Components | | | |
| D-Glucose (Dextrose) | 180.0 | 1000.0 | 5.5555553 |
| Lipoic Acid | 206.0 | 0.2 | 9.708738E−4 |
| Phenol Red | 376.4 | 10.0 | 0.026567481 |
| Sodium Pyruvate | 110.0 | 110.0 | 1.0 |

Example 2—Bone Marrow and Expansion of MK Cells (Batch CLXR-H-17-004)

Example 1 was repeated as above using a different sample of bone marrow (and hence a different batch number) with only some differences in when the cells were passaged (reseeded). Human MNCs (prepared as in Example 1) were seeded (day 0) in culture flasks with αMEM, GlutaMAX containing penicillin-streptomycin, platelet lysate and heparin and incubated at 37° C., 5% CO2. Platelet lysate was produced as described in PCT/GB2012/051600 (published as WO 2013/005053): four freeze/thaw cycles using liquid nitrogen in each freezing phase.

On day 8 the cells were passaged (reseeded) and the medium was changed. On day 14, the cells were passaged (reseeded) and the medium was changed.

On day 21, the cells were iMP cells (the subject of PCT/GB2015/051673; WO 2015/189587) and were passaged (reseeded) with a new medium (MEM Alpha with nucleosides (ThermoFisher; Product code: 12571-063; (see components above) containing penicillin-streptomycin, platelet lysate and heparin and incubated at 37° C., 5% CO2. After 6 days (on day 27), the cells were MK cells and were harvested using cell dissociating solution according to manufacturer's instructions. Cells were cryopreserved in culture medium supplemented with 10% dimethyl sulfoxide to −80° C. and stored in liquid nitrogen for later use. The resulting MK cells from this batch (CLXR-H-17-004) were called MK004.

Example 3—HT-FACS Analysis

High-throughput fluorescence activated cell sorting (HT-FACS) analysis is a high-throughput screening platform which can rapidly characterize the cell surface phenotype of cells in suspension, with ~380 cell surface markers currently in the panel. This platform has undergone extensive validation and has been performed on many types of human tissues and cells. The panel consists of ~380 human cell surface-specific antibodies arrayed in 96-well plates.

The aim was to determine the surface antigen expression profile of the human MK cells of the invention. Both batches of MK cells (MK002 and MK004) were thawed and seeded in culture flasks containing the supplemented MEM Alpha with nucleosides (ThermoFisher; Product code: 12571-063) defined in Examples 1 and 2. Cells were grown for 5 days with a change of the medium on day 2. To collect the cells, the medium was removed and cells were washed twice with PBS. Cells were treated with 5 mL of Trypsin 0.25% until detached. Medium was added (8 mL) to inactivate the trypsin and collect the cells. Cells were centrifuged at 400 g for 5 min. The cell pellets were re-suspended (single-cell suspension) in 5 mL total of HBSS (Hank's Balanced Salt Solution minus calcium/magnesium, supplemented with 2 mM EDTA and 1% BSA). One aliquot of the sample (10 µl) was used to determine the total number of viable cells by using exclusion dye (0.2% trypan blue).

100 µl of sample were loaded into each well (about 40,000 cells per well assuring the collection of 10,000 to 20,000 events in the FACS). The samples were run in a BD FACSDiva upgraded with a BD High Throughput Sampler (automated sampler). The analysis of flow cytometry data were performed using FlowJo Software. The results were provided in plots, and an Excel spreadsheet containing the percentage of positive cells for each antibody.

TABLE 7

Results of the HT-FACS analysis showing % of cells expressing each cell surface marker

| Marker | Name | MK002 | MK004 | ioMP cells* | iMP cells* | BM-MSC (Lonza)* |
|---|---|---|---|---|---|---|
| CD13 | Aminopeptidase N, APN | 99.9 | 99.5 | 100 | 100 | 100 |
| CD29 | Integrin beta1 | 100 | 99.6 | 100 | 100 | 100 |
| CD44 | Hyalunorate receptor | 100 | 98.7 | 99.9 | 99.9 | 99.7 |
| CD47 | IAP | 100 | 99.2 | 100 | 92.3 | 99.9 |
| CD59 | Protectin, MAC-inhibitor | 100 | 99.5 | 100 | 100 | 100 |
| CD73 | L-VAP-2 | 100 | 99.5 | 99.9 | 100 | 99.8 |
| CD81 | TAPA-1 | 99.9 | 99.5 | 100 | 100 | 99.9 |
| CD90 | Thy-1 | 99.8 | 99.1 | 95.7 | 100 | 99.3 |
| CD105 | Endoglin | 100 | 99.5 | 99.8 | 99.9 | 100 |
| CD140b | PDGFRbeta | 99.1 | 90.2 | 100 | 89.1 | 97.8 |
| CD147 | Neurothelin, basoglin | 100 | 99.4 | 100 | 100 | 100 |
| CD151 | PETA-3 | 100 | 99.2 | 100 | 100 | 99.9 |
| CD276 | B7-H3 | 100 | 99.6 | 100 | 100 | 97.8 |
| HLA-ABC | HLA-ABC | 100 | 99.5 | 0.0844 | 99.9 | 99.8 |
| BLTR-1 | Leukotriene B4 receptor | 27.3 | 6.75 | 2.01 | 6.7 | 1.37 |
| B2-microglobulin | Beta-2 microglobulin | 100 | 99.2 | 100 | 99.8 | 100 |
| CA9 | Carbonic anhydrase IX | 34.2 | 5.8 | 1.95 | 5.22 | 0 |
| CDH3 | Cadherin 3 | 17.5 | 1.22 | 1.93 | 2.93 | 0.475 |
| CDH6 | Cadherin 6 | 3.43 | 2.49 | 0.0518 | 0.6 | 0.235 |
| CDH11 | Cadherin 11 | 73.4 | 38.8 | 92.2 | 61.6 | 0.88 |
| CD1a | T6 | 0.748 | 0.167 | 0.113 | 0.338 | 0.28 |
| CD1b | T6 | 16.7 | 2.24 | 0.99 | 0.766 | 0.745 |
| CD1c | T6 | 59.2 | 48.7 | 3.02 | 15.7 | 0.926 |
| CD1d | CD1d | 4.46 | 0.556 | 0.0547 | 2.7 | 0 |
| CD2 | T11, LFA-2, SRBC-R | 0.675 | 0.231 | 0.703 | 0.292 | 0.526 |
| CD3 | T3 | 0.307 | 0.081 | 0.0396 | 0.158 | 0 |
| CD3e | T3 | 6.39 | 6.5 | 0.0262 | 0.087 | 0 |
| CD4 | T4 | 5.14 | 0.657 | 0.0364 | 1.11 | 0.157 |
| CD5 | T1, Tp67 | 1.24 | 0.0982 | 0.0303 | 0.151 | 0.34 |
| CD6 | T12 | 16.9 | 3.59 | 0.989 | 1.04 | 2.68 |
| CD7 | LEU-9 | 5.21 | 0.269 | 0.0659 | 0.239 | 0.24 |
| CD8 | T8, Leu-2, CD8alpha | 1.25 | 0.197 | 0.00926 | 0.214 | 0 |
| CD8b | CD8beta | 1.3 | 0.952 | 0.092 | 4.34 | 0.705 |
| CD9 | p24, MRP-1 | 55.5 | 6.83 | 29.1 | 38.1 | 51.9 |
| CD10 | CALLA, NEP, gp100 | 97.2 | 74.4 | 89 | 90.6 | 87.1 |
| CD11a | LFA-1, integrin alpha L | 13.8 | 1.15 | 0.393 | 1.57 | 0 |
| CD11b | Mac-1, integrin alphaM | 62.3 | 13.4 | 0.0128 | 6.24 | 0 |
| CD11c | p150, CR4, integrin alphaX | 30.7 | 1.96 | 0.269 | 1.8 | 0 |
| CD14 | LPS-R | 8.63 | 0.801 | 0.121 | 8.03 | 6.25 |
| CD15 | Lewis-x, Lex | 0.178 | 0.0988 | 0.026 | 0.137 | 0.474 |
| CD16 | Fcgamma RIIIA | 66.7 | 18.9 | 2.41 | 10.1 | 3.73 |
| CD16b | FcgammaRIIIB | 1.44 | 0.456 | 0.0348 | 0.331 | 0 |
| CD17 | Lactosylceramide | 46.5 | 18.3 | 7.32 | 20.9 | 0.462 |
| CD18 | Integrin beta2 | 4.44 | 0.833 | 0.0771 | 0.65 | 0 |
| CD19 | B4 | 0.223 | 0.0499 | 0.0103 | 0.21 | 0 |
| CD20 | B1, Bp35 | 0.437 | 0.0482 | 0.00751 | 0.176 | 0 |
| CD20(FMC7) | B1, Bp36 | 1.51 | 0.482 | 100 | 0.0776 | 0 |
| CD21 | C3DR, CR2, EBV-R | 11.5 | 9.01 | 0.985 | 0.66 | 0 |
| CD22 | BL-CAM, Siglec-2 | 5.56 | 0.873 | 0.271 | 0.596 | 0 |
| CD23 | FcepsilonRII | 3.62 | 0.143 | 0.137 | 0.551 | 0.234 |
| CD24 | BA-1 | 12.7 | 2.04 | 0.242 | 0.987 | 4 |

TABLE 7-continued

Results of the HT-FACS analysis showing % of cells expressing each cell surface marker

| Marker | Name | MK002 | MK004 | ioMP cells* | iMP cells* | BM-MSC (Lonza)* |
|---|---|---|---|---|---|---|
| CD25 | IL-2Ralpha, Tac, p55 | 54.8 | 7.74 | 1.59 | 1.44 | 1.67 |
| CD26 | DPP IV | 59.1 | 58.1 | 50.9 | 21.3 | 6.33 |
| CD27 | TNFRSF7, T14 | 2.62 | 0.443 | 0.0347 | 0.409 | 0 |
| CD28 | Tp44, T44 | 17.7 | 0.847 | 0.222 | 0.643 | 0 |
| CD30 | Ki-1 | 20.7 | 5.43 | 0.529 | 0.446 | 0 |
| CD31 | PECAM-1 | 8.18 | 2.35 | 0.596 | 1.29 | 0.214 |
| CD32 | IgSF | 11.4 | 2.55 | 0.182 | 0.698 | 3.46 |
| CD33 | p67, Siglec-3 | 4.44 | 0.699 | 0.259 | 1.25 | 0.372 |
| CD34 | HPCA1 | 0.343 | 0.244 | 0.00731 | 0.287 | 0.885 |
| CD35 | CR1 | 0.265 | 0.0489 | 0.0136 | 0.134 | 0 |
| CD36 | GPIV | 1.45 | 0.289 | 0.292 | 0.458 | 3.57 |
| CD37 | N/A | 0.256 | 0.165 | 0.0341 | 0.0917 | 0.182 |
| CD38 | T10 | 0.654 | 0.112 | 0.0293 | 0.28 | 0 |
| CD39 | ENTPD1 | 0.745 | 0.624 | 0.0625 | 0.126 | 21.8 |
| CD40 | TNFRSF5 | 0.149 | 0.0482 | 0.0152 | 0.132 | 3.12 |
| CD41a | gpIIb | 3.79 | 0.614 | 0.172 | 0.293 | 0 |
| CD41b | HPA-3 | 0.251 | 0.32 | 0.0418 | 0.075 | 0 |
| CD42a | GPIX | 7.47 | 1.96 | 2.04 | 0.528 | 0.131 |
| CD42b | GPIba | 15.3 | 1.08 | 0.237 | 7.29 | 0 |
| CD43 | Leukosialin, sialophorin | 0.491 | 0.0973 | 0.047 | 0.406 | 1.81 |
| CD45 | LCA | 3.41 | 0.572 | 0.0368 | 0.271 | 0 |
| CD45RA | LCA | 10.7 | 1.03 | 0.146 | 5.18 | 2.99 |
| CD45RB | LCA, T200, B220 | 0.533 | 0.114 | 0.0245 | 0.283 | 0.671 |
| CD45RO | LCA, UCHL-1 | 0.715 | 0.472 | 0.062 | 0.57 | 0 |
| CD46 | Membrane cofactor protein | 99.5 | 56 | 74.4 | 78.1 | 22.5 |
| CD48 | Blast-1 | 0.152 | 0.136 | 0.024 | 0.141 | 0.125 |
| CD49a | VLA-1 | 53.4 | 32.5 | 84 | 24 | 51.5 |
| CD49b | VLA-2 | 99.9 | 99.3 | 96.4 | 97.7 | 45.8 |
| CD49c | VLA-3 | 100 | 98.9 | 95.8 | 99.9 | 99.6 |
| CD49d | VLA-4 | 95 | 53.7 | 92 | 93.7 | 26 |
| CD49e | VLA-5 | 100 | 99.4 | 100 | 100 | 99.8 |
| CD49f | VLA-6 | 97.2 | 78.3 | 14.5 | 93.3 | 24.1 |
| CD50 | ICAM-3 | 0.767 | 0.283 | 0 | 0.244 | 0.8 |
| CD51 | Integrin alpha V | 100 | 99 | | | |
| CD51/CD61 | Vitronectin receptor | 99.4 | 96.3 | 94.1 | 92.7 | 68 |
| CD52 | CAMPATH-1 antigen | 10 | 2.73 | 0.0948 | 0.218 | 0.128 |
| CD53 | MRC OX44 | 5.06 | 0.257 | 0.0457 | 1.66 | 0.292 |
| CD54 | ICAM-1 | 77.2 | 78.9 | 73.7 | 23.1 | 23.7 |
| CD55 | DAF | 98.5 | 99.3 | 99.6 | 94.5 | 52.5 |
| CD56 | NCAM | 2.7 | 4.75 | 0.468 | 3.05 | 4.71 |
| CD57 | HNK-1, Leu-7 | 0.426 | 0.256 | 0.0691 | 0.193 | 0 |
| CD58 | LFA-3 | 100 | 99.5 | 100 | 99.7 | 98.1 |
| CD60b | 9-O-sialyl GD3 | 3.93 | 1.05 | 31 | 34 | 10.9 |
| CD61 | GPIIIa | 90.3 | 84.8 | 89.6 | 81.8 | 56.7 |
| CD62E | E-selectin, ELAM-1 | 2.58 | 0.547 | 0.324 | 2.33 | 1.03 |
| CD62L | L-selectin, LECAM-1 | 4.34 | 0.313 | 0.426 | 0.432 | 0.151 |
| CD62P | P-selectin, PADGEM | 0.667 | 0.207 | 0.156 | 0.325 | 0.924 |
| CD63 | LIMP, LAMP-3 | 99.5 | 96.5 | 86.9 | 99.1 | 95.8 |
| CD64 | FcgammaRI | 0.967 | 0.0969 | 0.037 | 0.263 | 0.225 |
| CD65 | VIM2 | 55.4 | 32.1 | 0.578 | 0.825 | 0 |
| CD65s | VIM2 | 30.2 | 22.6 | 1.93 | 7.62 | 0.539 |
| CD66 | BGP-1, NCA-160 | 1.54 | 0.13 | 0.111 | 0.474 | 0.737 |
| CD66b | CD67, CGM6 | 0.222 | 0.203 | 0.0521 | 0.129 | 0 |
| CD66c | NCA | 90.8 | 38.5 | 13.8 | 23.4 | 7.33 |
| CD66e | CEACAM-5 | 5.39 | 51.8 | 69.4 | 56.1 | 13.6 |
| CD68 | Transmembrane glycoprotein | 81.6 | 87.1 | | | |
| CD69 | Human transmembrane C-Type lectin protein | 0.432 | 0.149 | 0.0189 | 0.296 | 0.279 |
| CD70 | Ki-24 | 2.04 | 0.989 | 0.069 | 0.36 | 0.187 |
| CD71 | T9 | 91.4 | 84 | 45.6 | 51 | 4.71 |
| CD72 | Lyb-2 | 0.755 | 0.25 | 0.041 | 0.036 | 0.334 |
| CD74 | Invariant chain | 2.91 | 0.287 | 0.192 | 0.177 | 0.587 |
| CD75 | LN-1 | 0.111 | 0.233 | 0.0331 | 0.0789 | 0.304 |
| CD77 | Gb3, Pk blood group | 0.273 | 0.119 | 0.0691 | 7.15 | 2.4 |
| CD79a | Iga | 76.5 | 62.9 | 0.228 | 15.4 | 0.45 |
| CD79b | Igb | 29.8 | 9.76 | 1.4 | 4.87 | 0.317 |
| CD80 | B7, B7-1, BB1 | 15.6 | 4.4 | 5.98 | 2.94 | 4.57 |
| CD82 | R2 | 100 | 99.3 | 99.9 | 96.3 | 82.7 |
| CD83 | HB15 | 8.9 | 2.58 | 0.53 | 27.9 | 1.34 |
| CD84 | SLAMF5 | 79.9 | 82 | 3.45 | 7.94 | 4.1 |
| CD85a | LILRB3 | 84.5 | 37.3 | 1.29 | 6.76 | 0.971 |
| CD85d | LIRB2, ILT-4, LIR-2 | 95.6 | 86.4 | 43.3 | 17 | 0.98 |
| CD85g | ILT-7 | 24 | 15.8 | 34.5 | 47.2 | 6.15 |
| CD85h | LILRA-2, ILT-1, LIR-7 | 75.1 | 58.6 | 9.43 | 15.6 | 0 |
| CD85j | LIRRB-1, ILT-2 | 87.1 | 33.3 | 44.6 | 20.6 | 0.221 |

TABLE 7-continued

Results of the HT-FACS analysis showing % of cells expressing each cell surface marker

| Marker | Name | MK002 | MK004 | ioMP cells* | iMP cells* | BM-MSC (Lonza)* |
|---|---|---|---|---|---|---|
| CD86 | B70, B7-2 | 69.3 | 24.5 | 4.2 | 24.7 | 0.702 |
| CD87 | UPA-R | 0.432 | 0.177 | 1.69 | 0.178 | 1.61 |
| CD88 | C5aR | 7.24 | 1.84 | 0.098 | 1.32 | 0.352 |
| CD89 | FcalphaR | 87.9 | 23.3 | 4.88 | 5.73 | 0.244 |
| CD91 | TGFBR5 | 98.4 | 97.1 | 97.9 | 95.5 | 63.4 |
| CD92 | CTL1B | 74.7 | 7.34 | 98.6 | 35.4 | 33.3 |
| CD93 | C-type lectin transmembrane receptor | 12.2 | 1.46 | | | |
| CD94 | NKG2C, KP43 | 0.216 | 0.0966 | 0.03 | 0.121 | 0.321 |
| CD95 | Apo-1, Fas | 100 | 99.5 | 100 | 98.9 | 66.7 |
| CD96 | TACTILE | 86 | 58.9 | 21.2 | 21 | 2.63 |
| CD97 | AURA51 | 0.686 | 5.8 | 0.191 | 1.64 | 0.434 |
| CD98 | 4F2 | 99.9 | 99.3 | 99.9 | 100 | 99.9 |
| CD99 | MIC2, E2 | 5.5 | 11.8 | 5.01 | 24.8 | 0.224 |
| CD100 | SEMA4D | 0.375 | 0.175 | 0.0719 | 0.103 | 0.132 |
| CD101 | V7, p126 | 86.5 | 1.73 | 0.334 | 0.29 | 0 |
| CD102 | ICAM-2 | 1.34 | 0.116 | 0.142 | 9.24 | 2.91 |
| CD103 | HML-1, alpha6, integrin alphaE | 0.304 | 0.0261 | 0.0312 | 0.152 | 0.297 |
| CD104 | Beta4 integrin | 8.69 | 1.78 | 0.806 | 4.06 | 99.3 |
| CD106 | VCAM-1 | 44.2 | 47.3 | 18.7 | 6.93 | 4.64 |
| CD107a | LAMP-1 | 12.9 | 5.75 | 4.59 | 0.717 | 0.337 |
| CD107b | LAMP-2 | 2.73 | 0.523 | 1.13 | 0.221 | 0.225 |
| CD108 | SEMA7A | 99.9 | 98.7 | 99.2 | 99.7 | 78 |
| CD109 | 7D1, 8A3 | 3.13 | 6.83 | 0.0726 | 1.89 | 0.253 |
| CD110 | MPL, TPO-R | 35.1 | 18.4 | 67.1 | 55.6 | 16.6 |
| CD111 | PRR1, Nectin-1 | 99.5 | 99.3 | 88.4 | 90.7 | 0 |
| CD112 | PRR2, Nectin-2 | 62.4 | 27.2 | 12.1 | 12.1 | 0.64 |
| CD114 | G-CSFR | 65.7 | 63.8 | 13 | 54.9 | 4.83 |
| CD115 | M-CSFR, c-fms | 0.913 | 5.45 | 99.9 | 8.41 | 0 |
| CD116 | GM-CSFR alpha | 72.7 | 13.8 | 33.4 | 17 | 2.61 |
| CD117 | c-kit, SCFR | 12 | 83.3 | 0.147 | 31.5 | 2.56 |
| CD118 | LIFR, gp190 | 83.2 | 76.6 | 13.8 | 67.4 | 0 |
| CD119 | IFNgammaR | 98.7 | 95.6 | 98 | 78.5 | 24.8 |
| CD120a | TNFR-I | 98.2 | 97.1 | 87.8 | 38.1 | 0 |
| CD120b | TNFR-II | 59.4 | 17.2 | 4.77 | 1.11 | 0.297 |
| CD121b | IL-1R, type II | 76.2 | 7.17 | 54.6 | 39.8 | 2.75 |
| CD122 | IL-2Rbeta | 52.4 | 16.1 | 43.6 | 41.7 | 4.56 |
| CD123 | IL-3Ralpha | 82.7 | 75.8 | 13.5 | 46.9 | 7.06 |
| CD124 | IL-4Ralpha | 23 | 1.95 | 5.5 | 1.52 | 0.225 |
| CD125 | IL-5Ralpha | 41.9 | 26.7 | 4.24 | 19.5 | 0 |
| CD126 | IL-6Ralpha | 45.8 | 19.3 | 5.62 | 7.05 | 0.709 |
| CD127 | IL-7Ralpha | 1.66 | 1.33 | 0.0103 | 18.5 | 12.5 |
| CD129 | IL-9R | 0.449 | 4.68 | 0.0603 | 0.178 | 0 |
| CD130 | IL-6Rbeta, gp130 | 97.4 | 67.4 | 85.7 | 83.6 | 8.15 |
| CD131 | IL-3Rbeta | 36.4 | 24.1 | 0.179 | 0.684 | 0 |
| CD132 | Common gamma | 89.8 | 62.2 | 33.3 | 78.8 | 3.43 |
| CD133 | AC133, prominin-like 1 | 0.387 | 0.413 | 0.0395 | 0.054 | 0 |
| CD134 | OX-40 | 65.1 | 24.2 | 7.44 | 8.15 | 1.29 |
| CD135 | Flt3/Flk2 | 41.1 | 16.8 | 2.42 | 5.18 | 0.575 |
| CD136 | MSP-R, RON | 80.6 | 69.8 | 0.894 | 0.302 | 0 |
| CD137 | 4-1BB, TNRFSF9 | 2.62 | 2.49 | 0.0279 | 0.392 | 0 |
| CD137L | 4-1BB L | 97.9 | 97.8 | 75.7 | 13.5 | 15.6 |
| CD138 | Syndecan-1 | 1.17 | 0.324 | 0.0299 | 0.227 | 0 |
| CD140a | PDGFRalpha | 3.78 | 0.615 | 2.25 | 4.1 | 0.98 |
| CD141 | Thrombomodulin | 13.6 | 12.3 | 2.74 | 21 | 0.385 |
| CD142 | Tissue Factor | 3.6 | 0.717 | 0.26 | 0.478 | 0.555 |
| CD143(R&D) | ACE | 26.4 | 8.75 | | | |
| CD143/ HPC(BD) | ACE | 8.37 | 0.343 | | | |
| CD144 | VE-Cadherin, Cadherin-5 | 0.487 | 0.206 | 0.0213 | 0.0728 | 0.159 |
| CD146 | MUC18, S-endo | 80.6 | 79.3 | 82.6 | 94.2 | 89.5 |
| CD148 | HPTP-eta | 99.1 | 98.6 | 94.8 | 84.6 | 0 |
| CD150 | SLAM | 21 | 8.17 | 3.18 | 0.467 | 0.364 |
| CD152 | CTLA-4 | 45.2 | 19.7 | 5.46 | 6.45 | 5.87 |
| CD153 | CD30L | 88 | 19.6 | 10.5 | 10.9 | 1.19 |
| CD154 | CD40L, gp39, TRAP | 1.81 | 1.41 | 0.137 | 0.357 | 0.893 |
| CD155 | PVR | 100 | 99.8 | 100 | 99.8 | 100 |
| CD156b | ADAM8 | 61.2 | 38.6 | 46.3 | 81 | 36.4 |
| CD157 | BST-1 | 9.78 | 2.25 | 15.7 | 0.713 | 6.33 |
| CD158a | KIR2DL1, p58.1 | 0.355 | 0.221 | 0.0398 | 0.0919 | 0.22 |
| CD158b | KIR2DL2, p58.2 | 0.684 | 0.323 | 0.0115 | 0.129 | 0.195 |
| CD158b2 | KIR2DL3 | 23.6 | 7.98 | 3.38 | 2.54 | 0 |
| CD158d | KIR2DL4 | 59.3 | 33.3 | 4.55 | 56.3 | 1.56 |
| CD158e2 | KIR3DL1 | 0.519 | 0.241 | 0.0395 | 0.254 | 0 |

TABLE 7-continued

Results of the HT-FACS analysis showing % of cells expressing each cell surface marker

| Marker | Name | MK002 | MK004 | ioMP cells* | iMP cells* | BM-MSC (Lonza)* |
|---|---|---|---|---|---|---|
| CD158f | KIR2DL5 | 87.8 | 41.2 | 11.9 | 25 | 0 |
| CD158i | KIR2DS4 | 61.7 | 22.7 | 2.88 | 21.9 | 3.12 |
| CD159a | NKG2A | 51.1 | 8.8 | 2.8 | 6.57 | 0.462 |
| CD159c | NKG2C | 10.2 | 2.04 | 0.975 | 2.44 | 0.917 |
| CD160 | BY55 | 40.1 | 51.7 | 0.0427 | 1.07 | 0.9 |
| CD161 | NKR-P1 | 39.2 | 11.5 | 19.2 | 5.95 | 3.64 |
| CD162 | PSGL-1 | 22.6 | 28.3 | 2.56 | 13.2 | 4.41 |
| CD163 | Ber-MAC3, M130 | 0.73 | 0.164 | 0.0478 | 0.197 | 0 |
| CD164 | MGC-24 | 21.6 | 34.4 | 60.2 | 11.9 | 27 |
| CD165 | AD2, gp37 | 99.7 | 95.1 | 8.21 | 0.716 | 3.55 |
| CD166 | ALCAM | 100 | 99.3 | 100 | 99.9 | 99.8 |
| CD167a | DDR1, Receptor tyrosine kinase family | 84.8 | 1.55 | | | |
| CD169 | Sialoadhesin, Siglec-1 | 15 | 11.8 | 18.1 | 1.76 | 0.178 |
| CD170 | Siglec-5, CD33-like2 | 9.17 | 2.02 | 1.43 | 11.9 | 74.3 |
| CD171 | L1 | 8.88 | 1.75 | 0.259 | 1.9 | 0 |
| CD172a | SIRPgamma | 98.6 | 98.8 | 56.4 | 61.8 | 3.33 |
| CD172b | SIRPbeta, SIRB1 | 0.443 | 0.167 | 0.0416 | 0.0955 | 0.285 |
| CD172g | SIRPgamma, SIRPB2 | 94.9 | 89.4 | 5.61 | 14.5 | 7.14 |
| CD175s | Sialyl-Tn | 96.5 | 3.72 | 93 | 96.2 | 27.1 |
| CD177 | NB1 | 40.1 | 0.23 | 4.82 | 0.477 | 0.46 |
| CD178 | FasL, CD95L | 60.9 | 21.3 | 76.3 | 51.6 | 0.49 |
| CD179a | VpreB | 98.8 | 98.8 | 23.4 | 6.31 | 1.84 |
| CD180 | RP-105 | 60.1 | 23.3 | 6.24 | 0.824 | 0.478 |
| CD181 | CXCR1, IL-8RA | 90.2 | 89.7 | 38.5 | 85 | 2.55 |
| CD182 | CXCR2, IL-8RB | 58.1 | 50.1 | 1.06 | 68.8 | 4.31 |
| CD183 | CXCR3 | 51.8 | 20 | 3.3 | 3.08 | 0 |
| CD184 | CXCR4, fusin | 0.671 | 0.389 | 0.0618 | 0.219 | 0.775 |
| CD185 | CXCR5, BLR1 | 36.6 | 4.19 | 2.45 | 6.04 | 1.39 |
| CD186 | CXCR6, BONZO | 21.7 | 4.39 | 65.1 | 1.48 | 41.5 |
| CD191 | CCR1, MIP-1alphaR, RANTES-R | 22.5 | 1.76 | 0.456 | 12.6 | 0 |
| CD192 | CCR2, MCP-1-R | 39.9 | 21.2 | 0.051 | 0.0662 | 0.0497 |
| CD193 | CCR3, CKR3 | 89.7 | 91.4 | 62.3 | 51 | 8.16 |
| CD194 | CCR4 | 83.9 | 18.4 | 0.0951 | 7.13 | 0 |
| CD195 | CCR5 | 2.7 | 0.311 | 0.164 | 1.02 | 1.94 |
| CD196 | CCR6, LARC receptor, DRY6 | 98 | 39 | 58.8 | 46.3 | 2.8 |
| CD197 | CCR7 | 0.568 | 0.165 | 0.0126 | 0.159 | 0 |
| CD198 | CCR8 | 64.6 | 65.1 | | | |
| CD199 | CCR9 | 95.8 | 99 | | | |
| CD200 | OX-2 | 3.11 | 2.22 | 11.5 | 0.594 | 0.912 |
| CD201 | EPC-R | 25.1 | 8.04 | 64.8 | 55.7 | 0.858 |
| CD202b | Tie2, Tek | 89.9 | 65.9 | 75.7 | 82.7 | 23.2 |
| CD203c | NPP3/PDNP3, ENpp1, PD-1b | 14.5 | 6.87 | 47.6 | 8.66 | 0 |
| CD204 | Macrophage scavenger-R | 93 | 55 | 8 | 13.7 | 1.44 |
| CD205 | DEC-205 | 32.9 | 15.5 | 0.928 | 4.94 | 0 |
| CD206 | Macrophage mannose-R | 0.74 | 0.153 | 0.0296 | 0.205 | 0 |
| CD207 | Langerin | 0.947 | 0.876 | 0.0479 | 0.0679 | 2.7 |
| CD208 | DC-LAMP, LAMP-3 | 10.9 | 2.71 | 1.78 | 3.27 | 0 |
| CD209 | DC-SIGN | 0.192 | 0.108 | 0.0161 | 0.153 | 0 |
| CD210 | IL-10R | 78.8 | 58 | | | |
| CD212 | IL-12-R beta1 | 2.45 | 0.58 | 0.0453 | 0.476 | 0.127 |
| CD213a2 | IL-13-R alpha2 | 30.2 | 46.5 | 19.6 | 8.7 | 8 |
| CD215 | IL-15R alpha | 78.8 | 62.2 | 16.5 | 14.6 | 0.86 |
| CD217 | IL-17-R | 99 | 99.4 | 4.12 | 29.8 | 35.8 |
| CD218a | IL-18Ralpha, | 88 | 46.4 | | | |
| CD218b | IL-18Rbeta | 85.2 | 65.7 | 13.3 | 23.4 | 0.463 |
| CD220 | Insulin-R | 57 | 57.9 | 0.171 | 2.93 | 1.5 |
| CD221 | IGF-1 R | 32.7 | 9.7 | 76.3 | 3.16 | 1.1 |
| CD222 | IGF-II R | 99.2 | 97.9 | 22.2 | 8.09 | 0.768 |
| CD223 | Lag3 | 24.3 | 9.17 | 32.8 | 38.9 | 0 |
| CD226 | DNAM-1, PTA-1, TLiSA1 | 1.12 | 0.247 | 0.154 | 1.15 | 0.22 |
| CD227 | MUC1, EMA | 40.5 | 3.04 | 53.2 | 4.87 | 5.79 |
| CD229 | Ly-9 | 37.7 | 26.9 | 0.106 | 0.579 | 5.56 |
| CD230 | PRNP | 99.9 | 99.3 | 100 | 99.9 | 100 |
| CD231 | TALLA-1, A15 | 94.4 | 83.6 | 76.6 | 34.2 | 34.8 |
| CD234 | Duffy, DARC | 19.8 | 69 | 20.2 | 7.7 | 0.397 |
| CD235a | Glycophorin A | 19.8 | 49.4 | 52.2 | 55.8 | 5.11 |
| CD238 | Kell blood group glycoprotein | 17 | 13.8 | | | |
| CD239 | Basal cell adhesion molecule (BCAM) or Lutheran blood group glycoprotein (LU) | 88.9 | 89.5 | | | |

TABLE 7-continued

Results of the HT-FACS analysis showing % of cells expressing each cell surface marker

| Marker | Name | MK002 | MK004 | ioMP cells* | iMP cells* | BM-MSC (Lonza)* |
|---|---|---|---|---|---|---|
| CD240DCE | Rh30, RhD and RhCE | 97.5 | 99.7 | | | |
| CD243(BD) | MDR-1, p170, P-gp | 0.455 | 0.0484 | 0.0112 | 0.208 | 0 |
| CD243(Mil) | MDR-1, p170, P-gp | 87.6 | 92.3 | | | |
| CD244 | 2B4 | 5.17 | 2.04 | 0.336 | 0.548 | 0 |
| CD245 | p220/240 | 100 | 99 | 62.1 | 99.2 | 13.3 |
| CD249 | Aminopeptidase A | 95 | 88.4 | 0.77 | 19.7 | 0 |
| CD252 | OX-40Ligand, gp34 | 92.4 | 87.3 | 82.2 | 21.4 | 20.6 |
| CD253 | TRAIL, TNFSF10 | 93.4 | 93.5 | 0.183 | 44.1 | 7.07 |
| CD254 | TRANCE, RANKL, OPGL | 71.5 | 23 | 16.6 | 12.3 | 3.85 |
| CD255 | TWEAK | 17.3 | 43.6 | 8.96 | 10.1 | 0.437 |
| CD256 | APRIL, TALL-2 | 95.8 | 96.9 | 82.6 | 7.94 | 0.792 |
| CD257 | BLyS, BAFF, TALL-1 | 98.2 | 95.9 | 90.3 | 63.2 | 5.03 |
| CD258 | LIGHT, HVEM-L | 12.2 | 4.69 | 0.944 | 3.17 | 0 |
| CD261 | TRAIL-R1, DR4 | 60.7 | 47.2 | 13.5 | 30.3 | 21.4 |
| CD262 | TRAIL-R2, DR5 | 77.5 | 38 | 11.8 | 12.1 | 4.55 |
| CD263 | TRAIL-R3, DcR1, LIT | 42.1 | 4.27 | 3.81 | 1.47 | 0 |
| CD264 | TNFRSF10D, TRAILR4 | 85 | 82.8 | 55.2 | 44.9 | 9.09 |
| CD266 | Tumor necrosis factor receptor superfamily member 12A also known as the TWEAK receptor (TWEAKR) | 99.9 | 98.6 | | | |
| CD267 | TACI, TNFR SF13B | 98.7 | 98 | 75.9 | 91.8 | 36.6 |
| CD268 | BAFFR, TR13C | 82.2 | 69.2 | 7.78 | 64.6 | 13.5 |
| CD269 | BCMA, TNFRSF13B | 97.1 | 76.9 | 5.57 | 8.51 | 2.4 |
| CD270 | TNFSF14 | 91.4 | 91.4 | 47.2 | 31.6 | 8.79 |
| CD271 | NGFR, p75 (NTR) | 3.44 | 2.99 | 1.28 | 1.63 | 10.4 |
| CD272 | BTLA | 97.9 | 97.1 | 68.4 | 33.2 | 12.3 |
| CD273 | B7DC, PD-L2, PDCD1L2 | 97.3 | 79.3 | 43.8 | 92.4 | 51.7 |
| CD274 | B7-H1, PD-L1 | 48.6 | 14 | 1.36 | 23.9 | 1.12 |
| CD275 | B7-H2, ICOSL, B7-RP1 | 7.2 | 10.9 | 1.16 | 26 | 0.904 |
| CD277 | BT3.1, butyrophilin SF3 A1 | 97.7 | 96.5 | 0.312 | 1.55 | 0 |
| CD278 | ICOS, AILIM | 0.4 | 0.116 | 0.0202 | 0.147 | 0.0836 |
| CD279 | PD1, SLEB2 | 31.2 | 8.88 | 11.4 | 5.5 | 0.492 |
| CD281 | TLR1 | 2.56 | 0.837 | 0.0598 | 54.7 | 2.12 |
| CD282 | TLR2 | 0.778 | 0.29 | 0.0769 | 0.101 | 0.529 |
| CD283 | TLR3 | 69.9 | 49.7 | 66.5 | 68.9 | 6.92 |
| CD284 | TLR4 | 81.5 | 58.2 | 3.02 | 7.94 | 0.84 |
| CD286 | TLR6 | 52.7 | 32.8 | 68.5 | 76.9 | 11.4 |
| CD288 | TLR8 | 98.4 | 98.7 | 88.4 | 85.6 | 11.2 |
| CD289 | TLR9 | 73.1 | 17.8 | 5.15 | 11.3 | 0.359 |
| CD290 | TLR-10 | 95.1 | 84.9 | 64.2 | 45.1 | 9.5 |
| CD292 | BMPR1A, ALK3 | 24.9 | 2.98 | 2.83 | 2.39 | 0.522 |
| CD294 | CRTH2. GPR44 | 83.9 | 68.1 | 0.00935 | 8.81 | 34.1 |
| CD295 | LeptinR, LEPR | 94.9 | 65.3 | 95.2 | 49 | 73.7 |
| CD298 | Na/K ATPase beta3 subunit | 100 | 99.3 | 7.86 | 99.8 | 98.9 |
| CD299 | DC-SIGN-related, LSIGN, DC-SIGN2 | 0.416 | 1.23 | 47.8 | 29.5 | 1.07 |
| CD300a | CMRF35H, IRC1, IRp60 | 65.7 | 26.4 | 5.45 | 1.82 | 0.222 |
| CD300c | CMRF35A, LIR | 86.1 | 81.6 | 31.6 | 37.3 | 3.76 |
| CD300e | CMRF35L | 90.8 | 80.7 | 69.3 | 38.7 | 0.697 |
| CD301 | MGL, HML | 17.3 | 8.83 | 0.777 | 3.39 | 0.626 |
| CD302 | C-type lectin domain family 13 member A | 99 | 99.2 | | | |
| CD303 | BDCA2, HECL | 95.9 | 70.6 | 0.0228 | 66.8 | 3.33 |
| CD304 | BDCA4, neuropilin 1 | 92.2 | 95 | 9.14 | 65.2 | 0.502 |
| CD305 | LAIR1 | 27 | 14.9 | 3.7 | 4.12 | 0.972 |
| CD307e | IRTA2 | 87.1 | 57.8 | | | |
| CD309 | VEGFR2, KDR | 55.6 | 18.6 | 65.3 | 34.4 | 14.2 |
| CD310 | Vascular endothelial growth factor receptor 3 (VEGFR-3) | 96.6 | 97.8 | | | |
| CD312 | EMR2 | 80.6 | 63.5 | 56 | 24.8 | 12.2 |
| CD314 | NKG2D, KLR | 54.1 | 48.4 | 20.5 | 38.5 | 11.6 |
| CD317 | BST2, HM1.24 | 96.3 | 91.2 | 13 | 48.9 | 25 |
| CD318 | CDCP1, SIMA135 | 98.7 | 94.6 | 39.7 | 71.7 | 12.3 |
| CD319 | CRACC, SLAMF7 | 61 | 53.9 | 21.1 | 27.8 | 21.9 |
| CD321 | JAM1, F11 receptor | 42.9 | 34.6 | 16.7 | 3.81 | 5.04 |
| CD323 | Junctional Adhesion Molecule (JAM) 3 | 100 | 98.5 | | | |
| CD324 | E-Cadherin, Uvomorulin | 65.3 | 45.7 | 7.15 | 17.2 | 0.387 |
| CD325 | N-Cadherin, NCAD | 98.7 | 99.6 | 5.66 | 3.83 | 0.501 |
| CD326 | Ep-CAM, Ly74 | 37.8 | 1.77 | 25.1 | 18.1 | 0.463 |
| CD328 | SIGLEC7, AIRM-1 | 91.7 | 87.7 | 43.5 | 32 | 1.99 |
| CD329 | Sialic acid-binding Ig-like lectin 9 | 4.96 | 0.596 | | | |

TABLE 7-continued

Results of the HT-FACS analysis showing % of cells expressing each cell surface marker

| Marker | Name | MK002 | MK004 | ioMP cells* | iMP cells* | BM-MSC (Lonza)* |
|---|---|---|---|---|---|---|
| CD332 | FGFR2, BEK, KGFR | 29.9 | 9.5 | 0.0229 | 0.814 | 0.181 |
| CD333 | FGFR3, ACH, CEK2 | 43.7 | 22.6 | 18.2 | 7.78 | 1.01 |
| CD334 | FGFR4, JTK2, TKF | 70.2 | 15.2 | 0.178 | 1.35 | 1.76 |
| CD335 | NKp46, Ly-94 homolog | 7.04 | 2.82 | 0.303 | 0.669 | 0.274 |
| CD336 | NKp44, Ly-95 homolog | 0.116 | 0.726 | 0.137 | 0.544 | 0.212 |
| CD337 | NKp30, Ly117 | 72 | 35.9 | 75.5 | 87.3 | 26.4 |
| CD338 | ABCG2, BCRP, Bcrp1, MXR | 86.9 | 66.1 | 72.6 | 49 | 19.5 |
| CD339 | Jagged-1, JAG1, JAGL1, hJ1 | 10.5 | 8.9 | 1.88 | 1.76 | 1.22 |
| CD340 | erbB2, HER-2, EGFR-2 | 99.7 | 93.7 | 99.9 | 94.9 | 41 |
| CD344 | EVR1 | 98.2 | 98.4 | 92 | 65.5 | 17.5 |
| CD351 | FCAMR | 95.7 | 98.8 | 0.512 | 76.4 | 28.1 |
| CD352 | SLAMF6, NTB-A | 7.24 | 2.15 | 65.8 | 0.518 | 0.394 |
| CD353 | SLAM family 2 member 8 | 92.8 | 83.3 | | | |
| CD354 | TREM-1 | 90.4 | 33.5 | 28.1 | 13.6 | 1.66 |
| CD355 | CRTAM | 76.3 | 85.1 | 0.277 | 10.4 | 1.24 |
| CD357 | TNFSF18, GITR | 77.5 | 63.8 | 62.8 | 10.4 | 1.95 |
| CD358 | TNFSF21, DR6 | 95.7 | 85.3 | 33.6 | 45.1 | 7.63 |
| CD360(BD) | IL-21RA | 86.9 | 63.9 | 93.1 | 24.9 | 3.53 |
| CD360(BL) | IL-21RA | 93.9 | 42 | 0.0438 | 33 | 4.5 |
| CD362 | SDC2, HSPG-1 | 32.6 | 84.8 | 38.5 | 14.7 | 0.774 |
| CD363 | S1PR1 | 50.8 | 56.9 | 1.28 | 18.7 | 0.757 |
| CD365 | T cell immunoglobulin and mucin domain containing protein-1 | 96.4 | 94 | | | |
| CD366 | T cell immunoglobulin and mucin domain containing protein 3 | 83.2 | 53.7 | | | |
| CD367/DCIR | Receptor for HIV | 70.7 | 39 | | | |
| CD368 | C-type lectin domain family 4 member D | 87.9 | 72.1 | | | |
| CD369 | CLECSF12, beta-glucan receptor (BGR, betaGR) | 93.4 | 80.5 | | | |
| CD370 | C-type lectin family member 9A | 21.7 | 43.3 | | | |
| CD371 | C-type lectin domain family 12 member A | 91.6 | 69.6 | | | |
| CLA | CLA | 0.127 | 0.264 | 0.0833 | 0.277 | 9.23 |
| CLIP | CLIP | 1.21 | 0.469 | 0.029 | 0.138 | 0 |
| EGF-R | EGF-R | 20 | 2.26 | 0.0459 | 33.3 | 2.02 |
| FZD3 | Frizzled-3 | 83.5 | 58.5 | | | |
| HLA-A2 | HLA-A2 | 99.9 | 1.18 | 0.967 | 3.52 | 20.9 |
| HLA-DM | HLA-DM | 1.2 | 0.406 | 0.599 | 0.172 | 0.14 |
| HLA-DR | HLA-DR | 0.492 | 0.247 | 6.94 | 0.247 | 0.481 |
| ITGB7 | ITGB7 | 1.03 | 0.288 | 99.9 | 0.34 | 0.159 |
| LGR5 | LTBR, TNFRSF3 | 35 | 7.65 | 1.5 | 9.8 | 0.328 |
| LTBR | Lgr-5 | 100 | 99.3 | 0.325 | 34.5 | 87.6 |
| MIC A/B | MIC A/B | 11 | 87.5 | 0.0236 | 97.1 | 4.01 |
| Notch1 | Notch1 | 89.7 | 43.5 | 90.2 | 20.5 | 22.8 |
| Notch2 | Notch2 | 98.9 | 98.9 | 0.121 | 95.8 | 2.15 |
| Notch3 | Notch3 | 91.3 | 34.1 | 7.93 | 5.37 | 0.971 |
| Notch4 | Notch4 | 70.9 | 23.1 | | | |
| PAC-1 | PAC-1 | 0.153 | 0.351 | 0.0145 | 0.137 | 2.91 |
| Podoplanin | PDPN | 4.15 | 12.4 | 60.2 | 8.81 | 0.395 |
| SSEA-3 | SSEA-3 | 7.67 | 1.86 | 20.1 | 20.7 | 2.44 |
| SSEA-4 | SSEA-4 | 77.6 | 6.26 | 79.6 | 87.4 | 6.27 |
| Stro-1 | Stro-1 | 59.2 | 51.3 | 0.0453 | 18.5 | 0.195 |
| TCR AB | TCR alpha beta | 0.308 | 0.145 | 1.18 | 0.327 | 11.1 |
| TCR GD | TCR gamma delta | 91.3 | 41.8 | 56.4 | 52.9 | 0.178 |
| TPBG | TPBG | 11.3 | 4.64 | 0.0191 | 0.197 | 3.93 |
| VB8 TCR | VB8 TCR | 93.8 | 18.9 | 37 | 25.1 | 12.1 |
| VD2 TCR | VD2 TCR | 91.8 | 3.81 | 23.9 | 13.2 | 0.641 |
| fMLP-R | fMLP-R | 59 | 21.6 | 19 | 11.4 | n/a |

*(corresponding data for ioMP cells, iMP cells and BM-MSC (Lonza) from PCT/GB2016/052447 (published as WO2017025729) is presented)

Example 4—MK Cytotoxicity

For MK cytotoxicity, both batches of MK cells (MK002 and MK004) were thawed and seeded in triplicate in 6-well plates containing the supplemented MEM Alpha with nucleosides (ThermoFisher; Product code: 12571-063) defined in Examples 1 and 2. Cells were grown for 3 days before being harvested (as discussed in Examples 1 and 3). The MK cells were washed with and re-suspended in Cr-release assay medium (AIM) and seeded on 96-well plates to be exposed to target cells K562 (chronic myelogenous leukemia) and U266 (plasma cell myeloma) at desired E:T ratio of 10:1. Plates were applied to the standard 4 h Cr release assay for assessment of killing activity, iMP cells from the same batches as MK002 and MK004 were prepared as described in PCT/GB2015/051673; WO 2015/189587 (using the same method as in Examples 1 and 2, except the supplemented αMEM GlutaMAX was not replaced with the supplemented MEM Alpha with nucleosides in the last culture step) and used as controls. The cytotoxicity results are shown in FIG. 1. MK cells demonstrated significantly increased cytotoxicity compared with iMP cells.

Example 5—MK Priming of NK Cells

Figure 2:
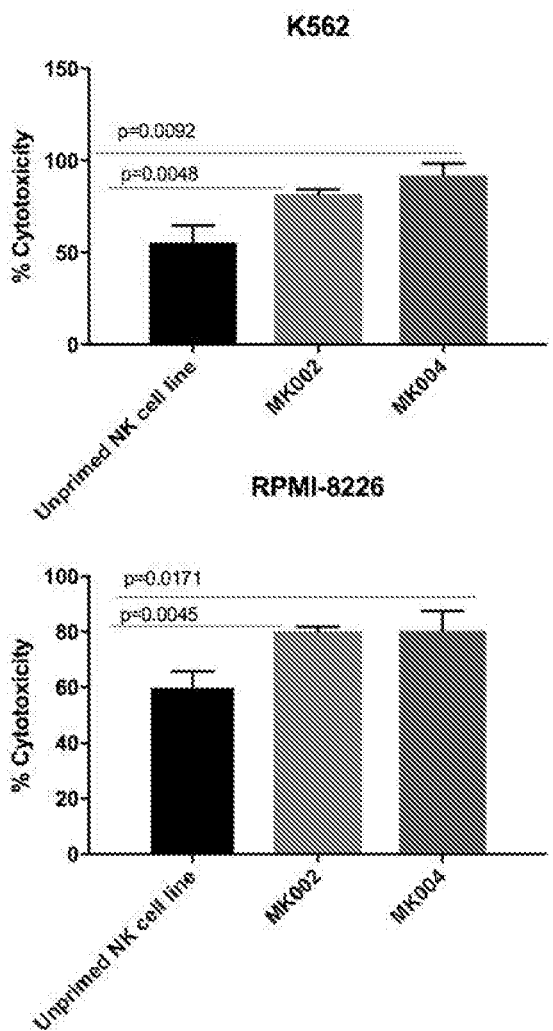
FIG. 2 shows that incubation with MK002 and MK004 significantly increases the cytotoxicity of NK cells against K562 (chronic myelogenous leukemia) and RPMI-8226 (plasma cell myeloma) (n=3; t-test). MK002=NK cell line primed with MK002. MK004=NK cell line primed with MK004.
Figure 3:
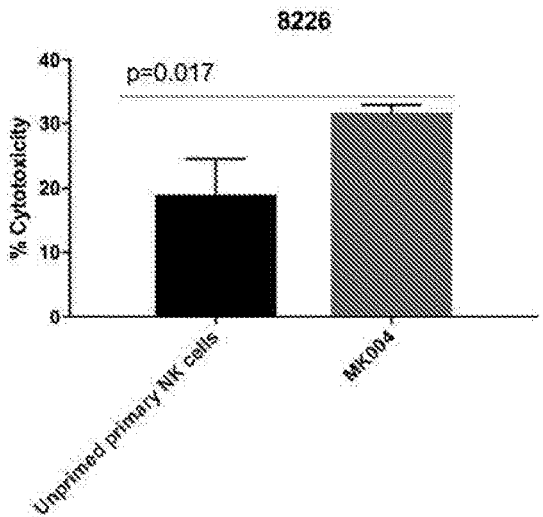
FIG. 3 shows that incubation with MK004 significantly increases the cytotoxicity of primary NK cells against RPMI-8226 (plasma cell myeloma) and U266 (plasma cell myeloma) (n=3; t-test). MK004=Primary NK cells primed with MK004.
Figure 3:
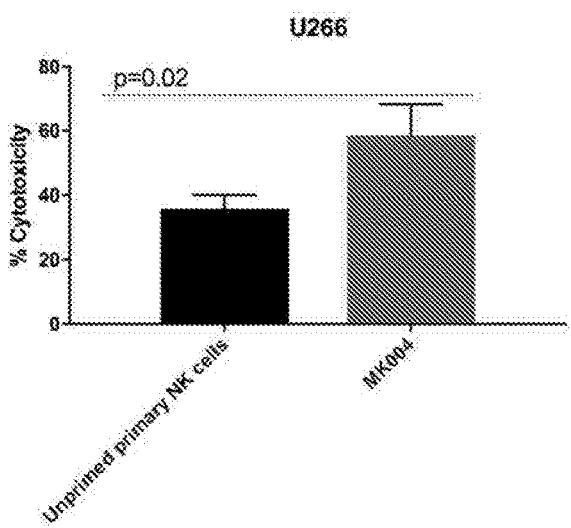

For NK priming, both batches of MK cells (MK002 and MK004) were thawed and seeded in triplicate in 6-well plates containing the supplemented MEM Alpha with nucleosides (ThermoFisher; Product code: 12571-063) defined in Examples 1 and 2. Cells were grown for 2 days before medium were removed and the monolayers of cells were rinsed once with warm HBSS. NK-specific media (GM.1 or X-Vivo 10) were added to the monolayers. NK cells were added to Transwell inserts placed inside the wells and NK cells cultured alone were used as controls. Plates were incubated for 1 day. The NK cells were harvested, washed with and re-suspended in Cr-release assay medium (AIM) and seeded on 96-well plates to be exposed to target cells K562 (chronic myelogenous leukemia), RPMI-8226 (plasma cell myeloma) and U266 (plasma cell myeloma) at desired E:T ratio of 10:1. Plates were applied to the standard 4 h Cr release assay for assessment of killing activity. The NK priming results are shown in FIGS. 2 and 3. MK cells primed NK cells and increased their cytotoxicity.

Example 6—MNCs and C14, CD34 and CD45

The expression of CD14, CD34 and CD45 by MNCs from batches CLXR-H-17-002RG and CLXR-H-17-004 were assessed using flow cytometry. The cells were counted with the NucleoCounter and prepared to have $2\times10^5$ cells/25 μLs in 1% BSA/PBS solution. The following reagents were used.

TABLE 8

Flow cytometry reagents

| Reagents | Manufacturer | Catalogue number |
|---|---|---|
| Water for molecular biolgy | Sigma-Aldrich | W4502-1L |
| Antibody: CD45 PE | R&D Systems | From Kit: FMC002 |
| Isotype Control: PE IgG1 mouse | R&D System | From Kit: FMC002 |
| Antibody: CD34 PerCP | BD | Ref: 345803 |
| Isotype Control: PerCP mouse IgG1-k | BD | 550672 |
| Antibody: CD14 FITC | BD Pharmingen | 555397 |
| Isotype Control: FITC IgG2A | BD Pharmingen | 555573 |
| Nucleocassettes | Chemometec | 941-0001 |
| 5 mL FACs tubes | FALCON | 352054 |
| 50 mL centrifuge tube | VWR | 21008-178 |

TABLE 9

Summary Results for Batch 002

| Antibody | % MNC |
|---|---|
| CD14+ | 13.2% |
| CD34+ | 6.17% |
| CD45+ | 77.3% |

TABLE 10

Summary Results for Batch 004

| Antibody | % MNC |
|---|---|
| CD14+ | 7.59% |
| CD34+ | 5.1% |
| CD45+ | 81.5% |

Example 7—HT-FACS Analysis of IFN-Gamma and TNF-Alpha Treated MK Cells

Example 3 was repeated with MK004 and with the addition of 500 ug/mL IFN-gamma or 10 ng/ml of TNF-alpha to the medium when it was changed on day 2 of the 5 days of growth. After 1 day with IFN-gamma or TNF-alpha, the medium was changed again removing the IFN-gamma or TNF-alpha. At day 5, the cells were collected and tested as described in Example 3. The results for the specific markers of the invention are shown in Table 11 below.

TABLE 11

Results of the HT-FACS analysis showing % of MK004 cells expressing each cell surface marker following IFN-gamma or TNF-alpha stimulation. Untreated values are taken from Example 3.

| | | MK004 Untreated | MK004 IFN-gamma treated | MK004 TNF-alpha treated |
|---|---|---|---|---|
| CDH6 | Cadherin 6 | 2.49 | 12.2 | 12.8 |
| CD11b | Mac-1, integrin alphaM | 13.4 | 39.2 | 11.1 |
| CD11c | p150, CR4, integrin alphaX | 1.96 | 10.4 | 5.23 |
| CD14 | LPS-R | 0.801 | 3.38 | 1.7 |
| CD16 | Fcgamma RIIIA | 18.9 | 34.6 | 16.5 |
| CD25 | IL-2Ralpha, Tac, p55 | 7.74 | 43.6 | 12 |
| CD34 | HPCA1 | 0.244 | 1.07 | 0.381 |
| CD45 | LCA | 0.572 | 4.39 | 1.83 |
| CD45RA | LCA | 1.03 | 13 | 3.69 |
| CD45RB | LCA, T200, B220 | 0.114 | 0.474 | 0.548 |
| CD45RO | LCA, UCHL-1 | 0.472 | 0.789 | 0.609 |
| CD49d | VLA-4 | 53.7 | 85.8 | 79.8 |
| CD50 | ICAM-3 | 0.283 | 0.767 | 0.126 |
| CD51 | Integrin alpha V | 99 | 98.8 | 99.9 |
| CD56 | NCAM | 4.75 | 0.909 | 10 |
| CD62E | E-selectin, ELAM-1 | 0.547 | 3.55 | 1.49 |
| CD62L | L-selectin, LECAM-1 | 0.313 | 11.1 | 3.2 |
| CD62P | P-selectin, PADGEM | 0.207 | 2.36 | 1.94 |
| CD86 | B70, B7-2 | 24.5 | 62.7 | 35 |
| CD96 | TACTILE | 58.9 | 83.5 | 45.2 |
| CD102 | ICAM-2 | 0.116 | 1.21 | 1.06 |
| CD104 | Beta4 integrin | 1.78 | 16.3 | 3.05 |
| CD106 | VCAM-1 | 47.3 | 79.3 | 41.1 |
| CD112 | PRR2, Nectin-2 | 27.2 | 46 | 23.7 |
| CD117 | c-kit, SCFR | 83.3 | 44 | 44.9 |
| CD126 | IL-6Ralpha | 19.3 | 54.5 | 18.6 |
| CD127 | IL-7Ralpha | 1.33 | 6.41 | 4.57 |
| CD129 | IL-9R | 4.68 | 23.7 | 7.58 |
| CD136 | MSP-R, RON | 69.8 | 79.1 | 52.3 |
| CD137L | 4-1BB L | 97.8 | 91.7 | 79.7 |
| CD140a | PDGFRalpha | 0.615 | 1.84 | 4.16 |
| CD155 | PVR | 99.8 | 99.7 | 99.9 |
| CD158b2 | KIR2DL3 | 7.98 | 21.3 | 9.55 |
| CD158d | KIR2DL4 | 33.3 | 37.2 | 24.9 |
| CD158f | KIR2DL5 | 41.2 | 48.9 | 33.2 |
| CD158i | KIR2DS4 | 22.7 | 44.7 | 18.3 |
| CD159a | NKG2A | 8.8 | 34.3 | 9.15 |
| CD159c | NKG2C | 2.04 | 14.8 | 3.02 |
| CD160 | BY55 | 51.7 | 78.9 | 52.2 |
| CD178 | FasL, CD95L | 21.3 | 65 | 30.9 |
| CD183 | CXCR3 | 20 | 39.4 | 19.7 |
| CD184 | CXCR4, fusin | 0.389 | 1.56 | 0.748 |
| CD195 | CCR5 | 0.311 | 3.9 | 1.06 |

TABLE 11-continued

Results of the HT-FACS analysis showing % of MK004 cells expressing each cell surface marker following IFN-gamma or TNF-alpha stimulation. Untreated values are taken from Example 3.

|  |  | MK004 Untreated | MK004 IFN-gamma treated | MK004 TNF-alpha treated |
|---|---|---|---|---|
| CD197 | CCR7 | 0.165 | 3.64 | 0.92 |
| CD200 | OX-2 | 2.22 | 5.38 | 2.6 |
| CD202b | Tie2, Tek | 65.9 | 79 | 30.6 |
| CD205 | DEC-205 | 15.5 | 46.4 | 11.5 |
| CD244 | 2B4 | 2.04 | 8.58 | 0.938 |
| CD253 | TRAIL, TNFSF10 | 93.5 | 88.7 | 77.3 |
| CD261 | TRAIL-R1, DR4 | 47.2 | 69.7 | 38.5 |
| CD262 | TRAIL-R2, DR5 | 38 | 48.3 | 30.8 |
| CD263 | TRAIL-R3, DcR1, LIT | 4.27 | 52 | 10.4 |
| CD264 | TNFRSF10D, TRAILR4 | 82.8 | 28.9 | 49.1 |
| CD271 | NGFR, p75 (NTR) | 2.99 | 3.35 | 5.46 |
| CD277 | BT3.1, butyrophilin SF3 A1 | 96.5 | 96.2 | 82.5 |
| CD282 | TLR2 | 0.29 | 0.0795 | 0.14 |
| CD283 | TLR3 | 49.7 | 72.7 | 35.5 |
| CD284 | TLR4 | 58.2 | 71.2 | 37.5 |
| CD286 | TLR6 | 32.8 | 60.4 | 23.6 |
| CD288 | TLR8 | 98.7 | 90 | 71.1 |
| CD289 | TLR9 | 17.8 | 39.4 | 5.34 |
| CD290 | TLR-10 | 84.9 | 82.1 | 73.7 |
| CD309 | VEGFR2, KDR | 18.6 | 56.6 | 31.7 |
| CD314 | NKG2D, KLR | 48.4 | 76 | 39.3 |
| CD328 | SIGLEC7, AIRM-1 | 87.7 | 74.7 | 62.7 |
| CD332 | FGFR2, BEK, KGFR | 9.5 | 23 | 9.04 |
| CD335 | NKp46, Ly-94 homolog | 2.82 | 8.54 | 4.82 |
| CD337 | NKp30, Ly117 | 35.9 | 49.3 | 31.9 |
| CD352 | SLAMF6, NTB-A | 2.15 | 11.4 | 6.17 |

Example 8—Production of MK Cells from Additional Batches

Examples 1 and 2 were repeated using three additional batches as follows (batches are numbered or named in relation to the bone marrow sample from which they are derived):
CLXR-H-17-001RG to produce MKO01
CLXR-H-17-006RG to produce MK006
PC to produce MKPC.

Example 9—Secretome Analysis of MK Cells

The aim was to determine the secretome profile of the human MK cells of the invention. Five different batches of MK cells (MK001, MK002, MK004, MK006 and MKPC) were thawed and seeded in culture flasks containing the supplemented MEM Alpha with nucleosides (ThermoFisher; Product code: 12571-063) defined in Examples 1 and 2. Cells were grown for 5 days with a change of the medium on day 2 (untreated). In an alternative, 500 ug/mL IFN-gamma or 10 ng/mL TNF-alpha was added to the medium when it was changed on day 2 (IFN-gamma treated or TNF-alpha treated). After 1 day with IFN-gamma or TNF-alpha, the medium was changed again removing the IFN-gamma or TNF-alpha.

In all cases, the conditioned medium was collected at day 5. The levels of the GROa, IL-12, IL-2Ra, IL-8, soluble TRAIL and IL-6 were measured in each sample using (bead-based) Luminex® cytokine profiling (human 48-plex format). Samples were added to 96-well plates containing magnetic beads coupled with antibodies against each cytokine/chemokine or growth factor. Fluorescent signals were captured from each well and concentrations were determined.

The experiment was completed once. The results for all five batches (mean±SEM) are shown in FIGS. 5 to 10 (except for FIG. 8 as described in the legend above). The MK cells of the invention secrete detectable levels of all of the cytokines tested. IFN-gamma stimulation significantly increased the secretion of IL-2Ra and significantly decreased the secretion of IL-8. TNF-alpha stimulation significantly increased the secretion of GROa and IL-8.

Example 10—Carrageenan Used in the Air Pouch Model

The aim was to determine the ability of the MK cells of the invention to attract immune cells to the site of inflammation using the carrageenan air pouch model.

Under anaesthesia, mice (immunocompetent BALB/c) were injected on the back with sterile air. Mice were left for 4-5 days to let the pouch develop and the pouch was re-inflated in between if required. 0.5 mL of 1% carrageenan (an inflammation-inducing agent) was injected into each pouch and left for a few hours to let an inflammation response develop. Pouches were then treated with untreated MK cells of the invention, IFN-gamma treated MK cells of the invention or TNF-alpha treated MK cells of the invention (all from batch MK006) and prepared as explained in Examples 8 and 9. Each pouch received one million MK cells in 0.2 mL saline per mouse. Controls were left untreated (carrageenan only control).

Pouches were perforated by injecting phosphate buffered saline (PBS), were massaged lightly to mix the cells and washed with additional PBS to extract all of the cells. The extracted cells were analysed using FACS and the percentage of NK cells and monocytes present were determined. The experiment was repeated five times (5 pouches per treatment).

Figure 11:
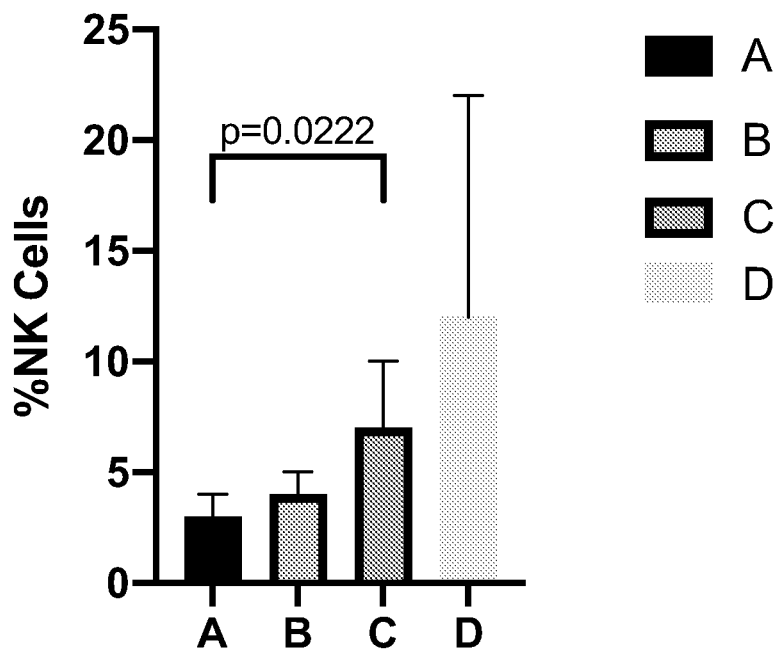
FIG. 11 shows the percentage of NK cells present in the air pouch of (A) control mice, (B) mice treated with untreated MK cells of the invention, (C) mice treated with MK cells of the invention treated with IFN-gamma or (D) mice treated with MK cells of the invention treated with TNF-alpha (MK006; mean±SEM; n=5; unpaired t-test).
Figure 12:
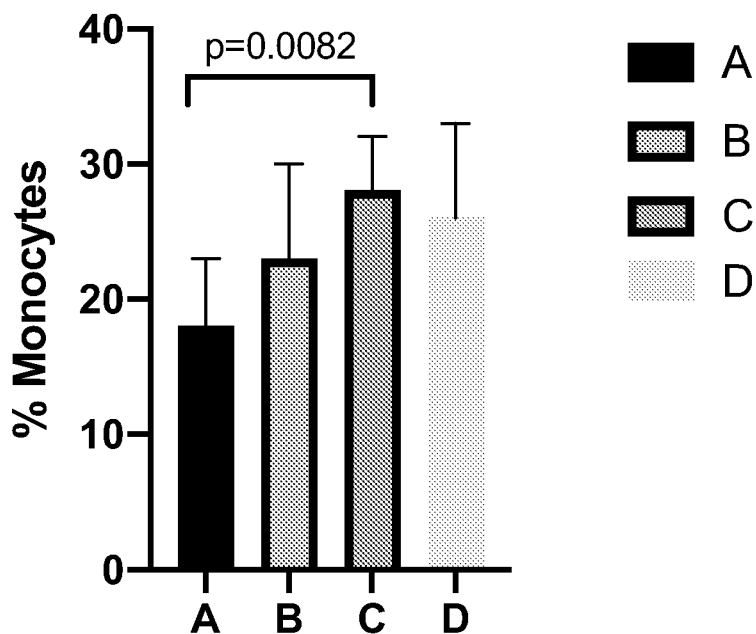
FIG. 12 shows the percentage of monocytes present in the air pouch of (A) control mice, (B) mice treated with untreated MK cells of the invention, (C) mice treated with MK cells of the invention treated with IFN-gamma or (D) mice treated with MK cells of the invention treated with TNF-alpha (MK006; mean±SEM; n=5; unpaired t-test).

The results are shown in FIGS. 11 and 12. The IFN-gamma treated MK cells of the invention significantly increased the % of NK cells and monocytes in the air pouch.

Example 11—MK Priming of NK Cells

Figure 13:
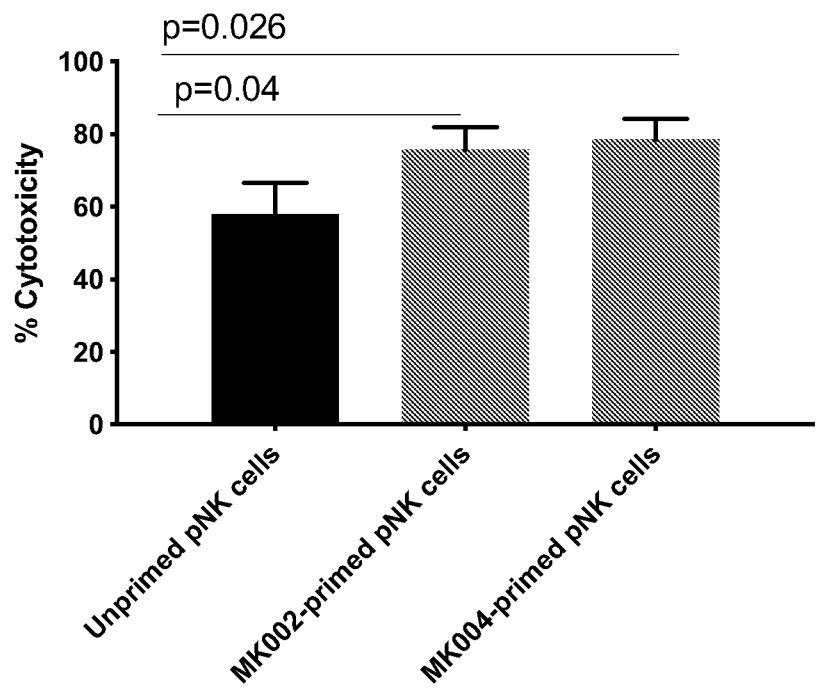
FIG. 13 shows that incubation with MK002 and MK004 significantly increases the cytotoxicity of primary NK cells against K562 (chronic myelogenous leukemia) (mean±SEM; n=3; unpaired t-test).

The method of Example 5 was repeated three time (n=3) using untreated MK cells from batches MK002 and MK004, primary NK cells and K562 (chronic myelogenous leukemia). The results are shown in FIG. 13. MK cells primed primary NK cells and significantly increased their cytotoxicity.

Example 12—MK Cytotoxicity

Figure 14:
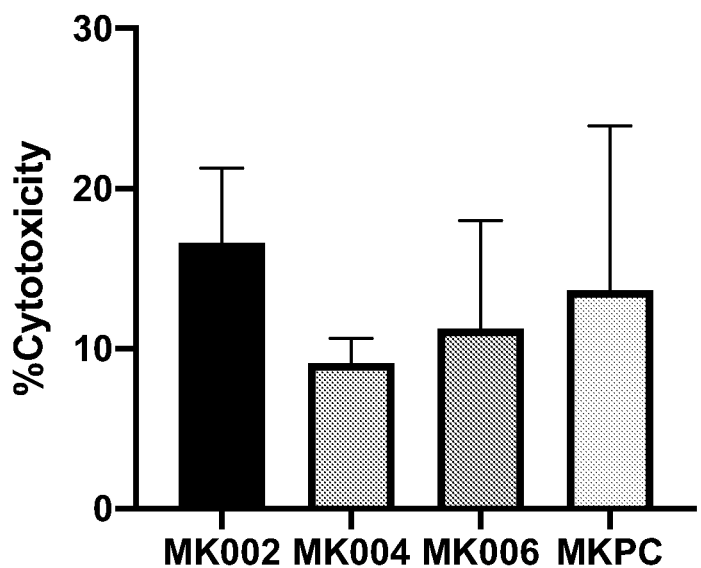
FIG. 14 shows that all batches of MK cells tested demonstrate cytotoxicity against MCF7 (mean±SEM; n=2).
Figure 15:
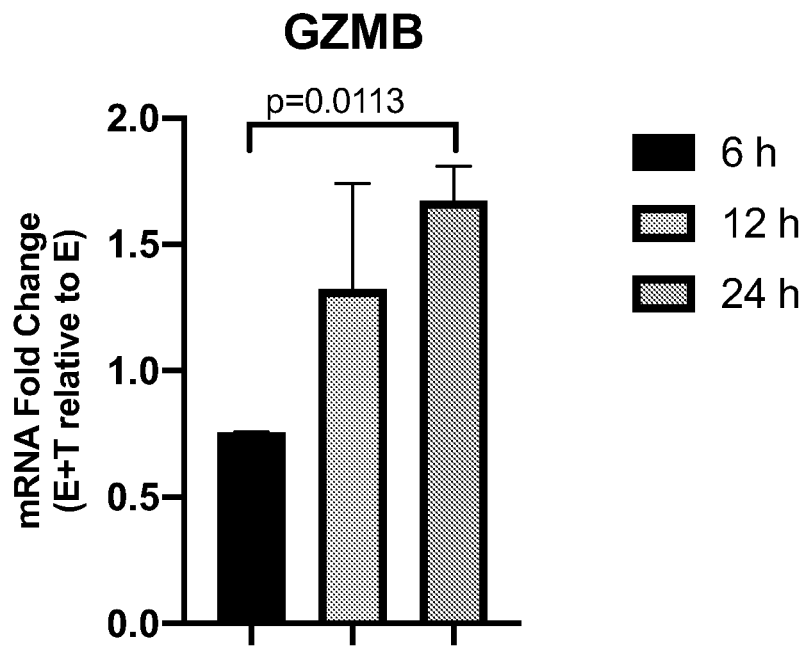
FIG. 15 shows the fold change in amount of GZMB mRNA expressed by MK004 following co-culture (CC) with RPMI-8226 for 6 hours, 12 hours or 24 hours compared with mono-culture (MC) (mean±SD; n=2 at each time point for both MC and CC; unpaired t-test).
Figure 16:
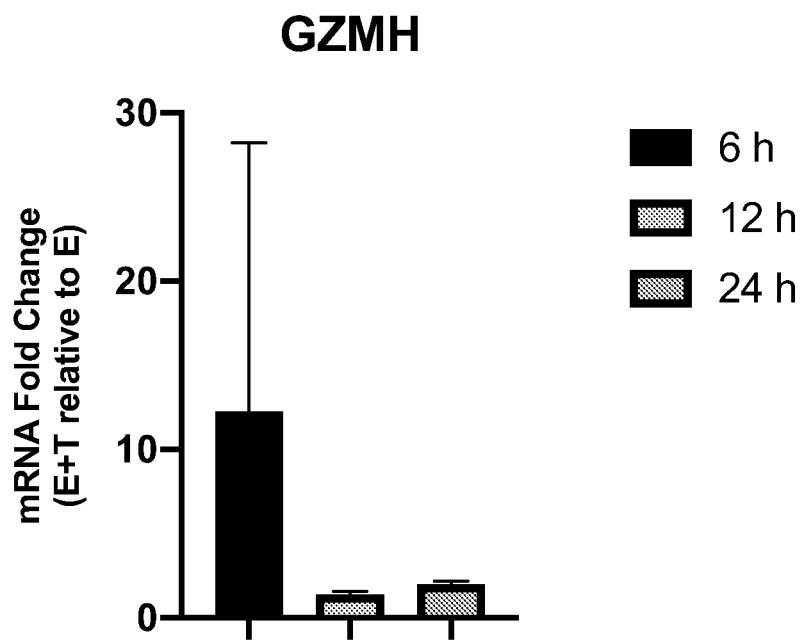
FIG. 16 shows the fold change in amount of GZMH mRNA expressed by MK004 following co-culture (CC) with RPMI-8226 for 6 hours, 12 hours or 24 hours compared with mono-culture (MC) (mean±SD; n=2 at each time point for both MC and CC; unpaired t-test).
Figure 17:
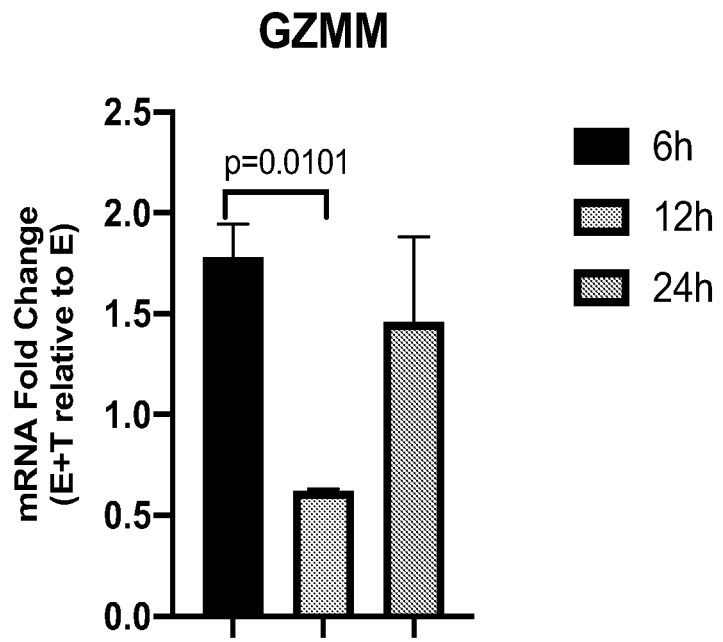
FIG. 17 shows the fold change in amount of GZMM mRNA expressed by MK004 following co-culture (CC) with RPMI-8226 for 6 hours, 12 hours or 24 hours compared with mono-culture (MC) (mean±SD; n=2 at each time point for both MC and CC; unpaired t-test).
Figure 18:
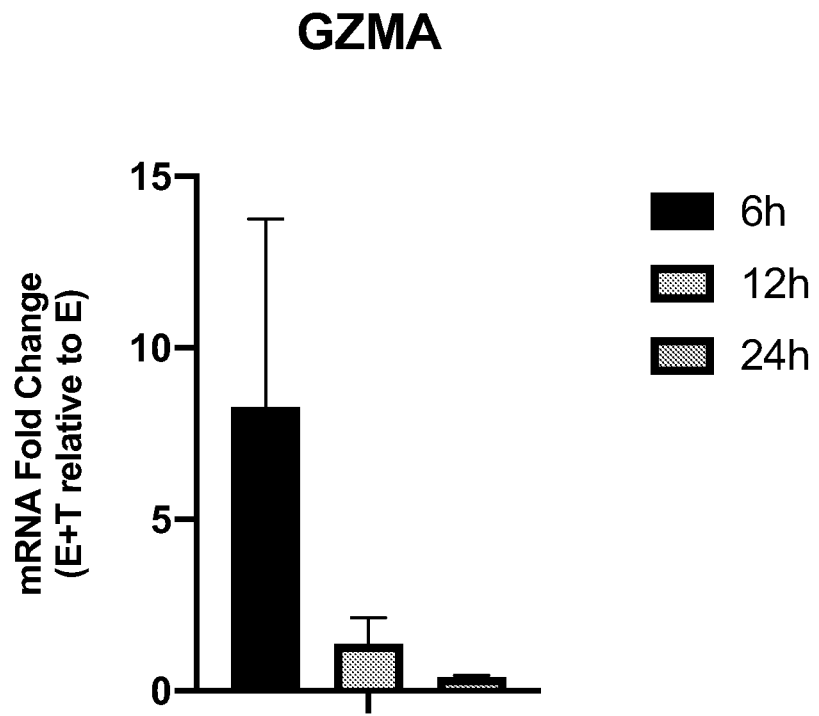
FIG. 18 shows the fold change in amount of GZMA mRNA expressed by MK004 following co-culture (CC) with RPMI-8226 for 6 hours, 12 hours or 24 hours compared with mono-culture (MC) (mean±SD; n=2 at each time point for both MC and CC; unpaired t-test).
Figure 19:
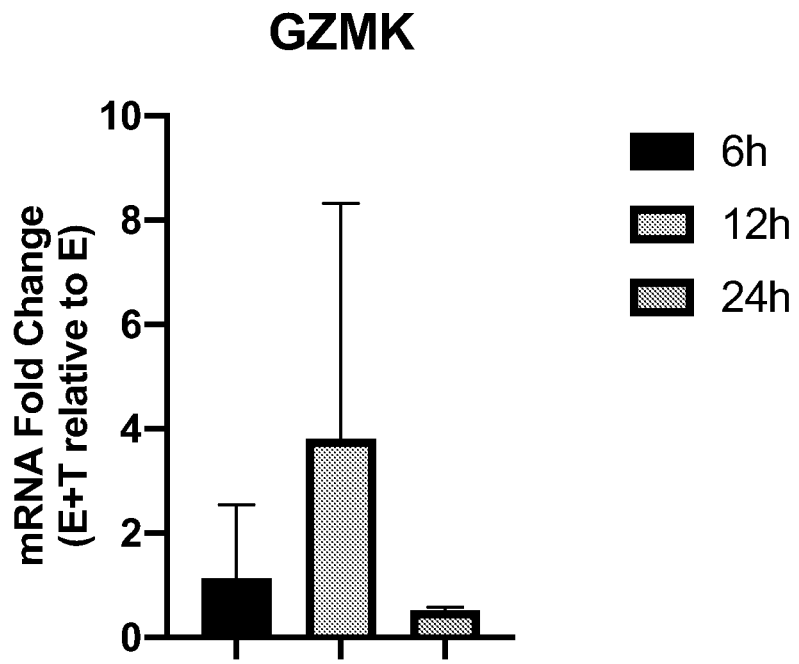
FIG. 19 shows the fold change in amount of GZMK mRNA expressed by MK004 following co-culture (CC) with RPMI-8226 for 6 hours, 12 hours or 24 hours compared with mono-culture (MC) (mean±SD; n=2 at each time point for both MC and CC; unpaired t-test).
Figure 20:
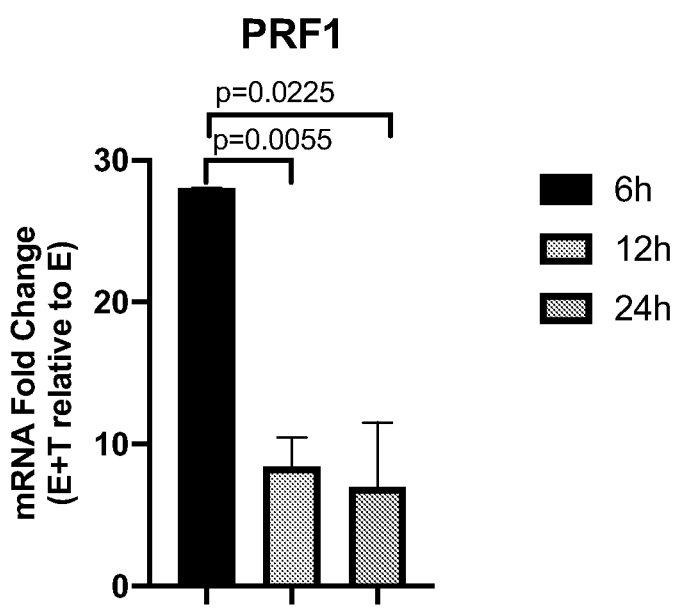
FIG. 20 shows the fold change in amount of perforin mRNA expressed by MK004 following co-culture (CC) with RPMI-8226 for 6 hours, 12 hours or 24 hours compared with mono-culture (MC) (mean±SD; n=2 at each time point for both MC and CC; unpaired t-test).

The method of Example 4 was repeated twice (n=2) for four different batches of MK cells of the invention (MK002, MK004, MK006 MKPC) and the breast cancer cell line, MCF7 at a desired E:T ratio of 10:1. The cytotoxicity results are shown in FIG. 14. MK cells from all batches demonstrated cytotoxicity against MCF7.

Example 13—Expression of Granzymes and Perforin by MK Cells

RNA was isolated from MK cells from batch MK004 using the RNeasy kit (Qiagen). cDNA was synthesized using a cDNA synthesis kit (Roche). Amplicons were amplified using specific primers for granzymes B (GZMB), H (GZMH), M (GZMM), A (GZMA) and K (GZMK) and perforin in a specific thermal profile. The amplicon products were run on 2% gel and bands were detected using ETBr. It was confirmed that the MK cells express GZMB, GZMH, GZMM, GZMA and GZMK and perforin (data not shown).

RNA was also isolated from MK cells from batch MK004 cultured alone (mono-culture: MC) or following co-culture with RPMI-8226 cells at desired E:T ratio of 10:1 (co-culture: CC) for 6 h, 12 h and 24 h using the RNeasy kit. cDNA was synthesized using a cDNA synthesis kit (Roche). Quantitative PCR signals for GZMB, GZMH, GZMM, GZMA, GZMK, perforin and GADPH were detected using Sybr green master mix. Fold changes in expression of each gene were determined in CC conditions relative to MC and the results are shown in FIGS. 15 to 20 (n=2 for each RNA at each time point for both MC and CC). GZM and perforin values were normalised to GADPH values. Obtained values were studied for CC relative for MC at each time (CC-MC). To obtain the fold change (FC) value, the following was applied: 2^(—(CC-MC)). A value greater than 1 indicates that CC increases the expression of a gene relative to MC. As shown in FIGS. 15 to 20, co-culture with RPMI-8226 cells increased the expression of GZMB, GZMH, GZMM, GZMA, GZMK and perforin.

Example 14—Inhibition of MK Cell Cytotoxicity Using EGTA

Figure 21:
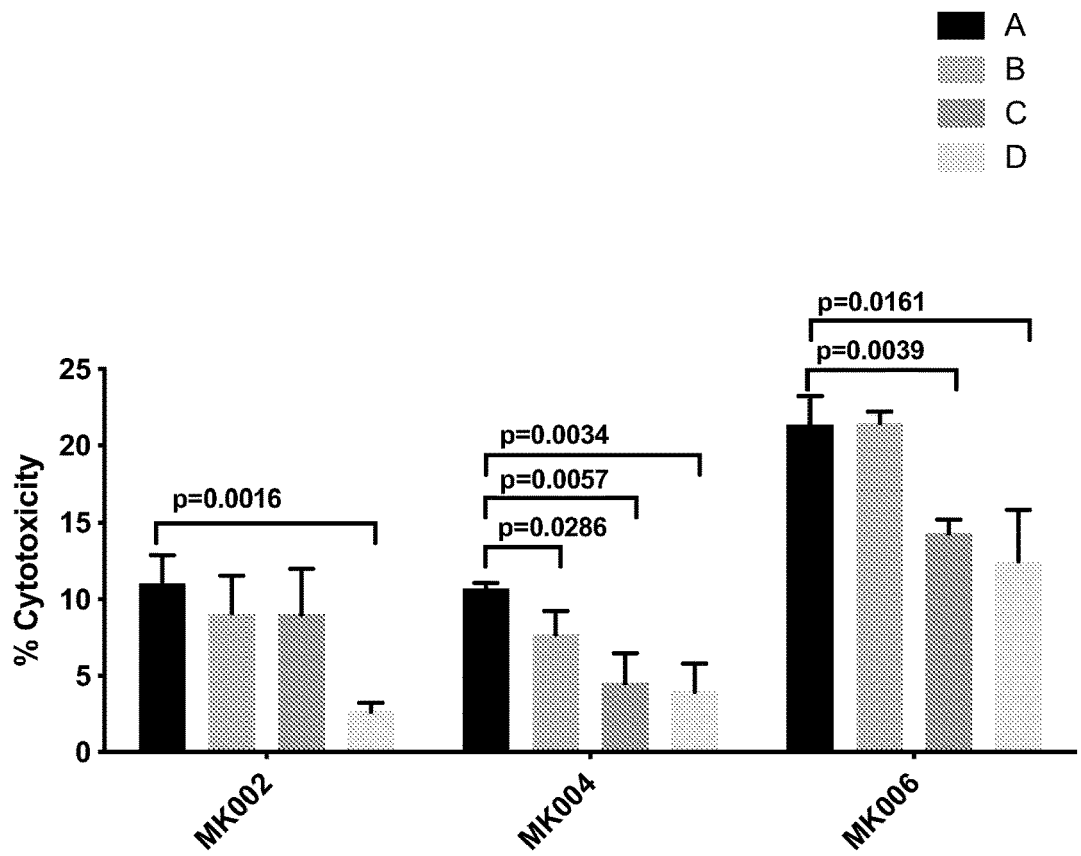
FIG. 21 shows the cytotoxicity of MK002, MK004 and MK006 against MCF7 (E:T=5.1; 24 hours) when untreated (A) or treated for 24 hours with 0.5 mM EGTA (B), 1.0 mM EGTA (C) or 2.0 mM (D) (mean±SEM; n=3; unpaired t-test).

EGTA is a non-specific inhibitor of granule exocytosis. MK cells from three batches (MK002, MK004 and MK006) were pre-treated with different concentrations of EGTA (0.5, 1.0, 2.0 mM) for 24 h, rinsed with sterile HBSS and exposed to MCF7 cells (as a desired E:T ratio of 5:1) for further 24 h and their killing activity was evaluated using the chromium release assay (as described in Examples 4 and 12). As shown in FIG. 21, EGTA significantly reduced the cytotoxicity of all three batches of MK cells. This suggests at least a partial role of granule exocytosis in MK cell cytotoxicity.

Example 15—Inhibition of MK Cell Cytotoxicity Using siRNAs

Figure 22:
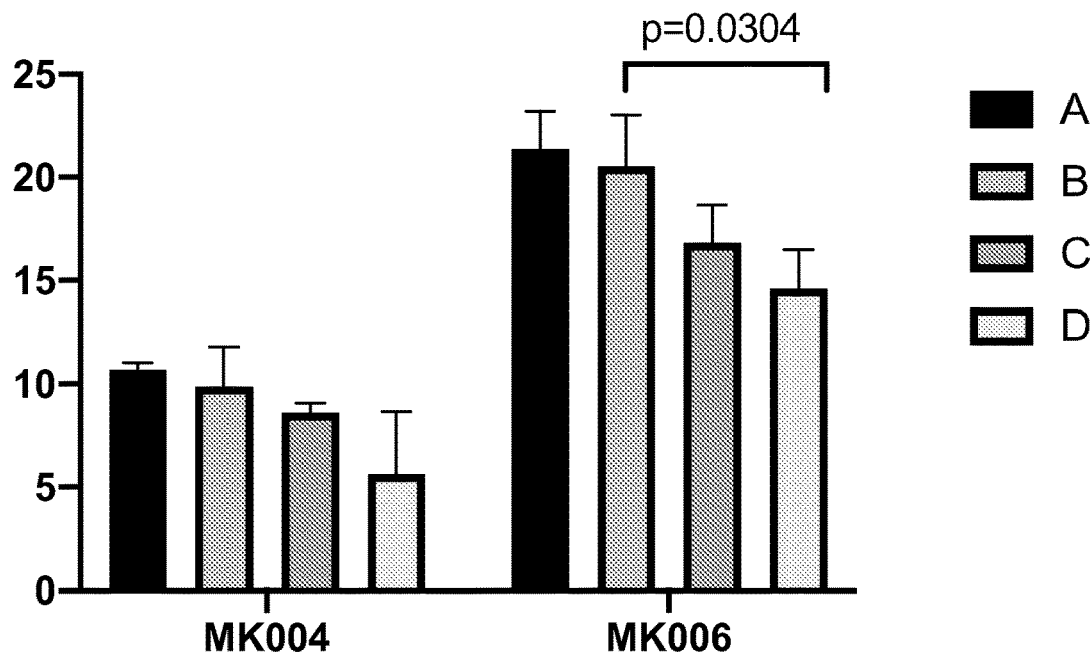
FIG. 22 shows the cytotoxicity of MK004 and MK006 against MCF7 (E:T=5.1; 24 hours) when untreated (A) or treated for 48 hours with scrambled/non-targeting (NT) siRNA (A), specific siRNA against CD178/FasL (B) or specific siRNA against CD253/TRAIL (D) (mean±SEM; n=3; unpaired t-test).

MK cells from batches MK004 and MKO06 were treated with 25 pM of specific siRNA against CD178/FasL (siFasL) or CD253/TRAIL (siTRAIL) or scrambled/non-targeting (NT) siRNA using Lipofectamine RNAiMAX. After 48 h cells were washed using sterile HBSS and exposed to MCF7 cells (as a desired E:T ratio of 5:1) for further 24 h and their killing activity was evaluated using the chromium release assay (as described in Examples 4 and 12). Analyses are from triplicates (3 wells for each condition). The results are shown in FIG. 22. Inhibition of TRAIL significantly reduced the cytotoxicity of the MKO06 (compared with scrambled/ NT siRNA) suggesting a role for this surface marker in MK cell cytotoxicity.

The invention claimed is:

1. A mesodermal killer (MK) cell, wherein the cell expresses detectable levels of CD112, CD137L, CD178, CD253 and CD277, and wherein the cell does not express detectable levels of CD34 and CD45.

2. A MK cell according to claim 1, wherein the cell expresses detectable levels of CD16, CD96, CD112, CD137L, CD178, CD253 and CD277, and wherein the cell does not express detectable levels of CD34, CD45 and CD56.

3. A MK cell according to claim 1, wherein the cell does not express a detectable level of CD14.

4. A MK cell according to claim 1, wherein the cell expresses a detectable level of CD25, CD136, CD155, CD183, CD205, and/or CD332.

5. A MK cell according to claim 1, wherein the cell (a) does not express detectable levels of CD102 and/or CD127, (b) does not express detectable levels of CD104, (c) does not express detectable levels of one or more of CD50, CD62E, CD62L, and CD62P or (d) any combination of (a) to (c).

6. A MK cell according to claim 1, wherein the cell expresses a detectable level of:
    (a) CD328;
    (b) one or more of CD158d, CD158i, CD160, CD314 and CD337;
    (c) CD159c; and/or
    (d) CD158b2, CD158f and CD159a.

7. A MK cell according to claim 1, wherein the MK cell secretes detectable levels of one or more of (a) chemokine (C-X-C motif) ligand 1 (CXCL1 aka GROa), (b) interleukin-12 (IL-12), (c) soluble IL-2 receptor (IL-2Ra), (d) IL-8, (e) soluble TRAIL and (f) IL-6.

8. A population of:
    (A) two or more MK cells according to claim 1; or
    (B) MK cells, wherein greater than about 15% of the cells in the population express detectable levels of CD112, CD137L, CD178, CD253 and CD277 and wherein about 5% or fewer of the cells in the population express detectable levels of CD34 and CD45; or
    (C) MK cells, wherein
        (i) at least about 20% of the cells in the population express a detectable level of CD112,
        (ii) at least about 80% of the cells in the population express a detectable level of CD137L,
        (iii) at least about 20% of the cells in the population express a detectable level of CD178,
        (iv) at least about 50% of the cells in the population express a detectable level of CD253, and
        (v) at least about 50% of the cells in the population express a detectable level of CD277, and wherein
        (a) about 5% or fewer of the cells in the population express a detectable level of CD34, and
        (b) about 5% or fewer of the cells in the population express a detectable level of CD45.

9. A population of MK cells according to claim 8(A), wherein greater than about 15% of the cells in the population express detectable levels of CD16, CD96, CD112, CD137L, CD178, CD253 and CD277 and wherein about 5% or fewer of the cells in the population express detectable levels of CD34, CD45 and CD56.

10. A population of MK cells according to claim 8(C), wherein
    (i) at least about 15% of the cells in the population express a detectable level of CD16,
    (ii) at least about 50% of the cells in the population express a detectable level of CD96,
    (iii) at least about 20% of the cells in the population express a detectable level of CD112,
    (iv) at least about 80% of the cells in the population express a detectable level of CD137L,
    (v) at least about 20% of the cells in the population express a detectable level of CD178,
    (vi) at least about 50% of the cells in the population express a detectable level of CD253, and
    (vii) at least about 50% of the cells in the population express a detectable level of CD277, and wherein
    (a) about 5% or fewer of the cells in the population express a detectable level of CD34, (b) about 5% or fewer of the cells in the population express a detectable level of CD45, and
(c) about 5% or fewer of the cells in the population express a detectable level of CD56.

11. A pharmaceutical composition comprising:
(1) a population of MK cells according to claim 8 and a pharmaceutically acceptable carrier or diluent, wherein the population of MK cells comprises
  (A) two or more MK cells according to claim 1; or
  (B) MK cells, wherein greater than about 15% of the cells in the population express detectable levels of CD112, CD137L, CD178, CD253 and CD277 and wherein about 5% or fewer of the cells in the population express detectable levels of CD34 and CD45; or
  (C) MK cells, wherein
    (i) at least about 20% of the cells in the population express a detectable level of CD112,
    (ii) at least about 80% of the cells in the population express a detectable level of CD137L,
    (iii) at least about 20% of the cells in the population express a detectable level of CD178,
    (iv) at least about 50% of the cells in the population express a detectable level of CD253, and
    (v) at least about 50% of the cells in the population express a detectable level of CD277, and wherein
    (a) about 5% or fewer of the cells in the population express a detectable level of CD34, and
    (b) about 5% or fewer of the cells in the population express a detectable level of CD45;
  or
(2) a population of primed NK cells and a pharmaceutically acceptable carrier or diluent, wherein the population of primed NK cells is produced by an in vitro method that comprises incubating the population of NK cells with a population of MK cells according to (1) under conditions which increase the activity of the NK cells.

12. A pharmaceutical composition according to claim 11, wherein the composition further comprises a population of NK cells.

* * * * *